United States Patent
Mykland

(10) Patent No.: US 7,840,777 B2
(45) Date of Patent: Nov. 23, 2010

(54) METHOD AND APPARATUS FOR DIRECTING A COMPUTATIONAL ARRAY TO EXECUTE A PLURALITY OF SUCCESSIVE COMPUTATIONAL ARRAY INSTRUCTIONS AT RUNTIME

(75) Inventor: Robert Keith Mykland, Capitola, CA (US)

(73) Assignee: Ascenium Corporation, Capitola, CA (US)

( * ) Notice: Subject to any disclaimer, the term of this patent is extended or adjusted under 35 U.S.C. 154(b) by 184 days.

(21) Appl. No.: 11/183,649

(22) Filed: Jul. 18, 2005

(65) Prior Publication Data

US 2006/0004997 A1    Jan. 5, 2006

Related U.S. Application Data

(63) Continuation-in-part of application No. 10/128,940, filed on Apr. 24, 2002, now abandoned.

(60) Provisional application No. 60/288,986, filed on May 4, 2001.

(51) Int. Cl.
*G06F 15/16* (2006.01)

(52) U.S. Cl. ..................................................... 712/15

(58) Field of Classification Search .................... 712/15
See application file for complete search history.

(56) References Cited

U.S. PATENT DOCUMENTS

| | | | |
|---|---|---|---|
| 5,760,607 A * | 6/1998 | Leeds et al. ..................... 326/38 |
| 5,794,062 A * | 8/1998 | Baxter .......................... 712/30 |
| 5,943,242 A | 8/1999 | Vorbach et al. |
| 5,961,630 A * | 10/1999 | Zaidi et al. .................. 712/200 |
| 6,058,469 A | 5/2000 | Baxter |
| 6,069,490 A * | 5/2000 | Ochotta et al. ................. 326/41 |
| 6,077,315 A | 6/2000 | Greenbaum et al. |
| 6,085,317 A | 7/2000 | Smith |
| 6,088,795 A | 7/2000 | Vorbach et al. |
| 6,304,101 B1 | 10/2001 | Nishihara |
| 6,336,209 B1 | 1/2002 | Nishihara et al. |
| 6,438,737 B1 | 8/2002 | Morelli et al. |
| 6,507,213 B1 * | 1/2003 | Dangat ......................... 326/38 |
| 6,567,970 B1 * | 5/2003 | Nayak et al. .................. 716/17 |
| 6,658,564 B1 * | 12/2003 | Smith et al. ................. 713/100 |

(Continued)

OTHER PUBLICATIONS

Ian Page "Reconfigurable Processor Architectures" Microprocessors and Microsystems; vol. 20, Issue 3, May 1996, pp. 185-196.*

(Continued)

*Primary Examiner*—Eddie P Chan
*Assistant Examiner*—Keith Vicary
(74) *Attorney, Agent, or Firm*—Patrick Reilly; Colin Fowler

(57) ABSTRACT

A general purpose computing system comprises a novel apparatus and method for data processing. The computing system design of one application of the present invention includes an instruction pipe having a decompression circuit, a reprogrammable logic unit and a data bus. Instructions and data may be accessed via a shared bus or via a separate instruction bus and data bus. The decompression circuit accepts compressed instructions and memory management directives from the instruction bus, decompresses each instruction, and transmits the decompressed instruction to the reprogrammable logic unit. A software compiler is provided that accepts high level programming language source code and creates instructions that are coded for acceptance and execution by the reprogrammable logic unit.

15 Claims, 70 Drawing Sheets

U.S. PATENT DOCUMENTS

| | | | | |
|---|---|---|---|---|
| 7,174,443 | B1* | 2/2007 | Vorbach et al. | 712/229 |
| 2003/0046530 | A1* | 3/2003 | Poznanovic | 713/100 |
| 2004/0019765 | A1* | 1/2004 | Klein, Jr. | 712/15 |
| 2004/0107331 | A1* | 6/2004 | Baxter | 712/15 |

OTHER PUBLICATIONS

Patrick Lysaght, "Towards an expert system for a priori estimation of reconfiguration latency in dynamically reconfigurable logic"; Proceedings of the 7th International Workshop on Field-Programmable Logic and Applications; pp. 183-192 Year of Publication: 1997.*

Zhiyuan Li, Katherine Compton, Scott Hauck, "Configuration Caching Management Techniques for Reconfigurable Computing," fccm,pp. 22, 2000 IEEE Symposium on Field-Programmable Custom Computing Machines, 2000.*

Compton et al., "An Introduction to Reconfigurable Computing", IEEE Computer, Apr. 2000.*

McGregor et al. (Self Controlling Dynamic Reconfiguration: A Case Study) Field-Programmable Logic and Applications, Proceedings of the 9th International Workshop, FPL, 1999.*

Robertazzi (Toroidal Networks) IEEE Communications Magazine—Jun. 1988—vol. 26, No. 6, pp. 45-50.*

Ralfit D. Wittig and Paul Chow, "OneChip: An FPGA Processor With Reconfigurable Logic", Apr. 18, 1996, p. 126, Proceedings, IEEE Symposium on FPGAS for Custom Computing Machines, IEEE Computer Society Press, Napa Valley, CA, USA, pp. 126-135.

Wayne Luk et al. "Modeling and Optiming Run-Time Reconfigurable Systems", IBID pp. 167-176.

John Setel O'Donnell, "MAP-BSP-IS", Microprocessor Forum, Oct. 18, 2001, San Jose, CA., Seven Pages, Powerpoint.

Jeruen Leitten, "A Massively Parallel Reconfigurable ULIW Core" Microprocessor Forum, Oct. 14, 2003 San Jose, CA, Thirteen Pages, Powerpoint.

Lex Augusteijn, "The HIVECC Compiler", Embedded Processor Forum, May 18, 2004, San Jose, CA Thirteen Pages, Power Point.

* cited by examiner

**COMBINED BUS

RLU

PAGE 1 OF 1
MUX TYPE 1

MUX
CIRCUIT A

MUX
CIRCUIT B

MUX
CIRCUIT C

MUX
CIRCUIT D

MUX
CIRCUIT E

MUX
CIRCUIT F

MUX
CIRCUIT G

MUX
CIRCUIT H

CIRCUIT 1 MUX

CIRCUITS J & K**

CIRCUIT L    MUX

CIRCUIT M    MUX

CIRCUIT N    MUX

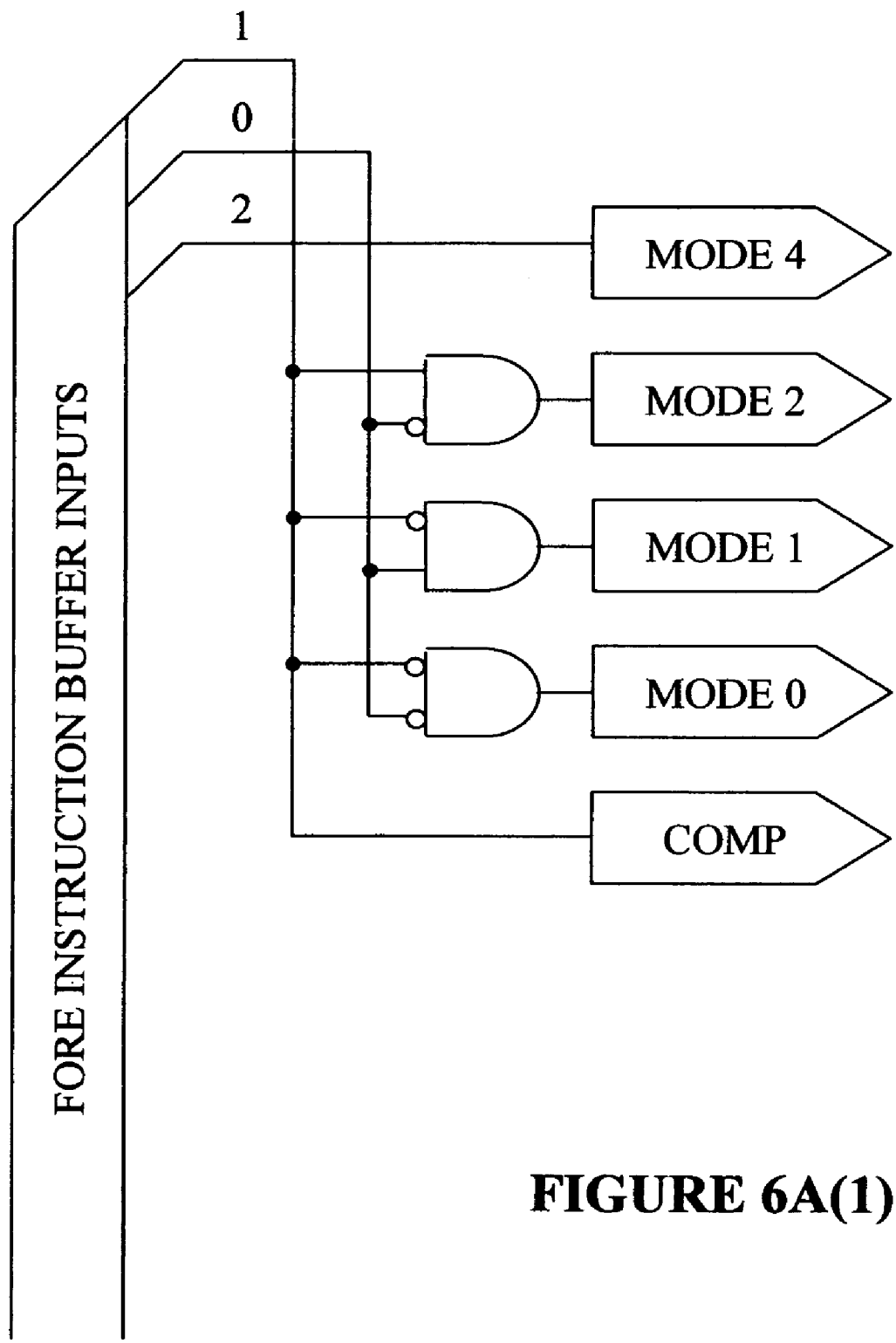
FIGURE 6A(1)

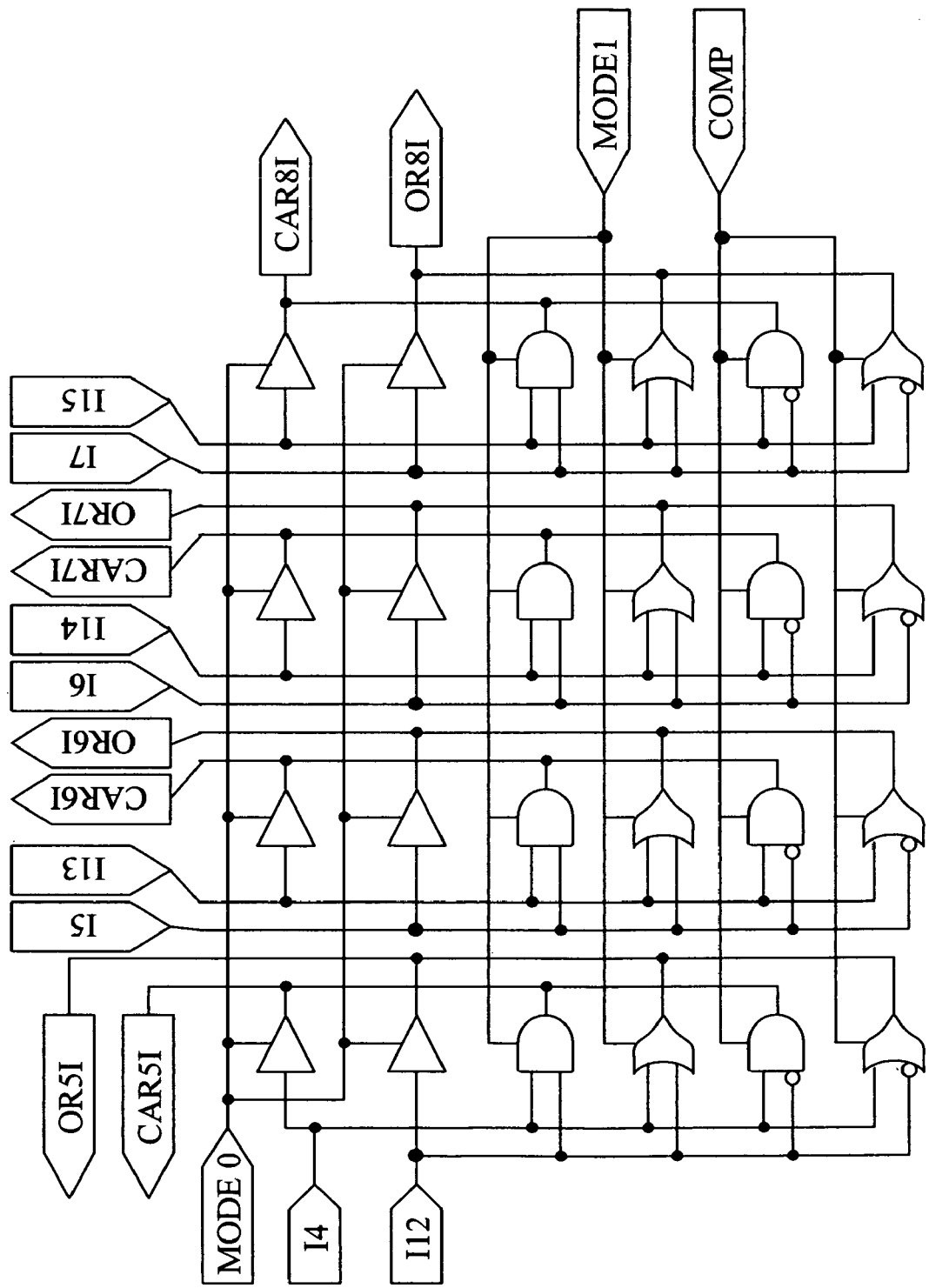
FIGURE 6A(2)

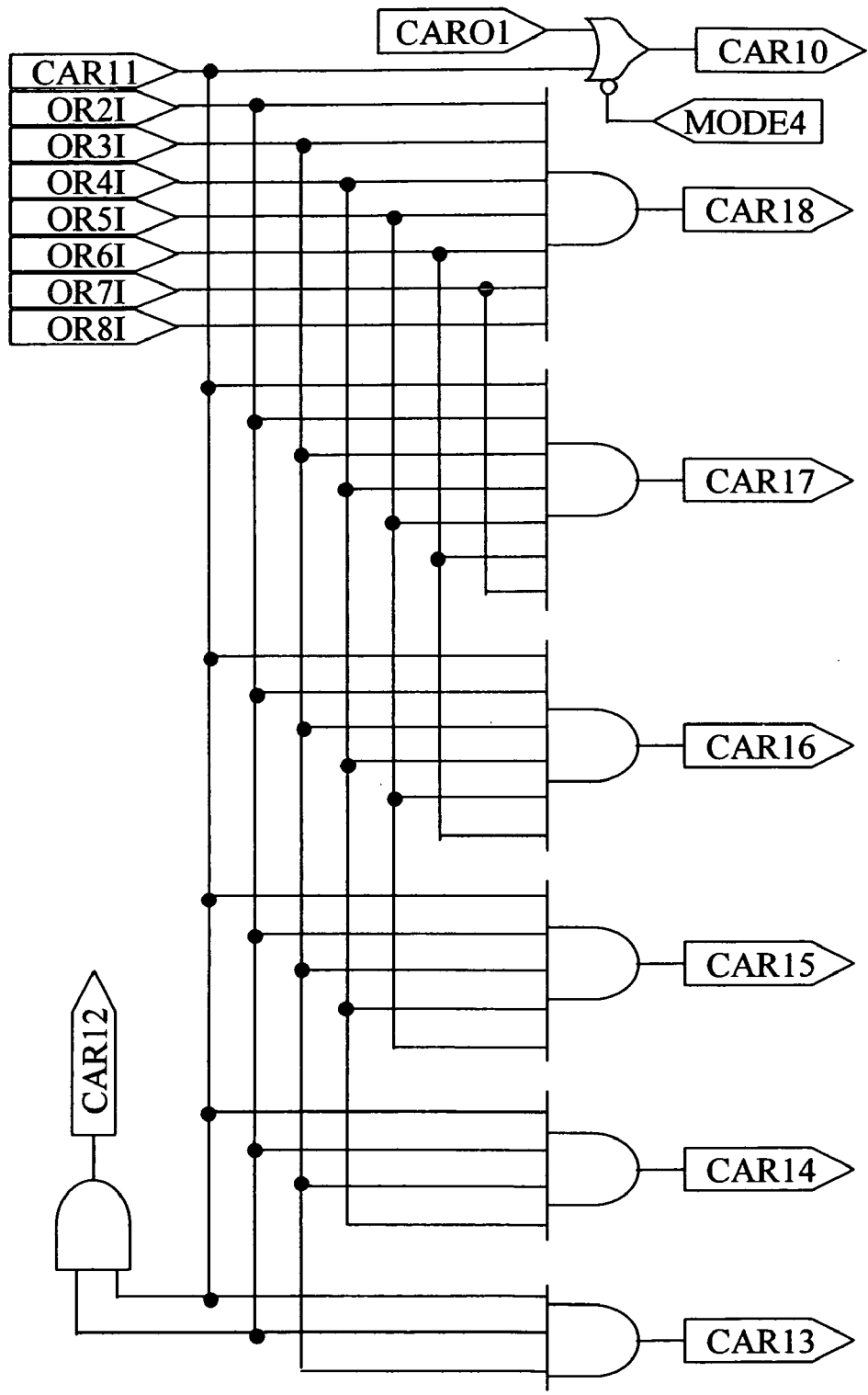
FIGURE 6B(1)

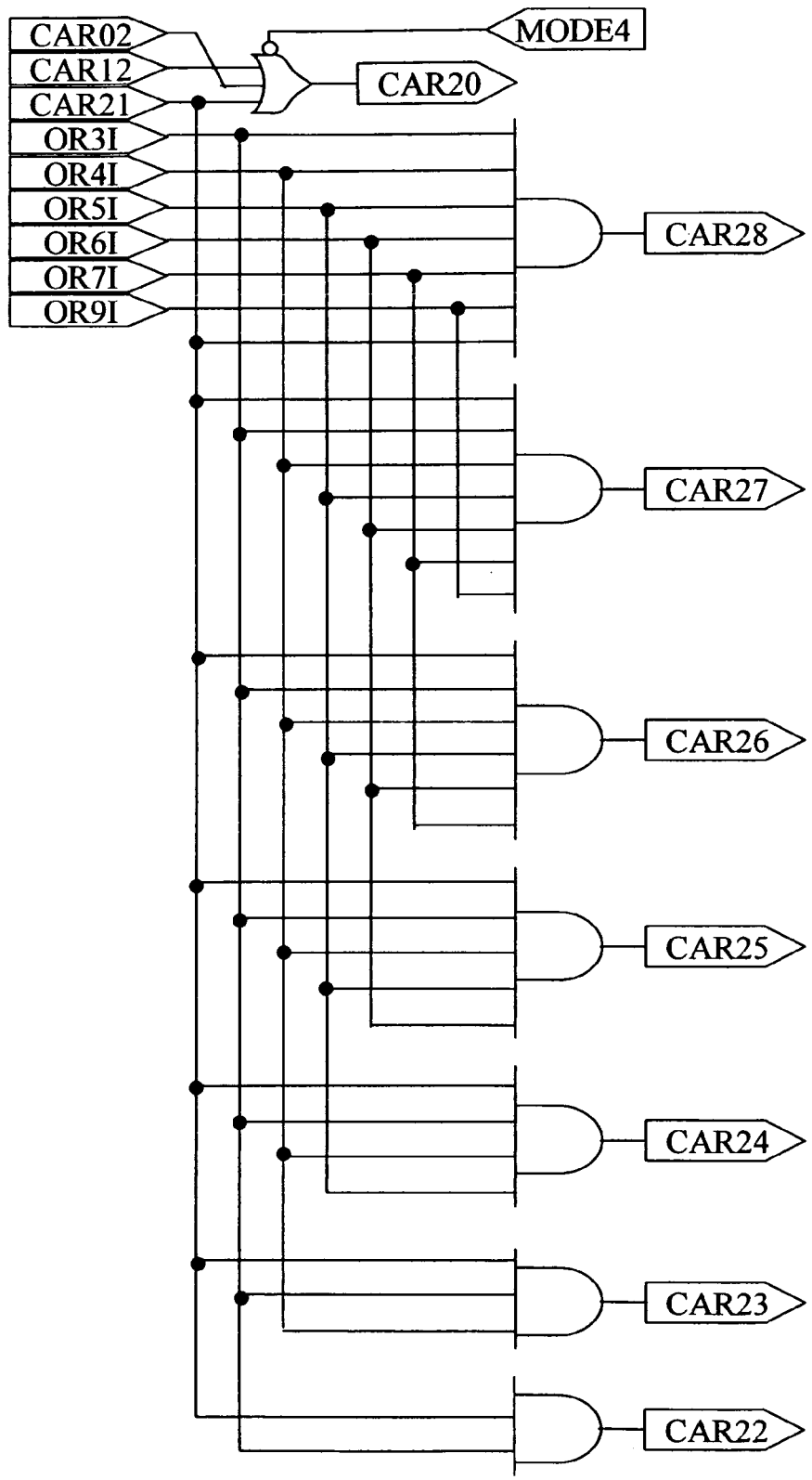
FIGURE 6B(2)

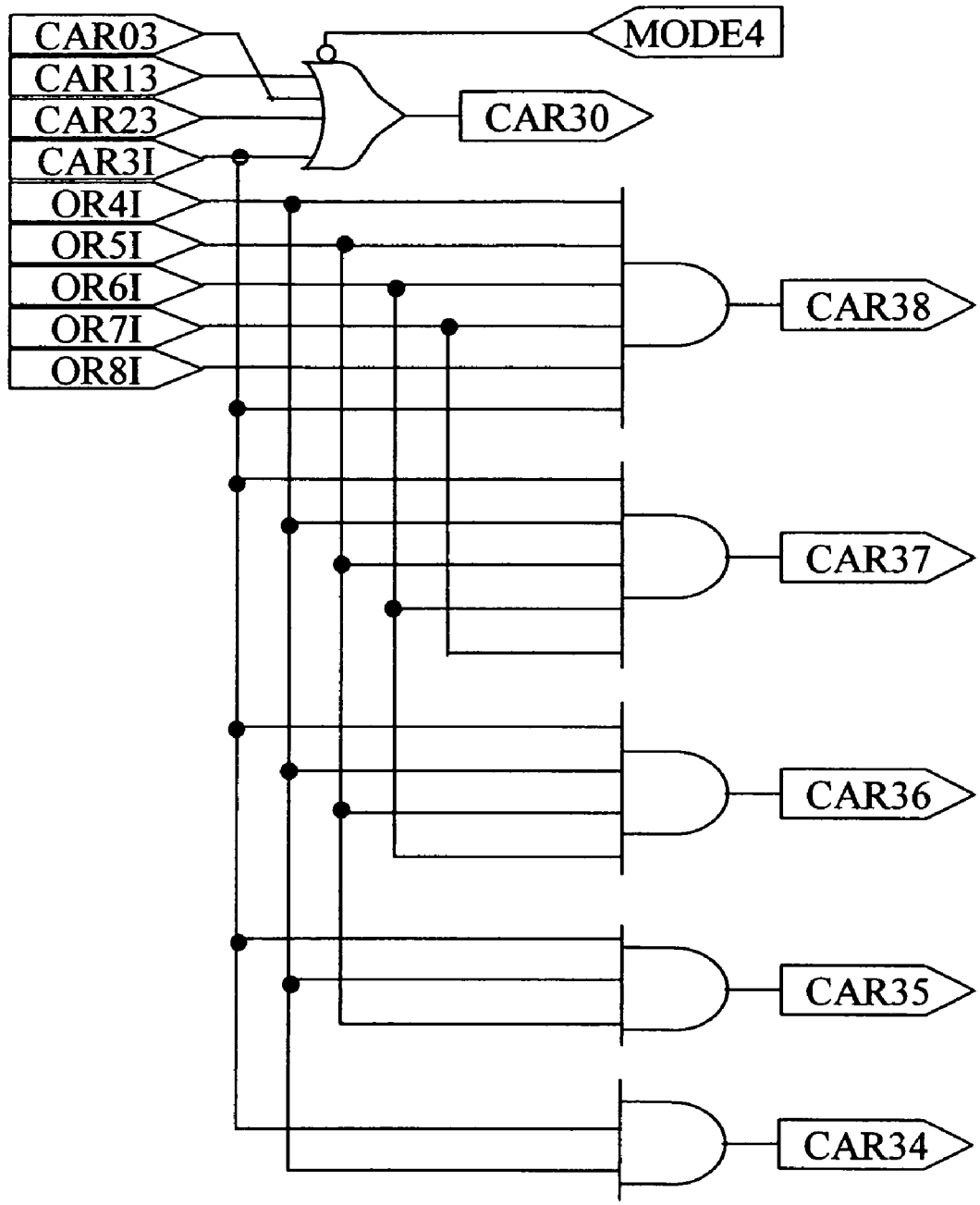
FIGURE 6B(3)

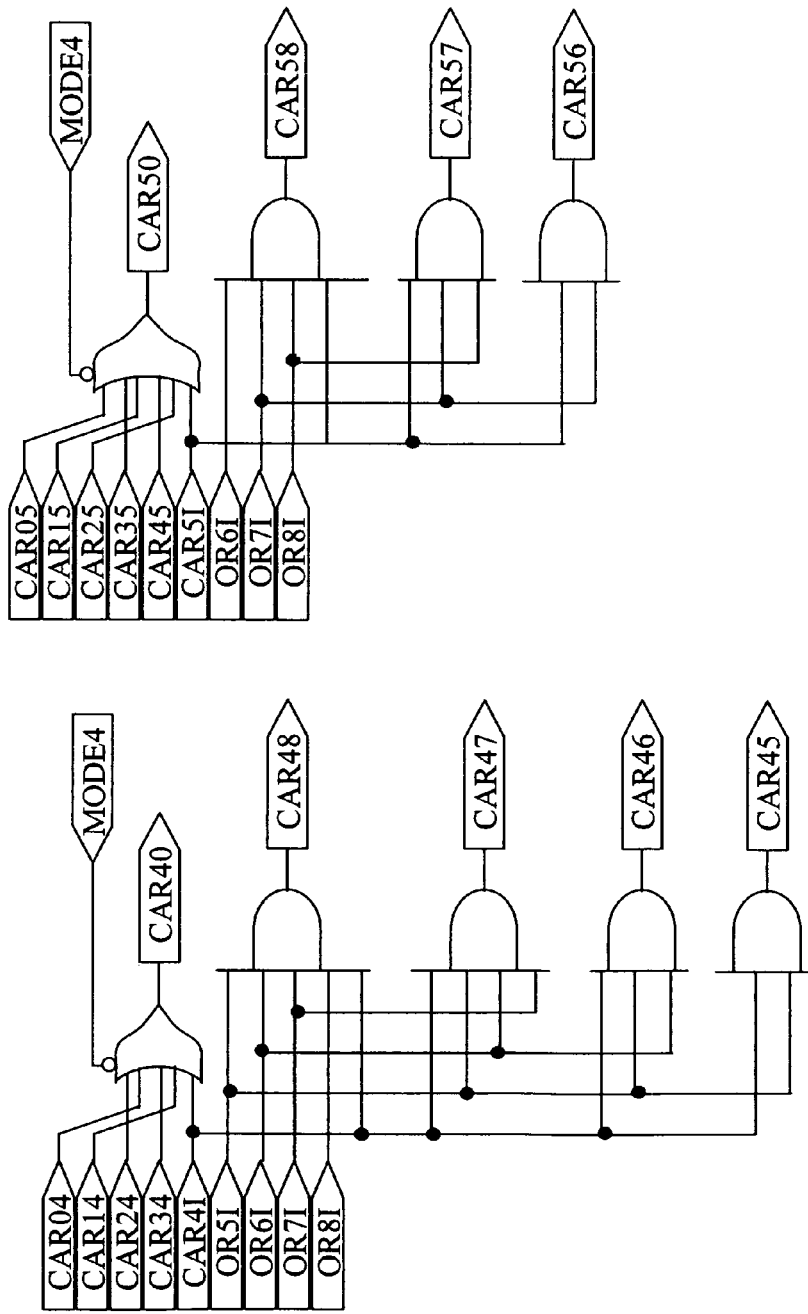
FIGURE 6C(1)
"CONE"

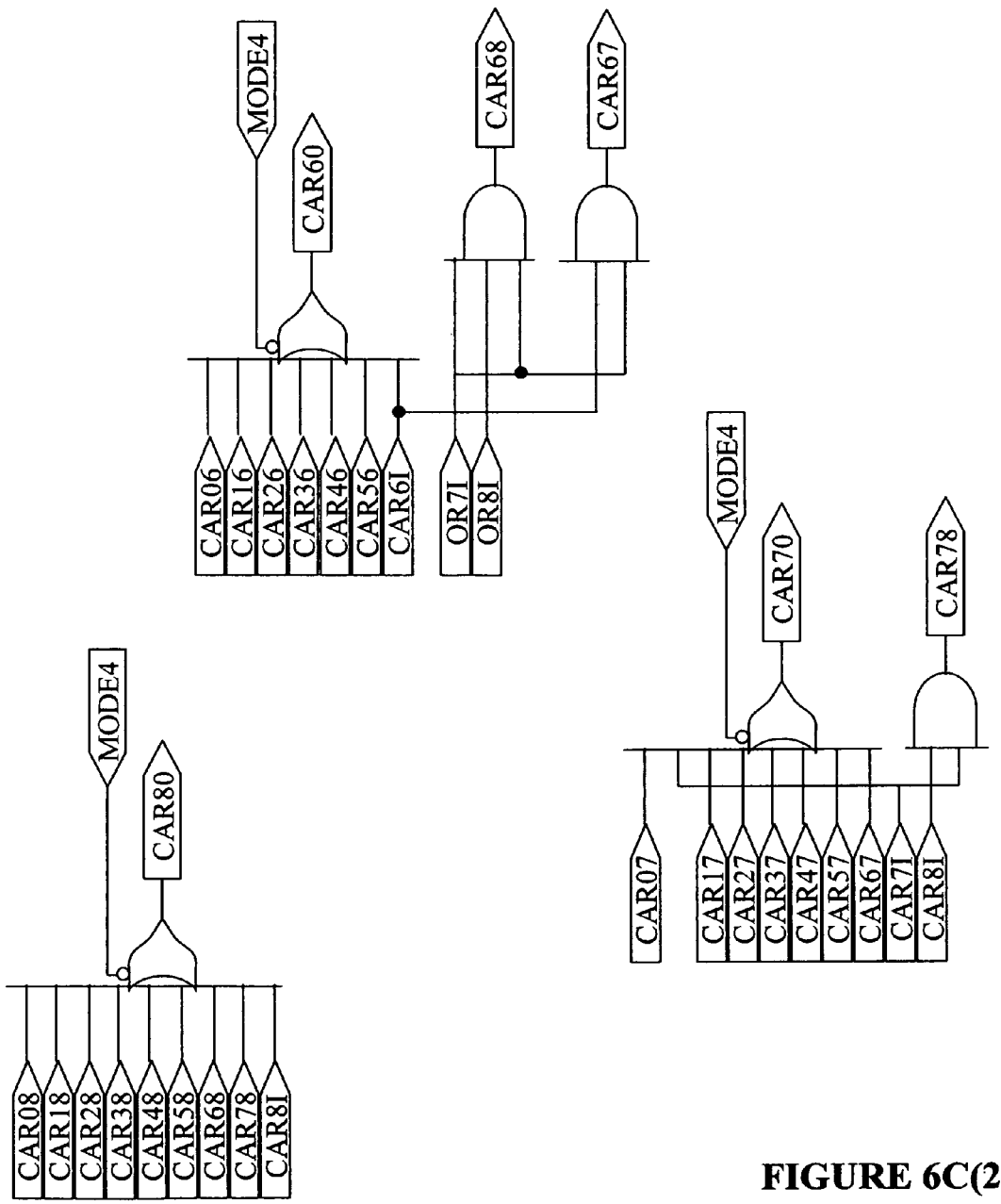
FIGURE 6C(2)
"CONE"

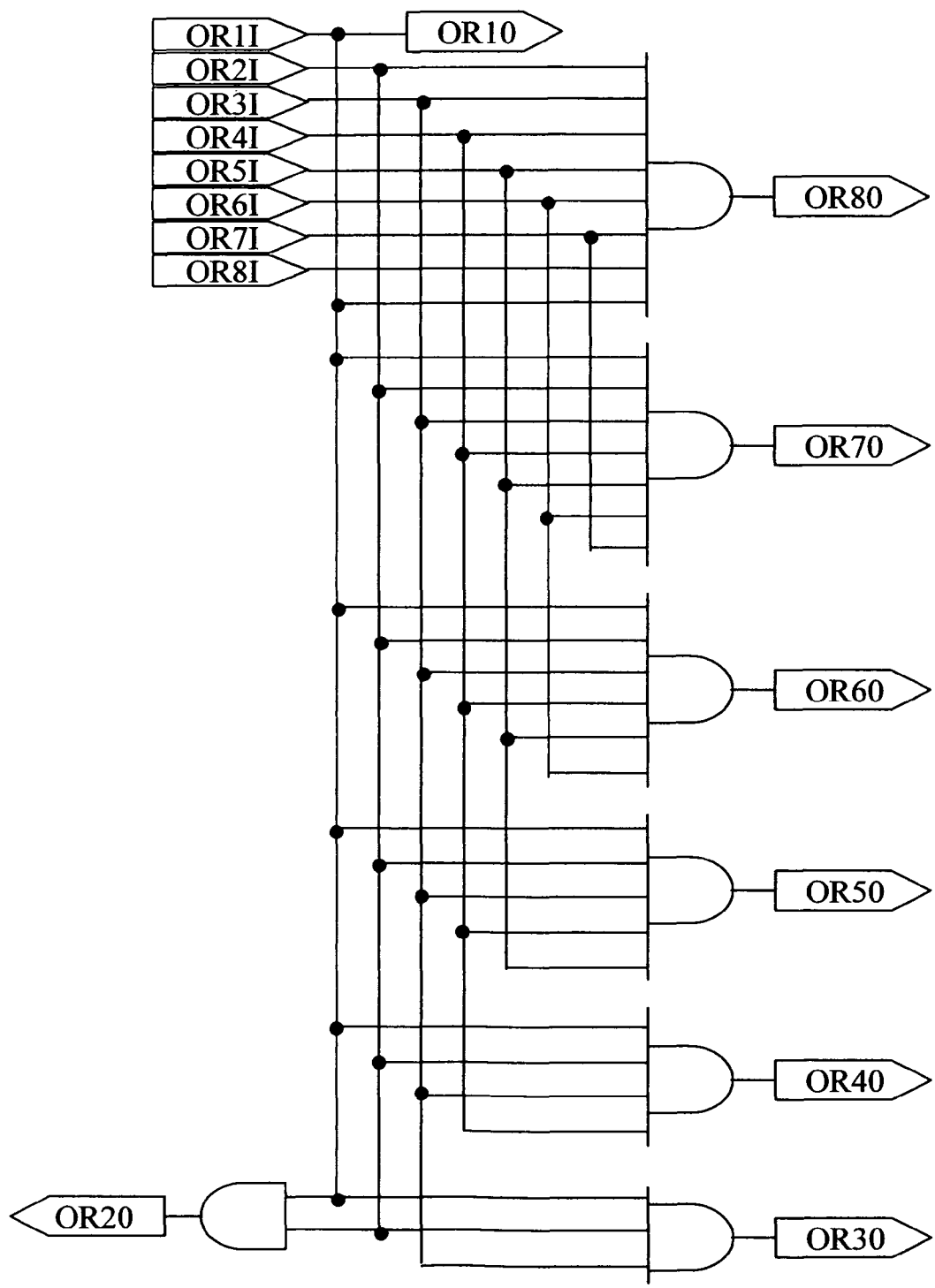
FIGURE 6C(3)
"CONE"

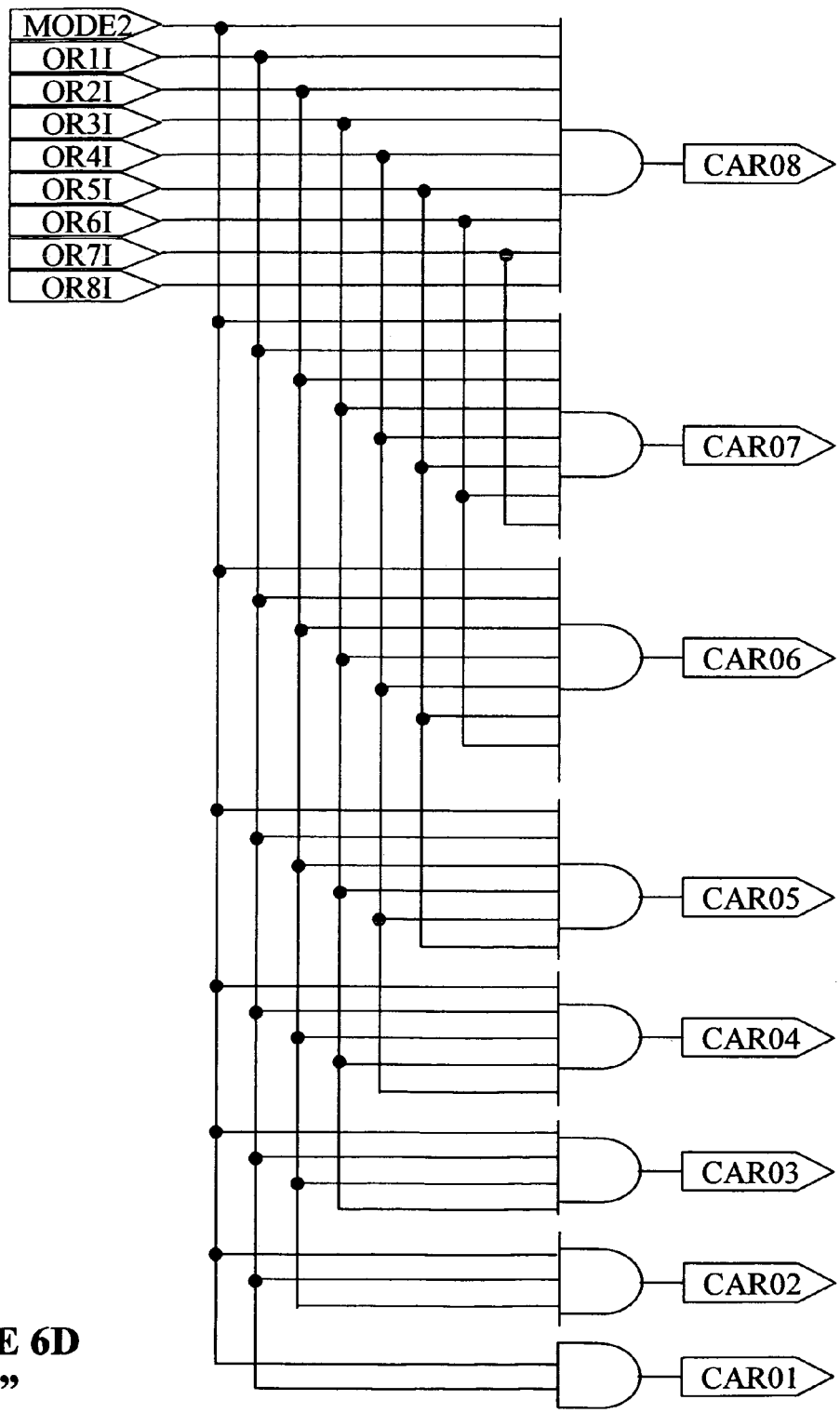
FIGURE 6D "CONE"

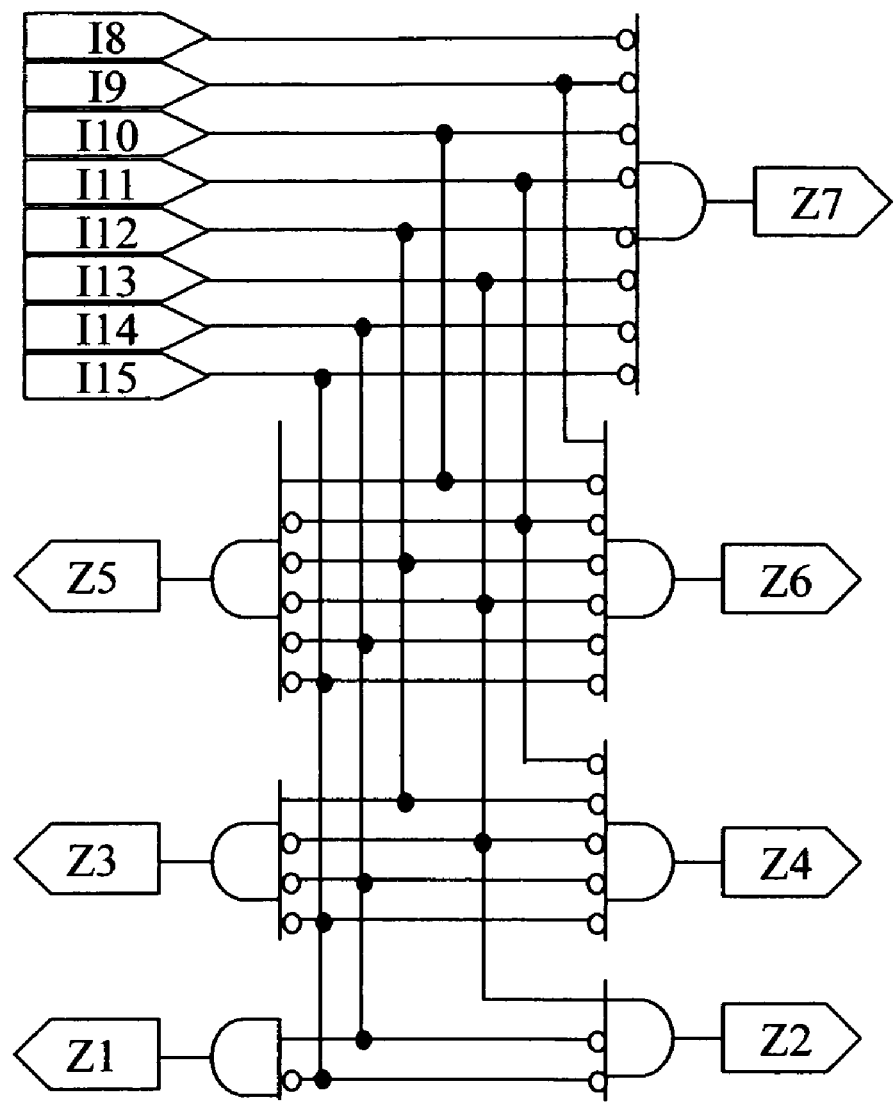
**FIGURE 6H(1)
"CONE"**

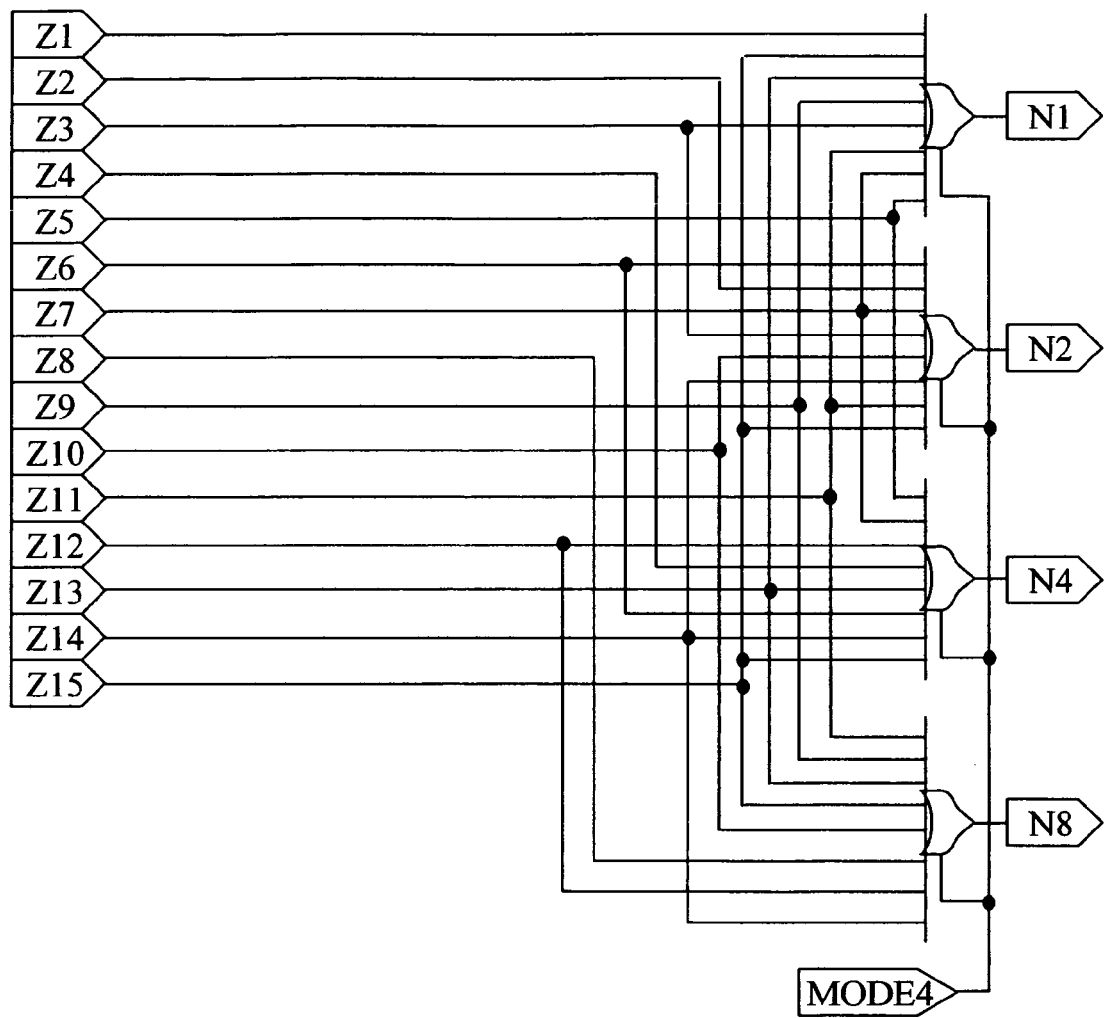
FIGURE 6H(2)
"CONE"

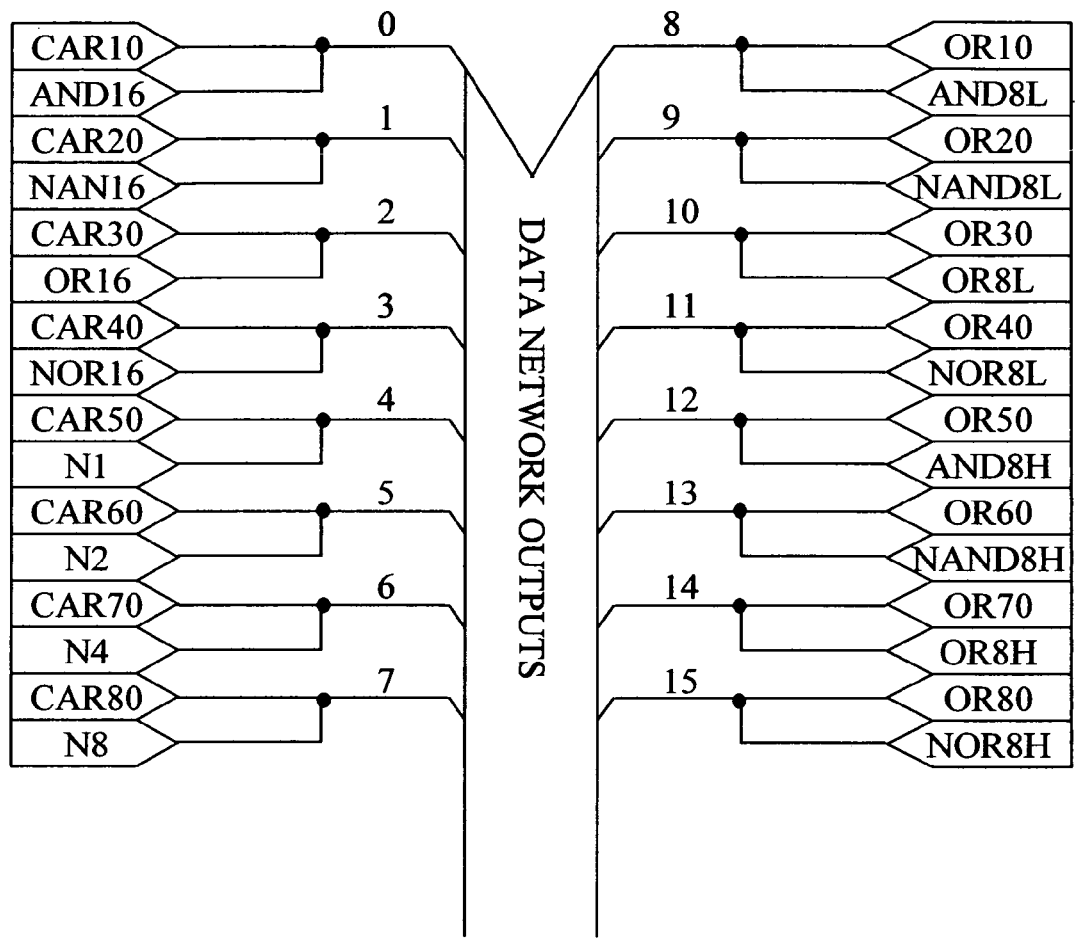
FIGURE 6H(3)
"CONE"

ITERATOR 5/3/01

COMPILER FLOWCHART**

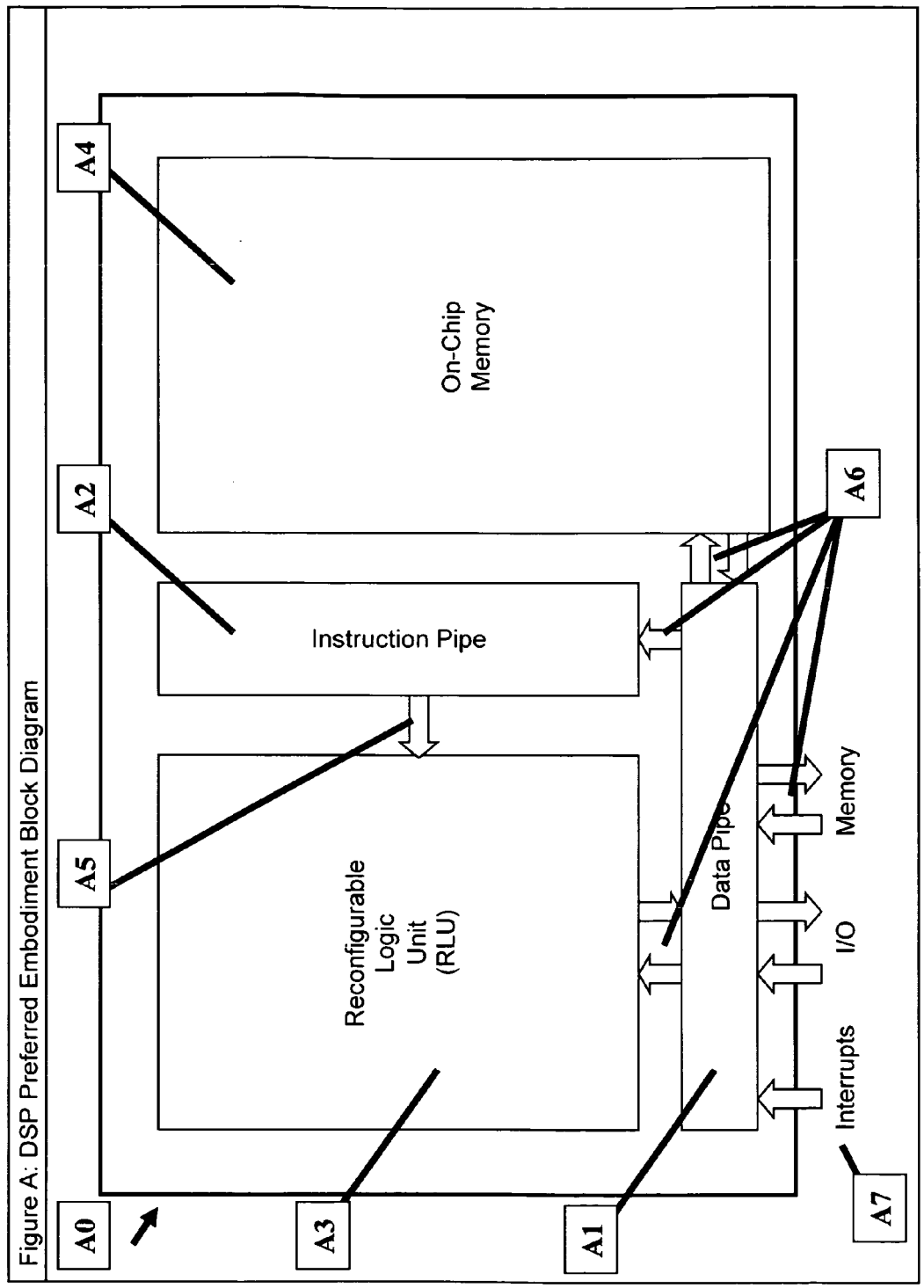

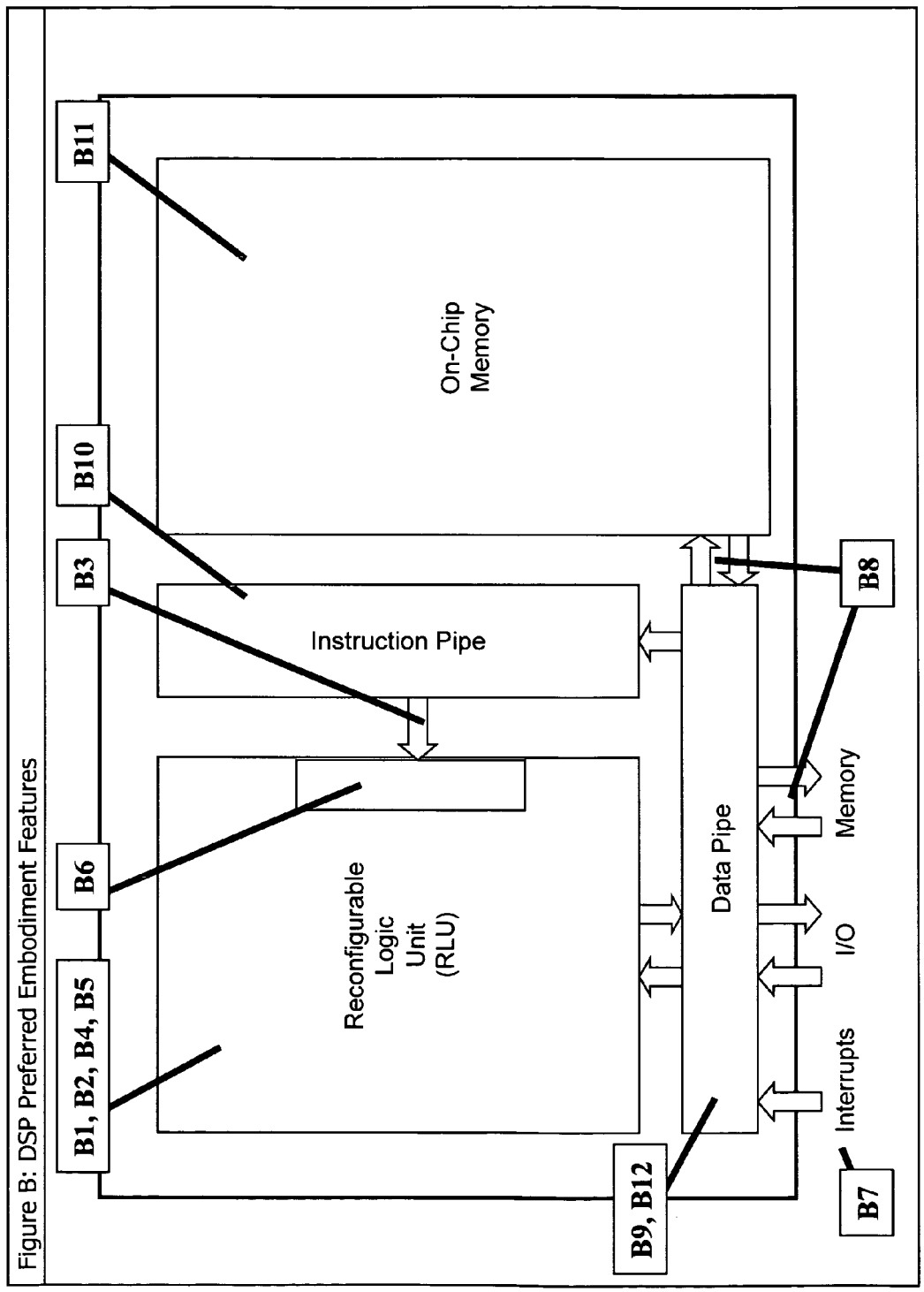

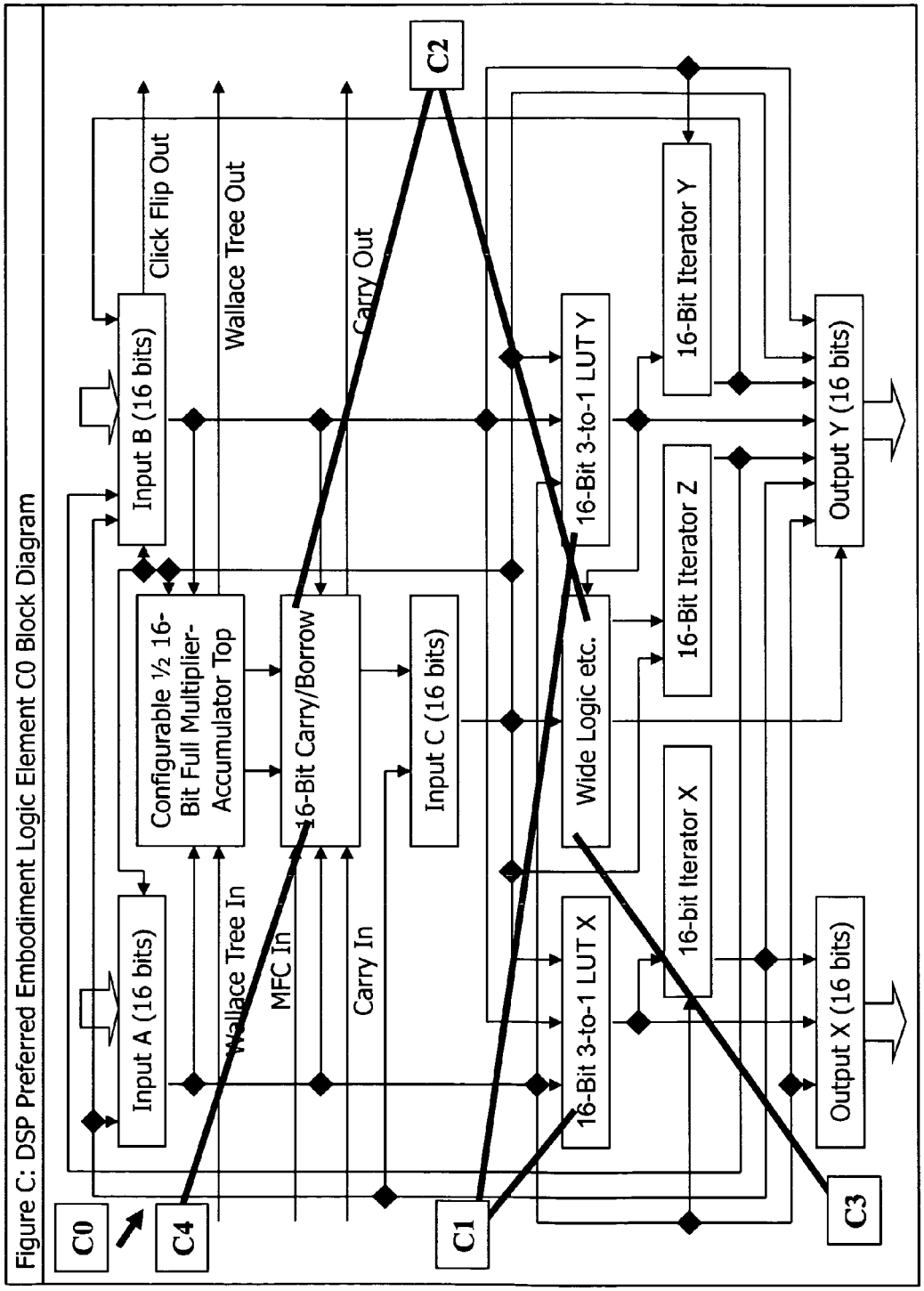

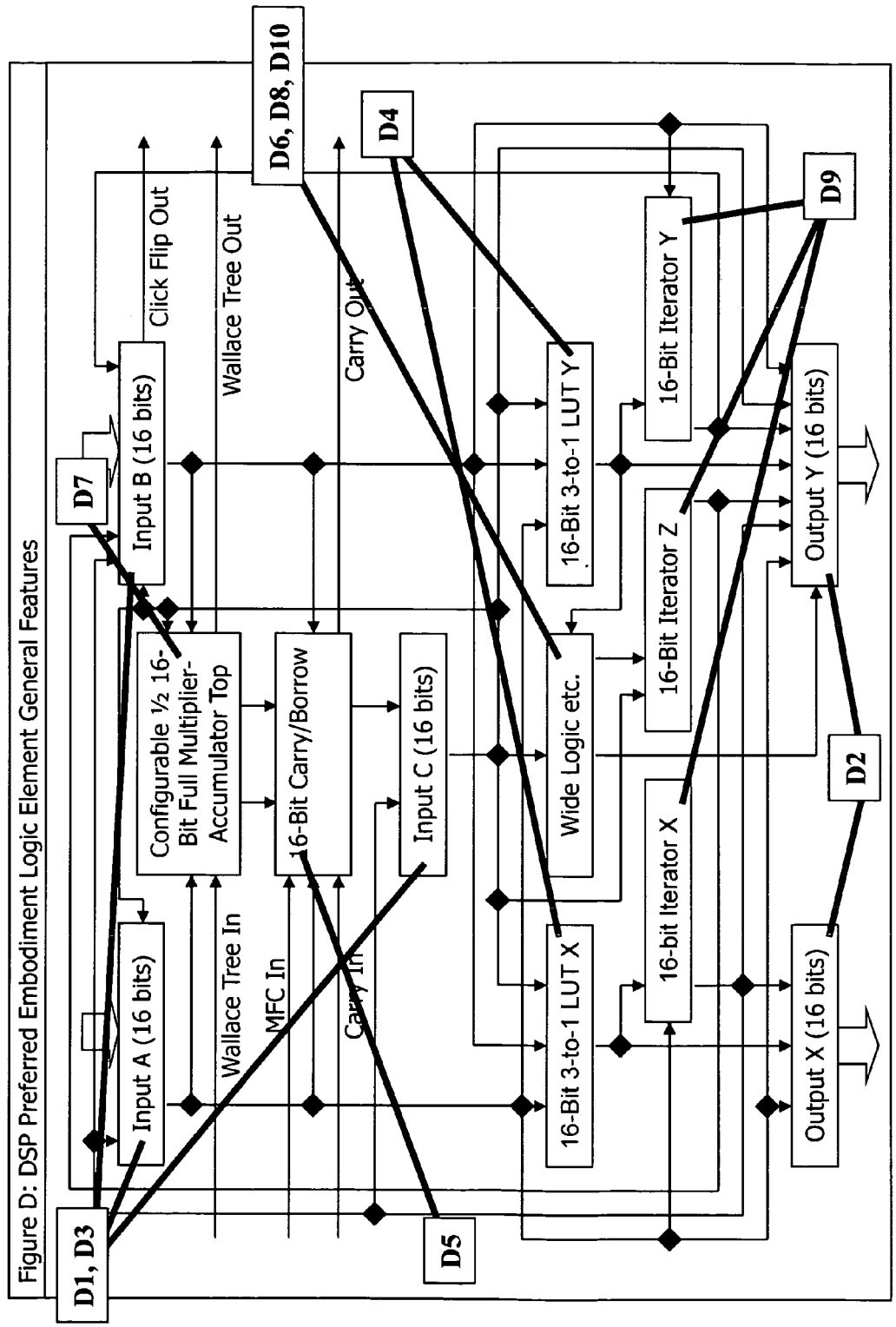

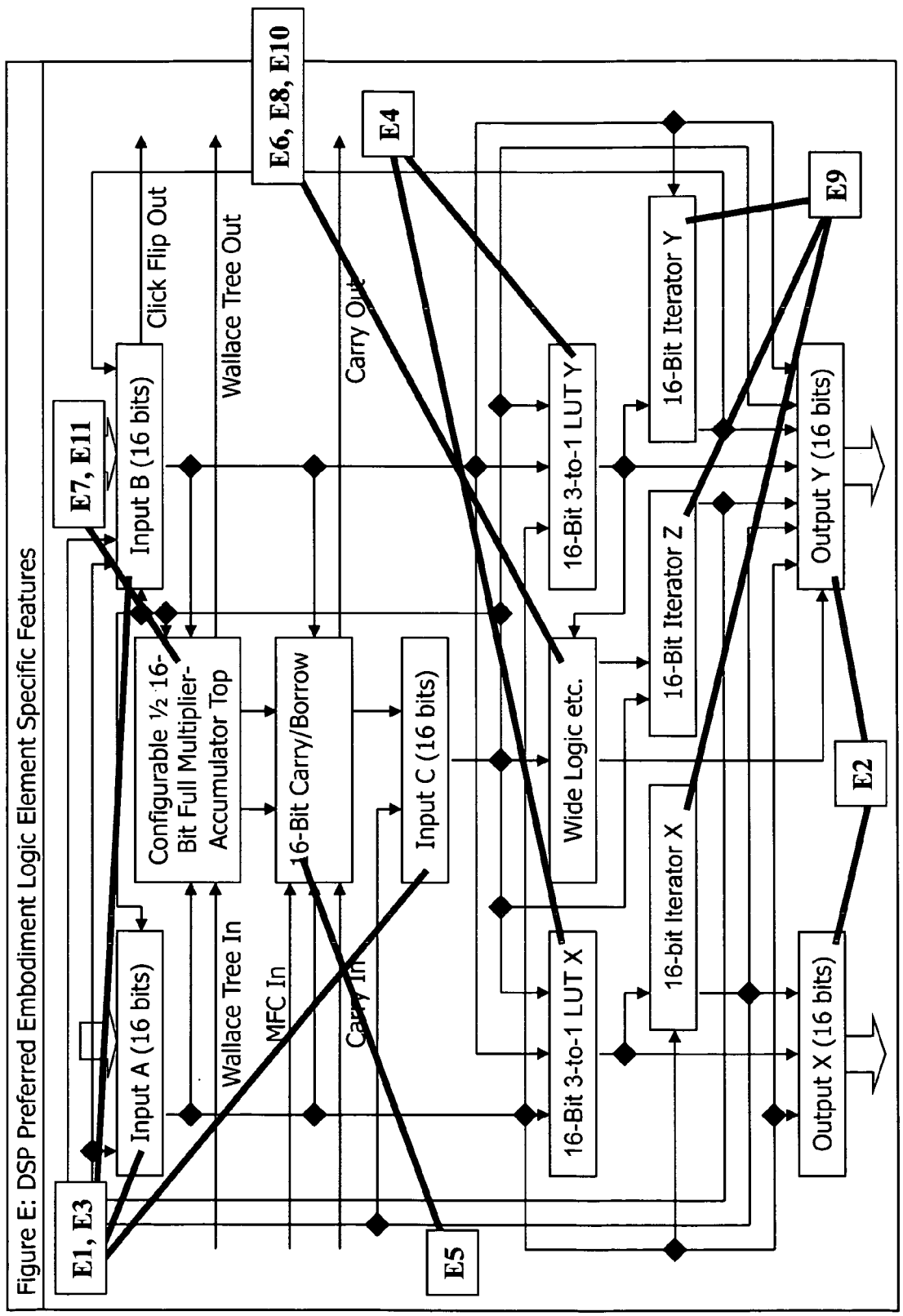

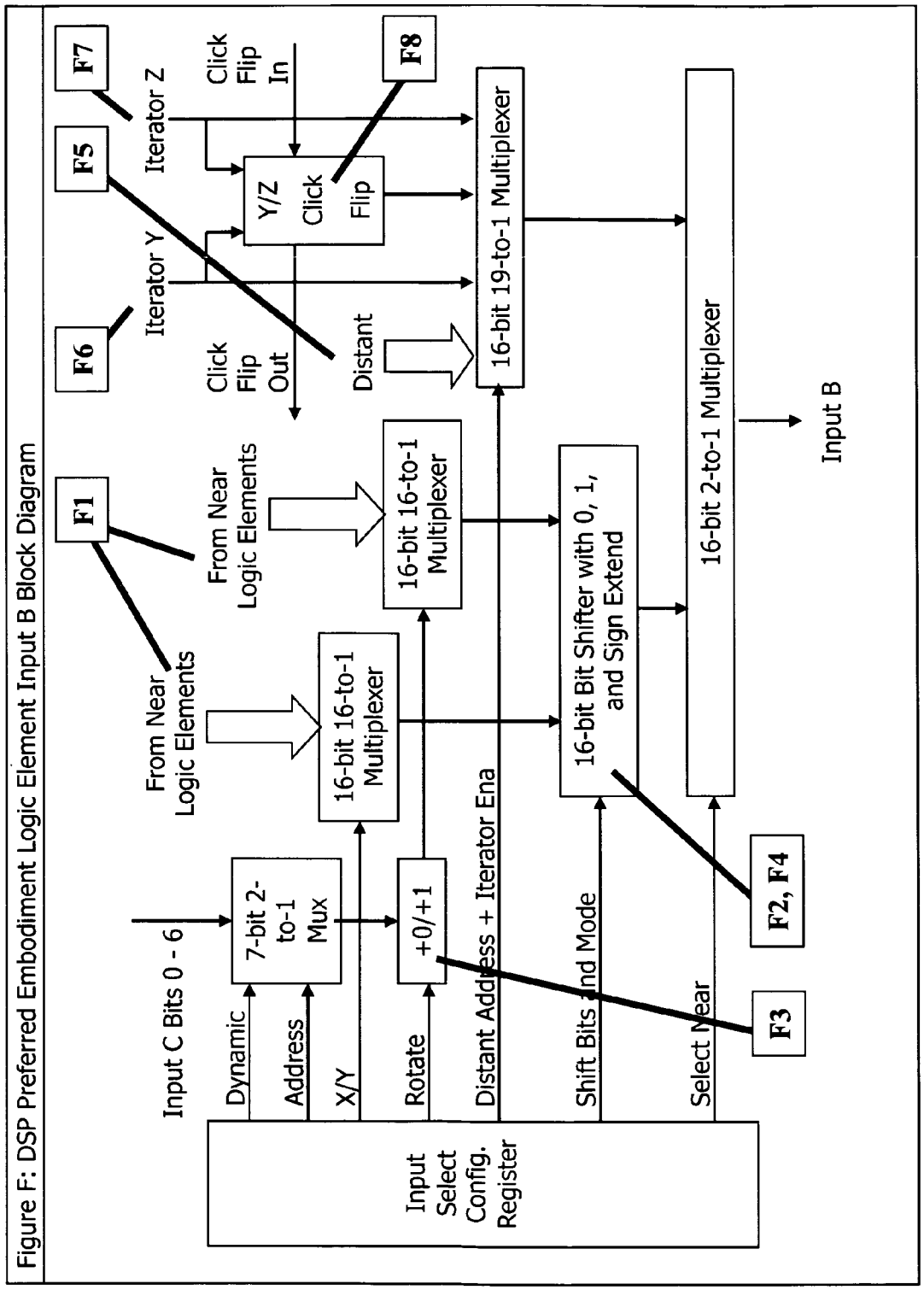

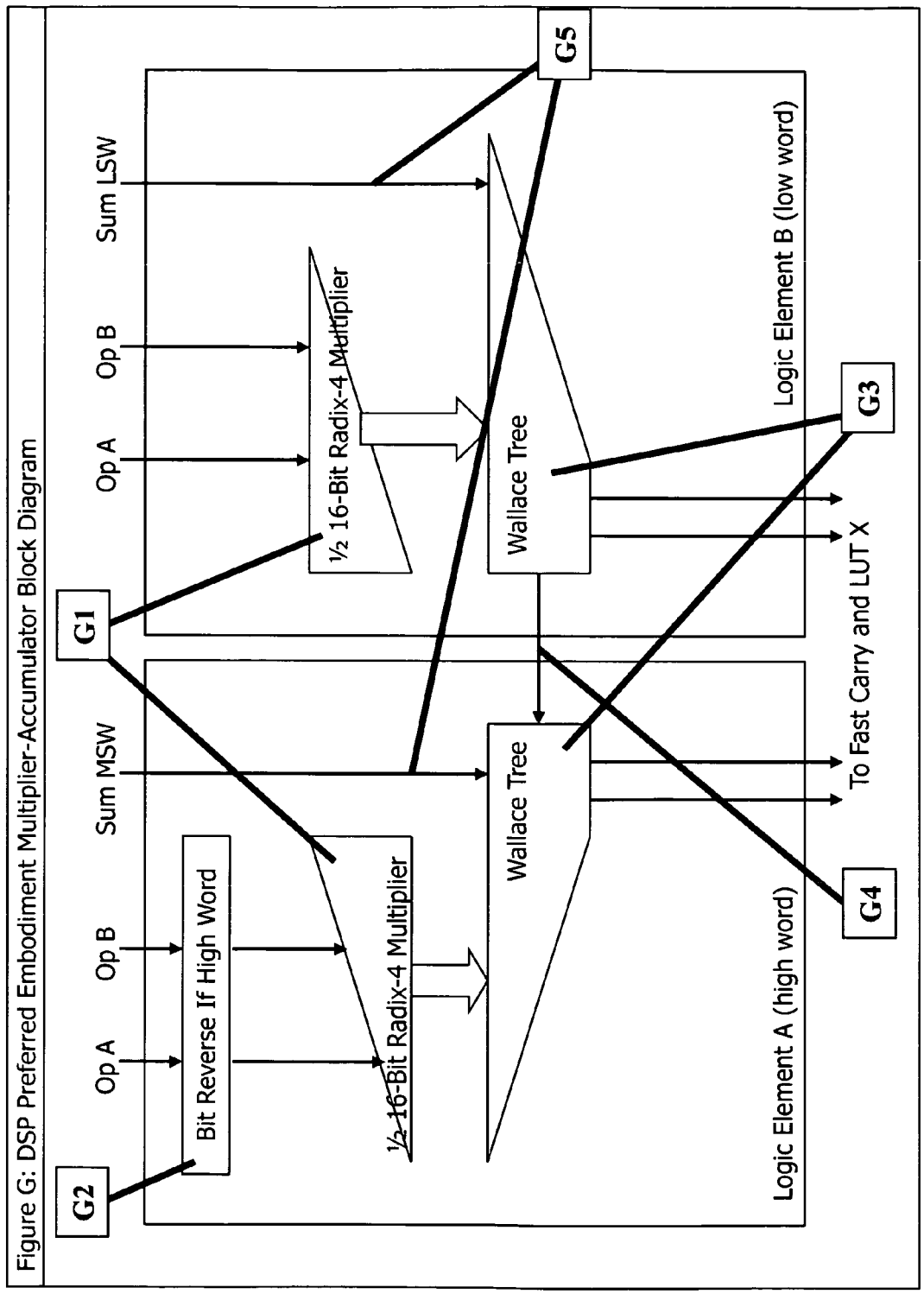

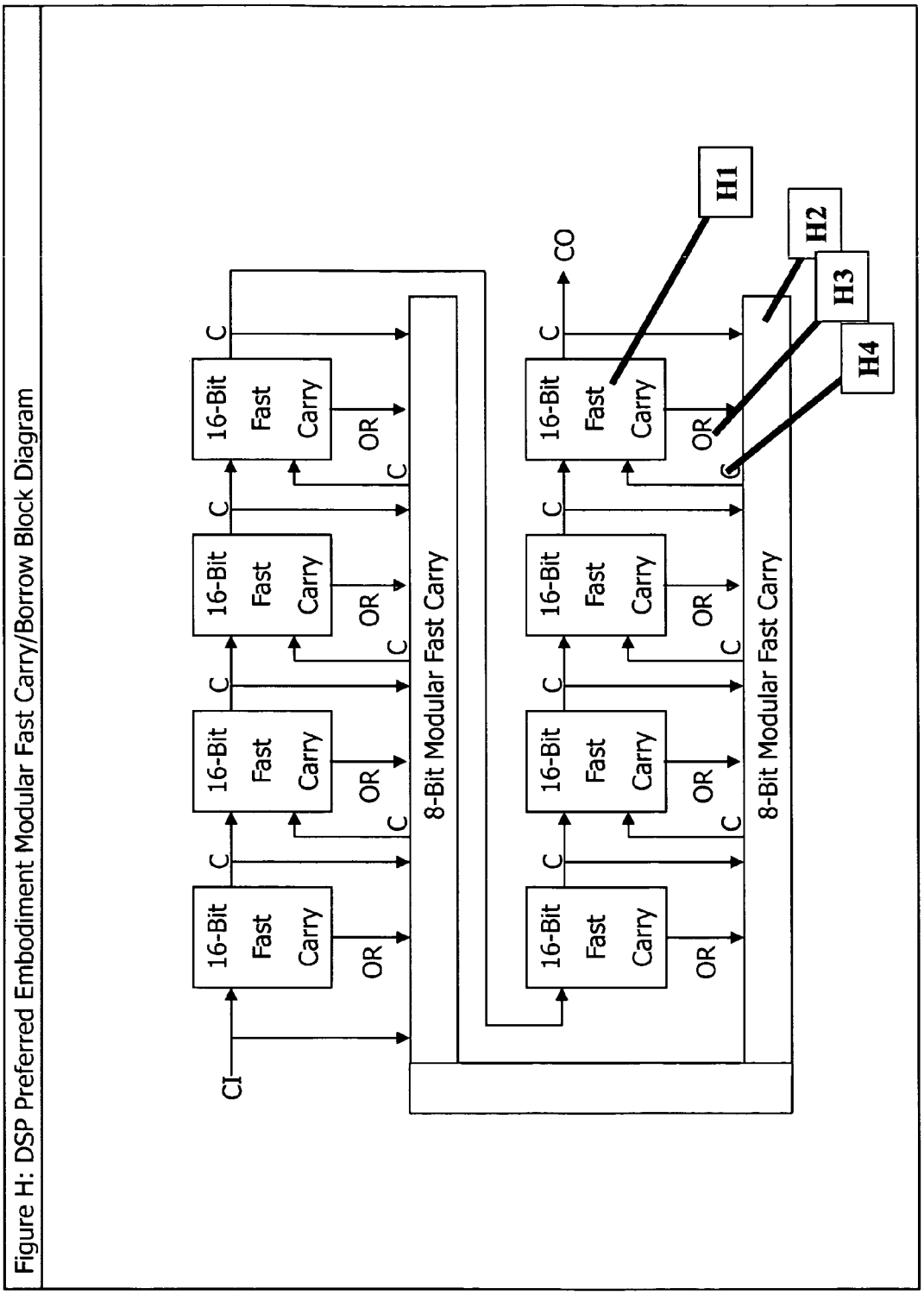

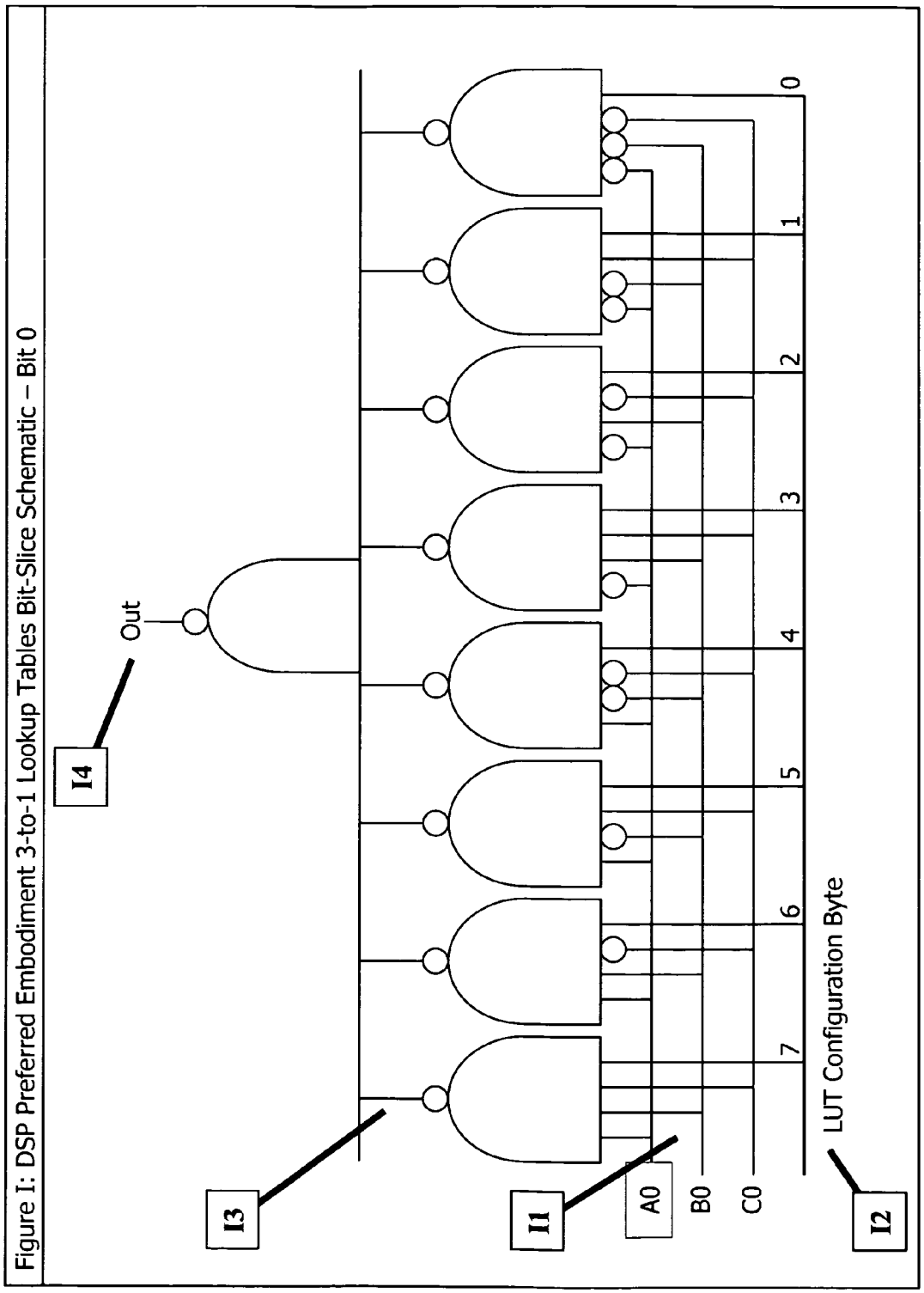

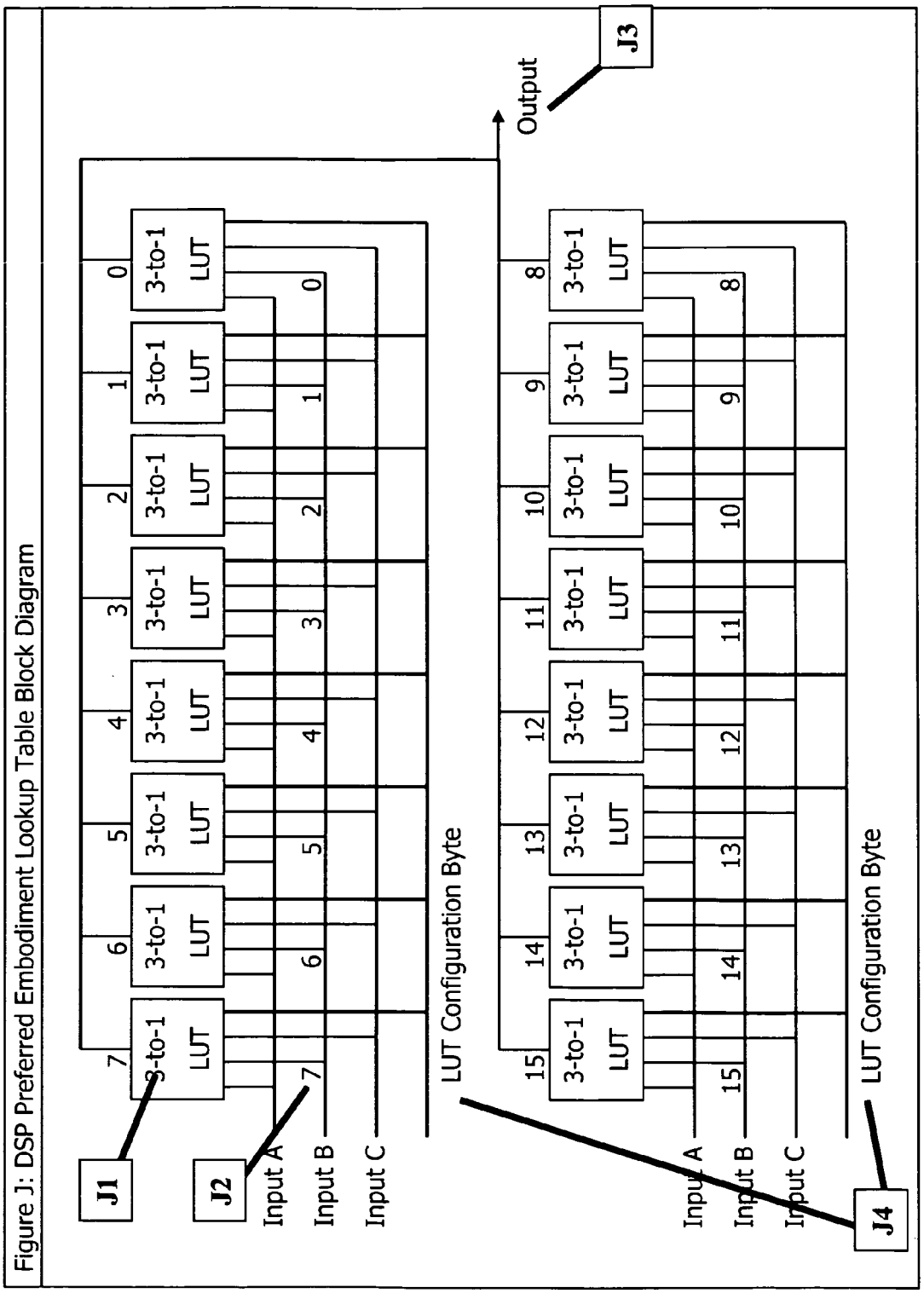

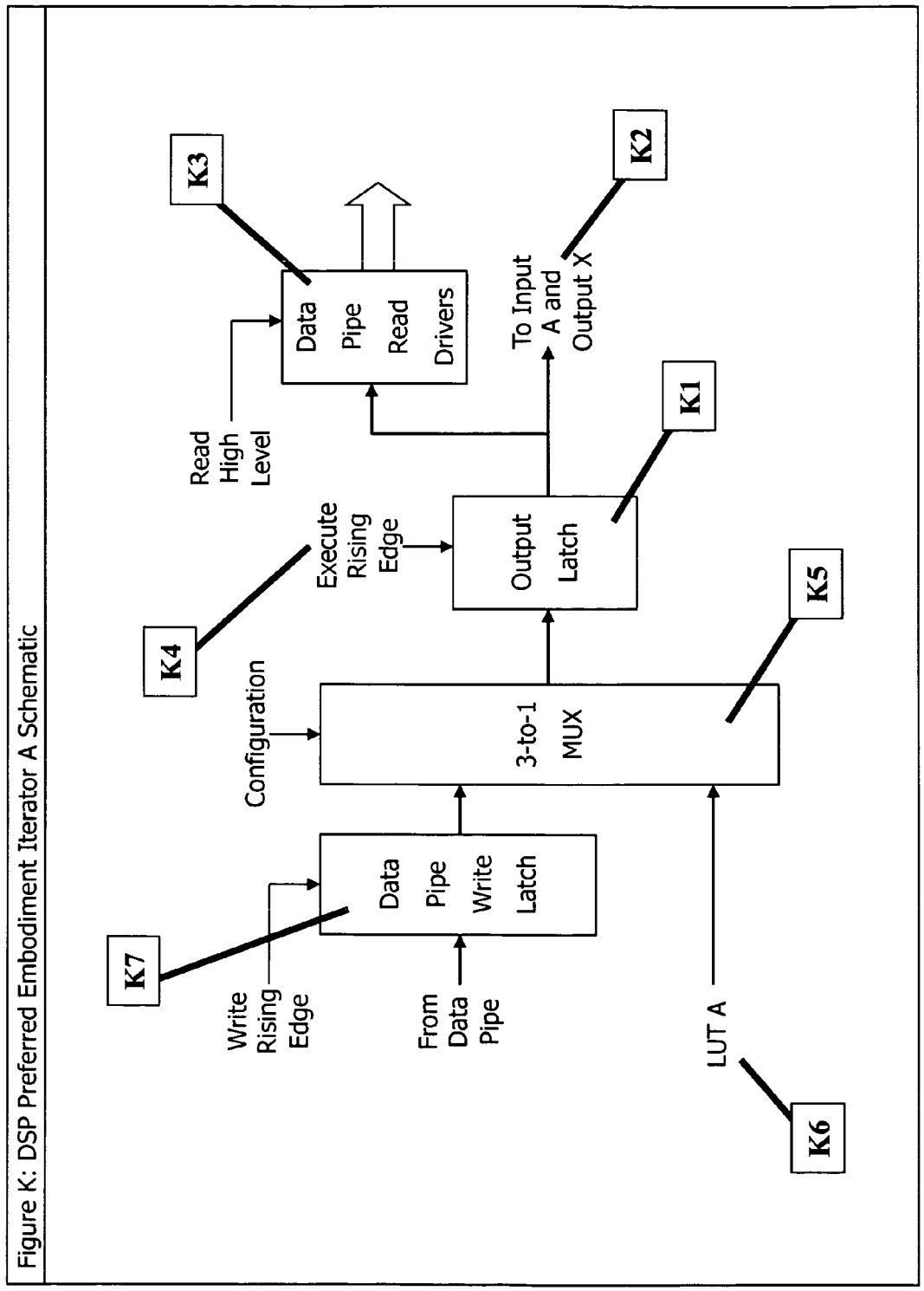

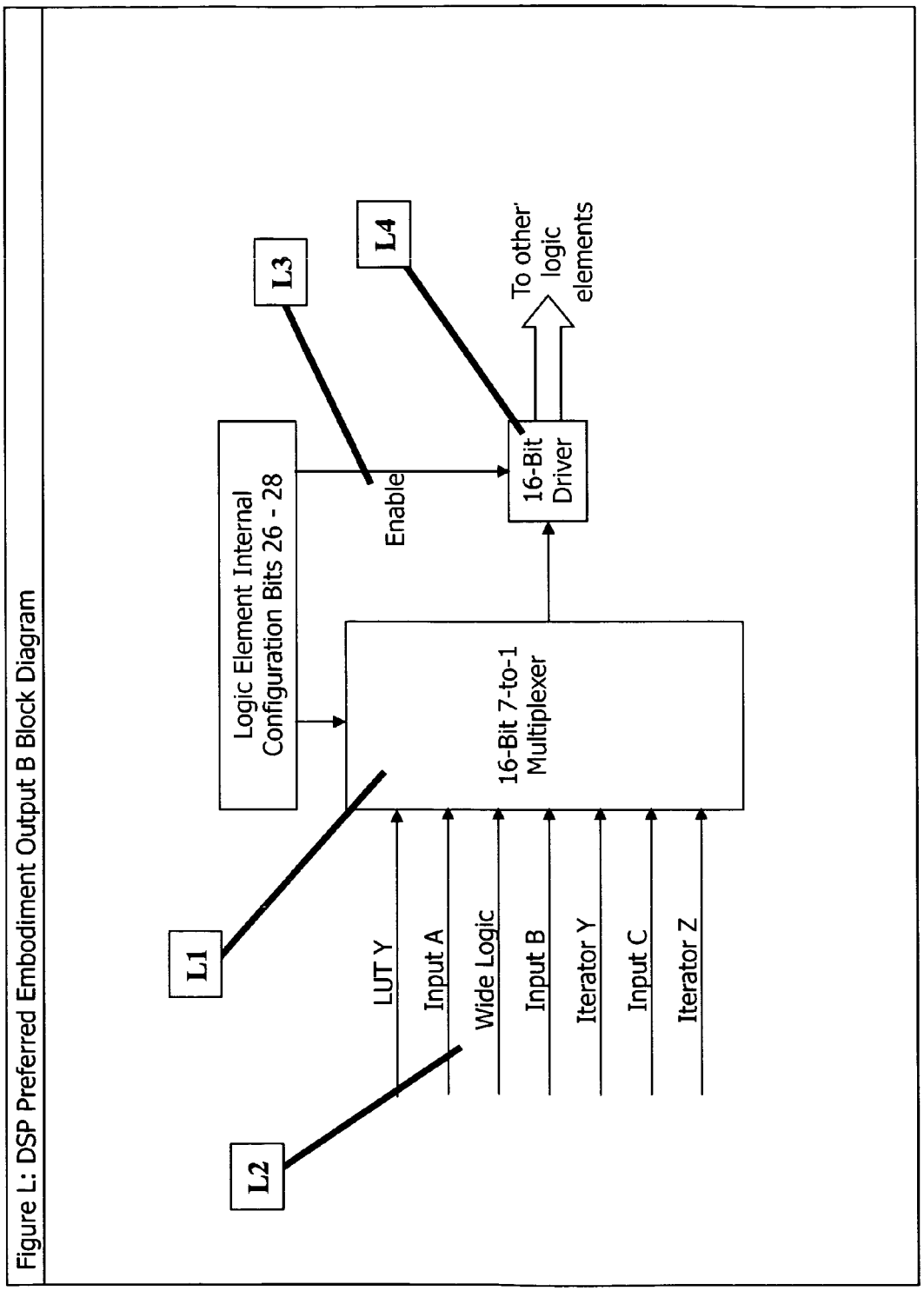

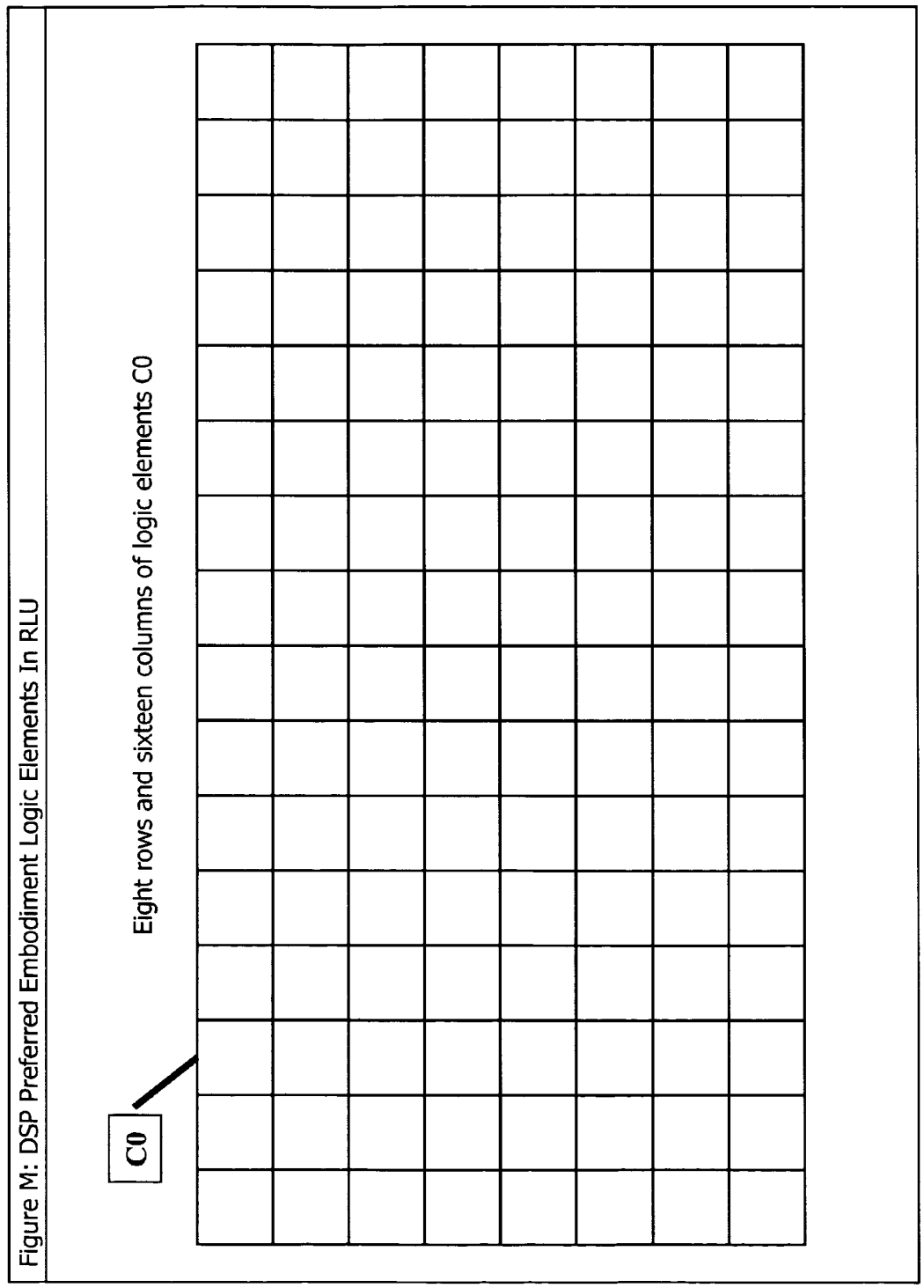
Figure M: DSP Preferred Embodiment Logic Elements In RLU
Eight rows and sixteen columns of logic elements C0
C0

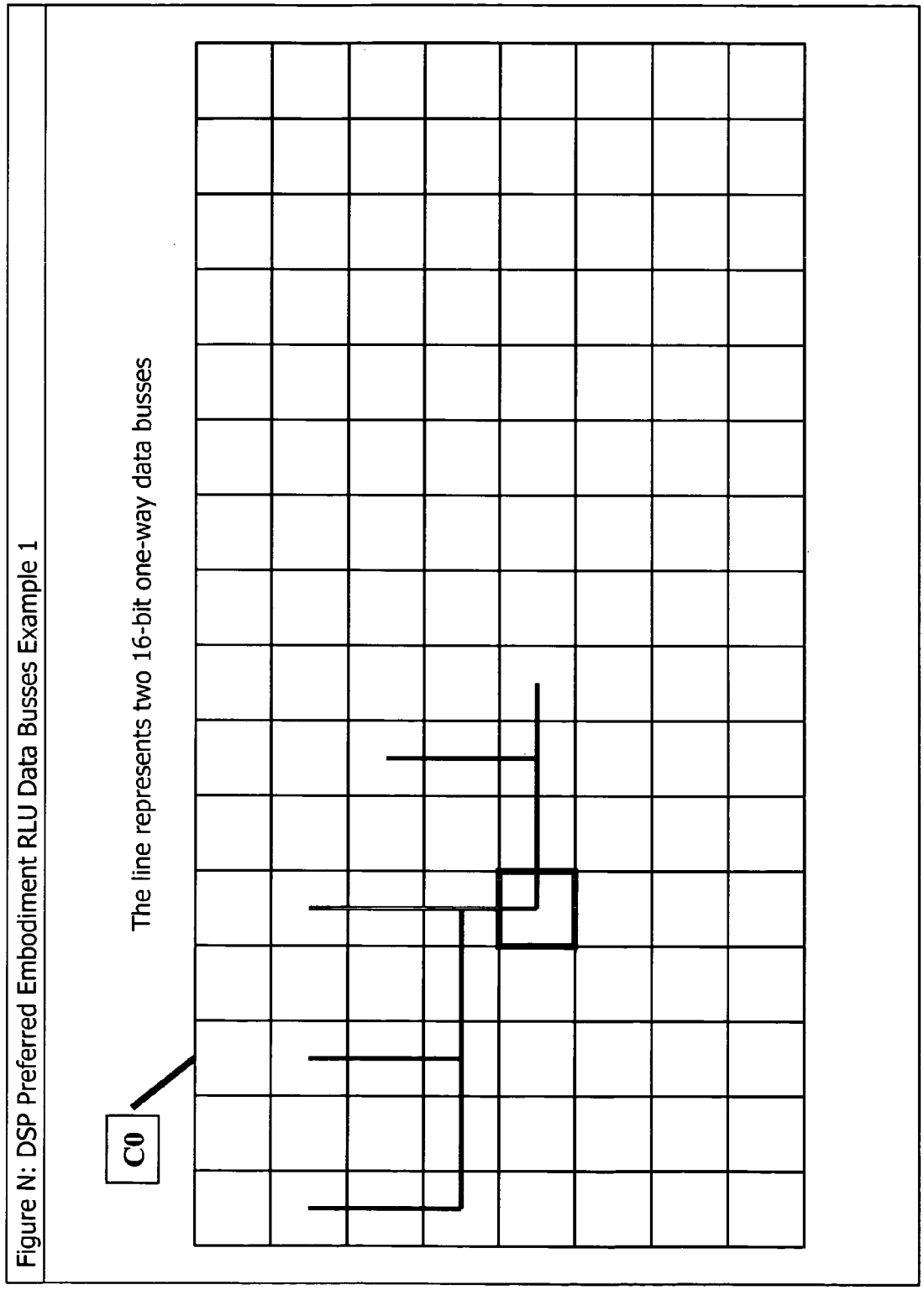

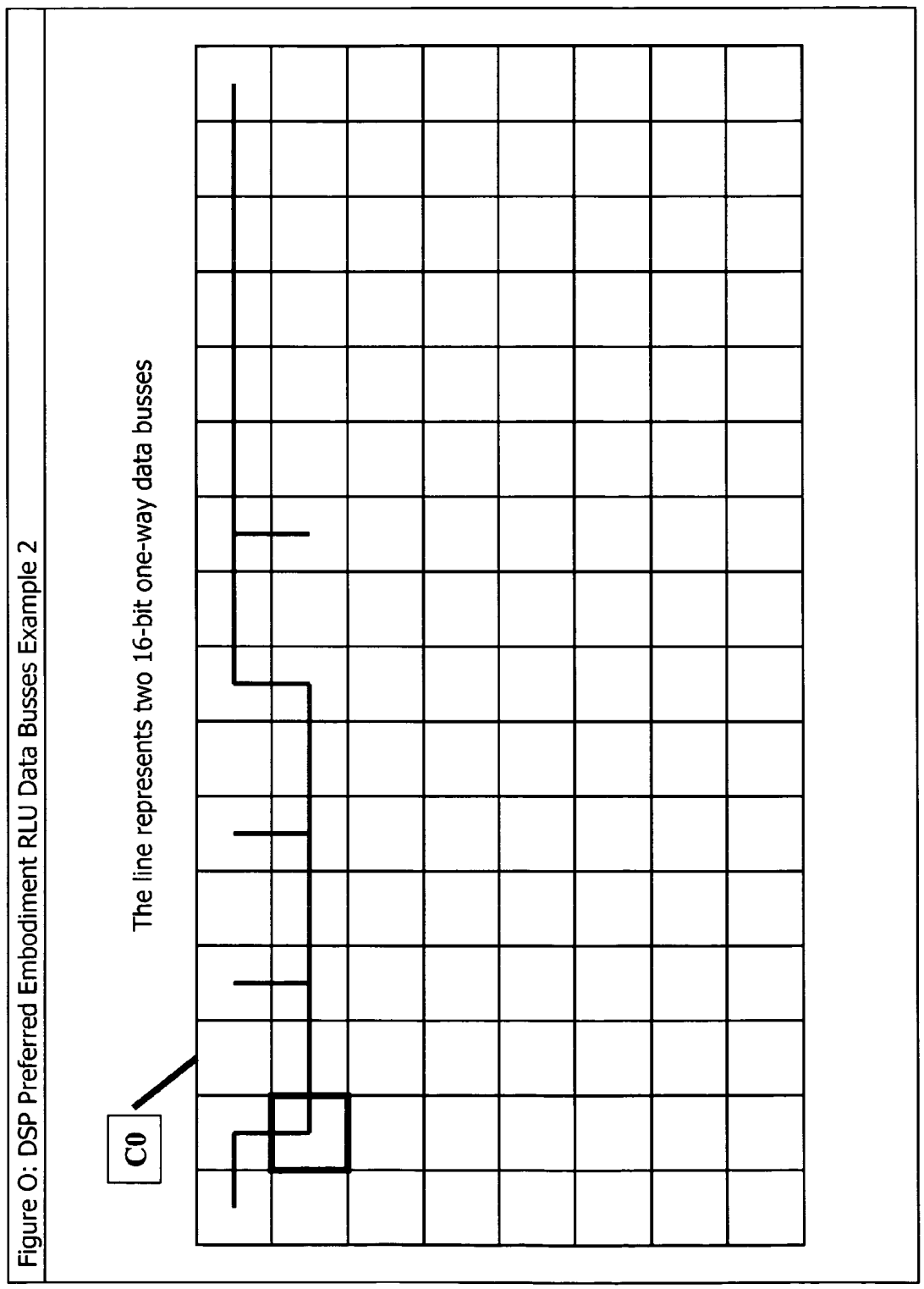

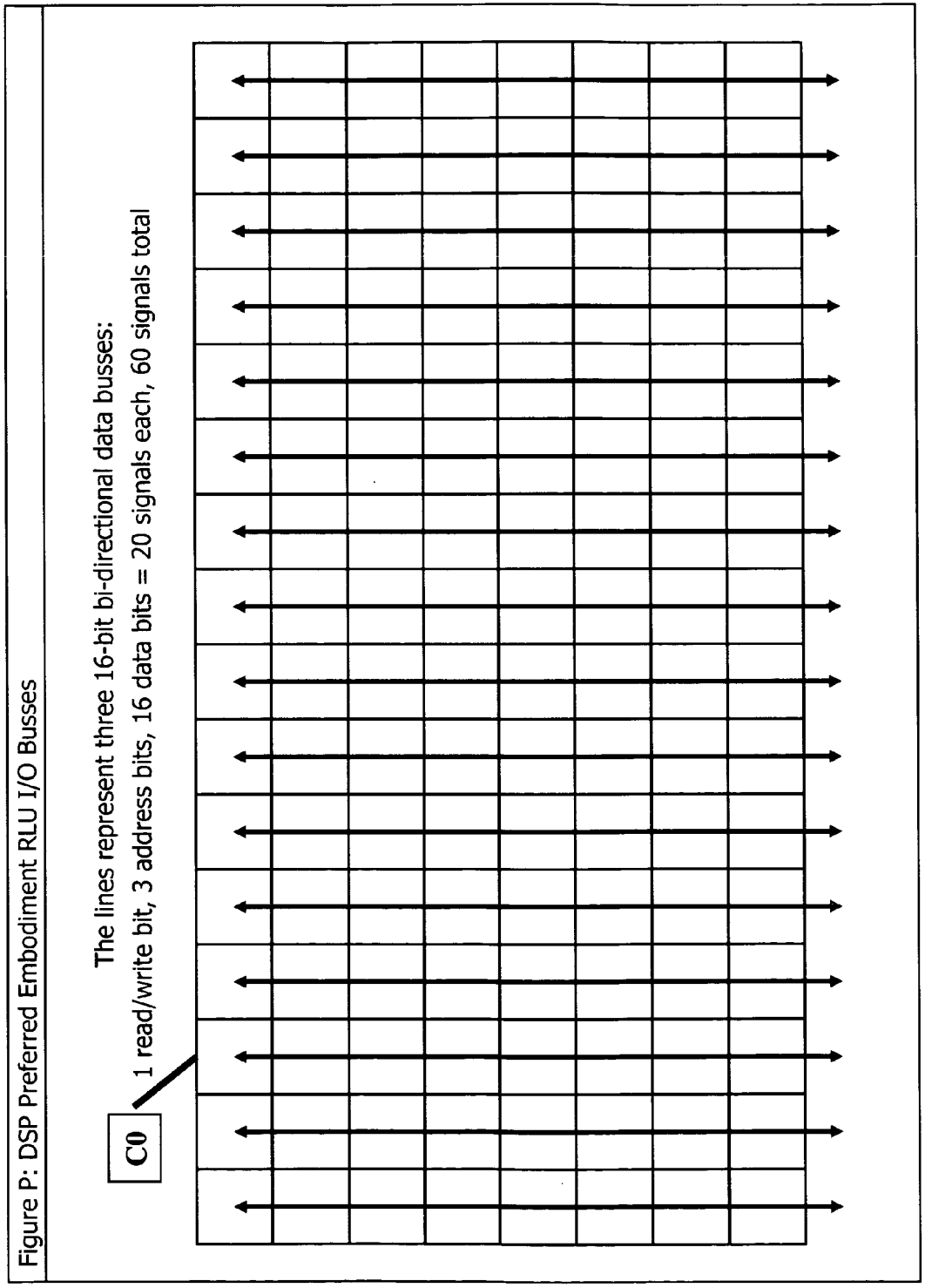

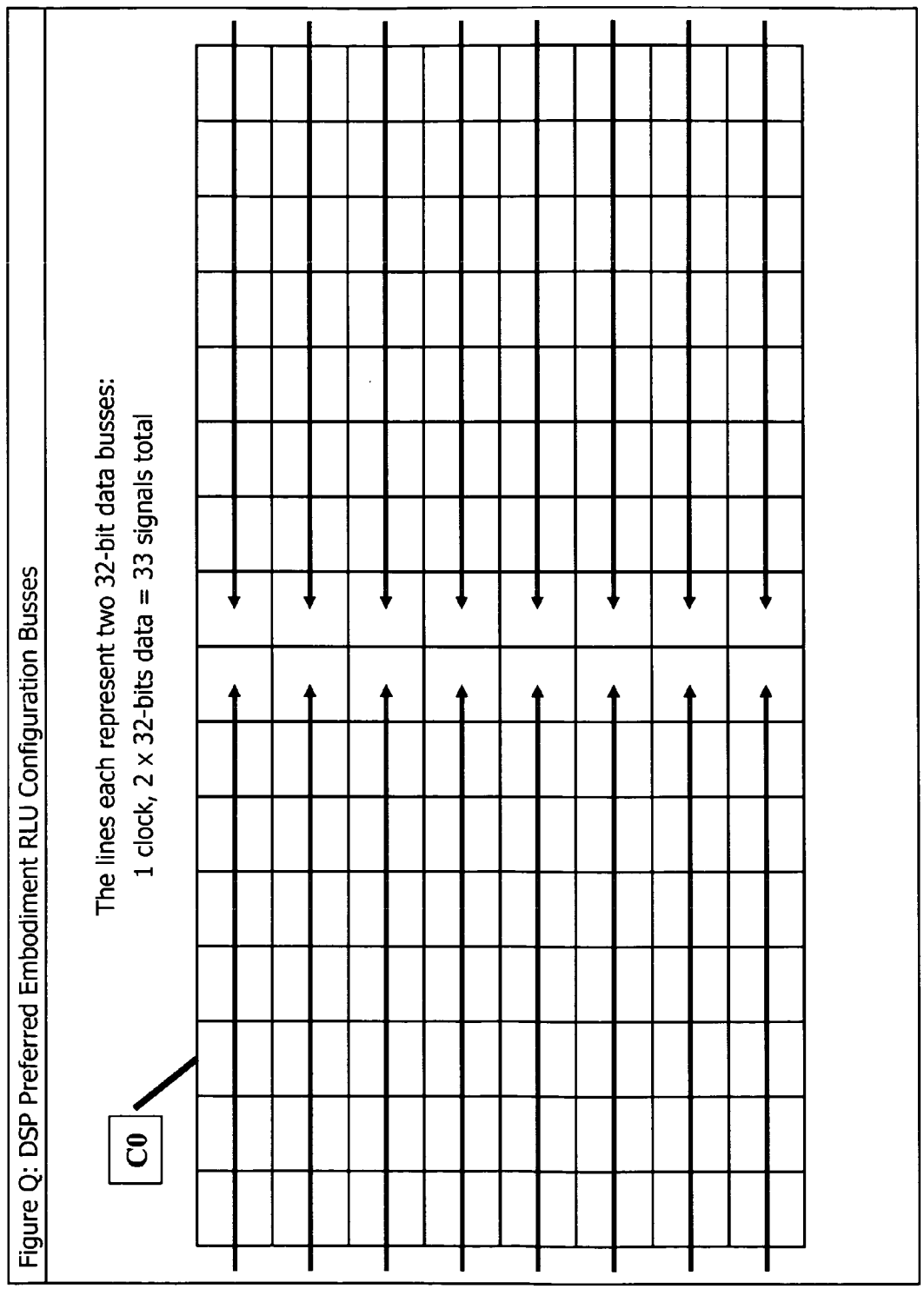

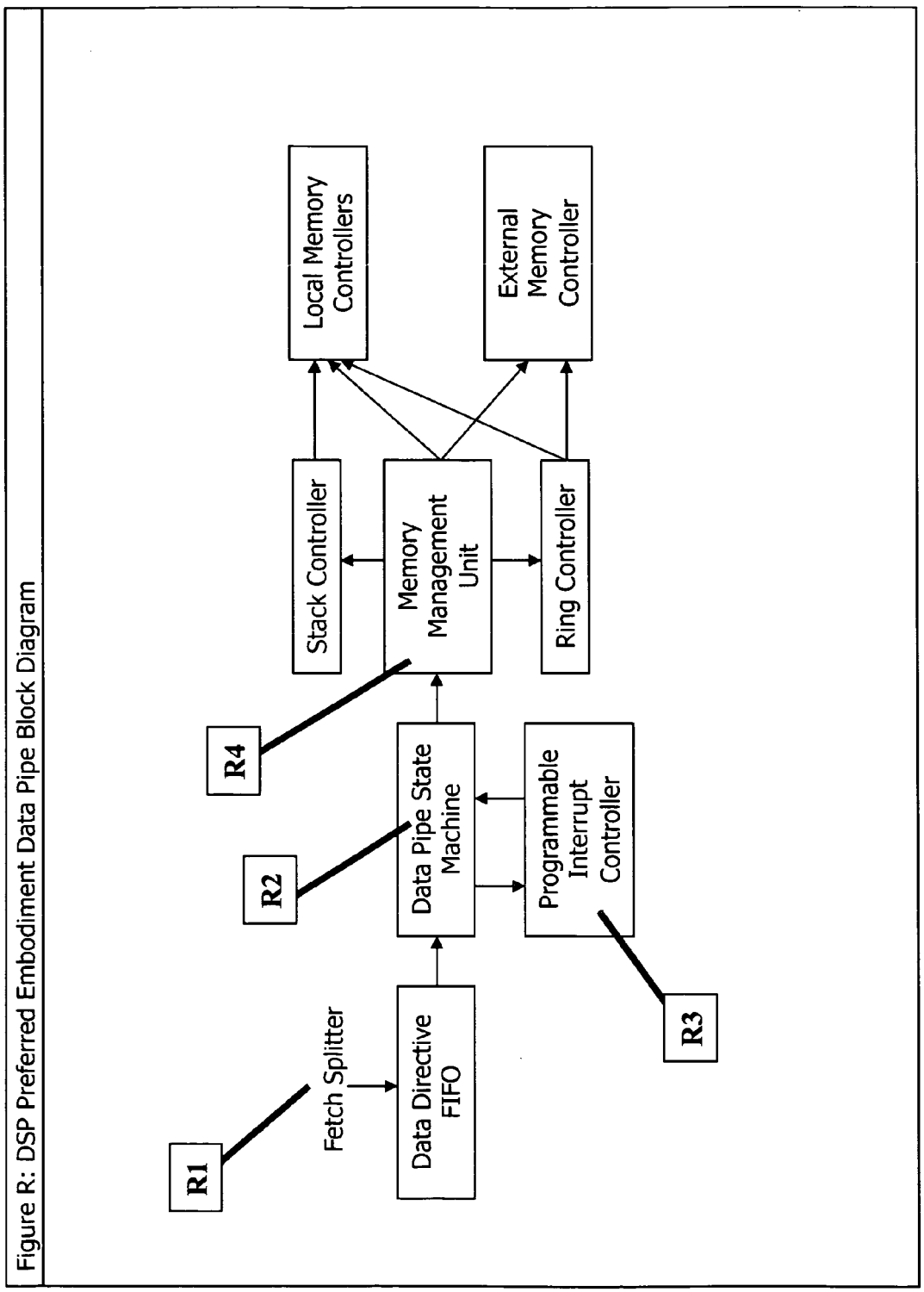
Figure R: DSP Preferred Embodiment Data Pipe Block Diagram

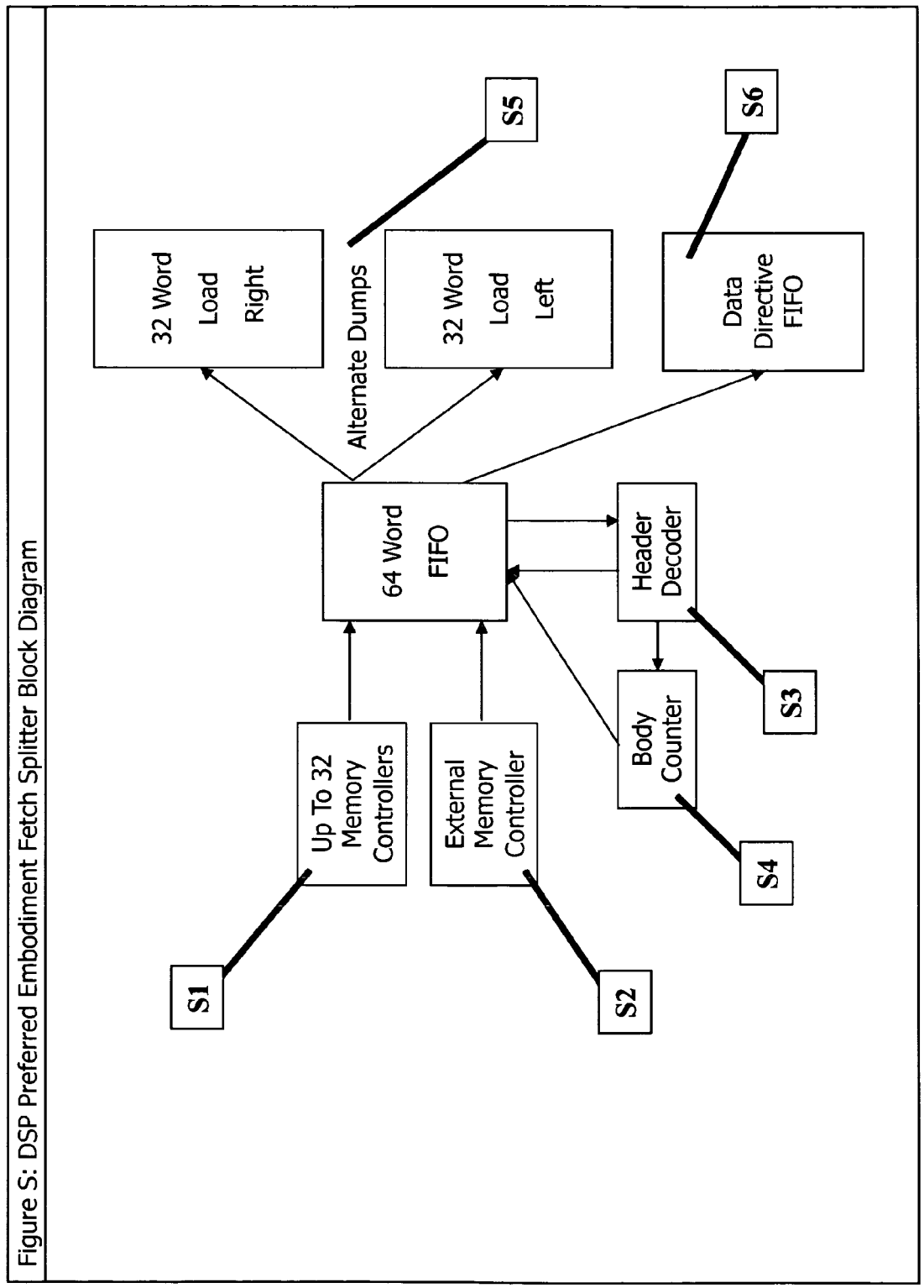

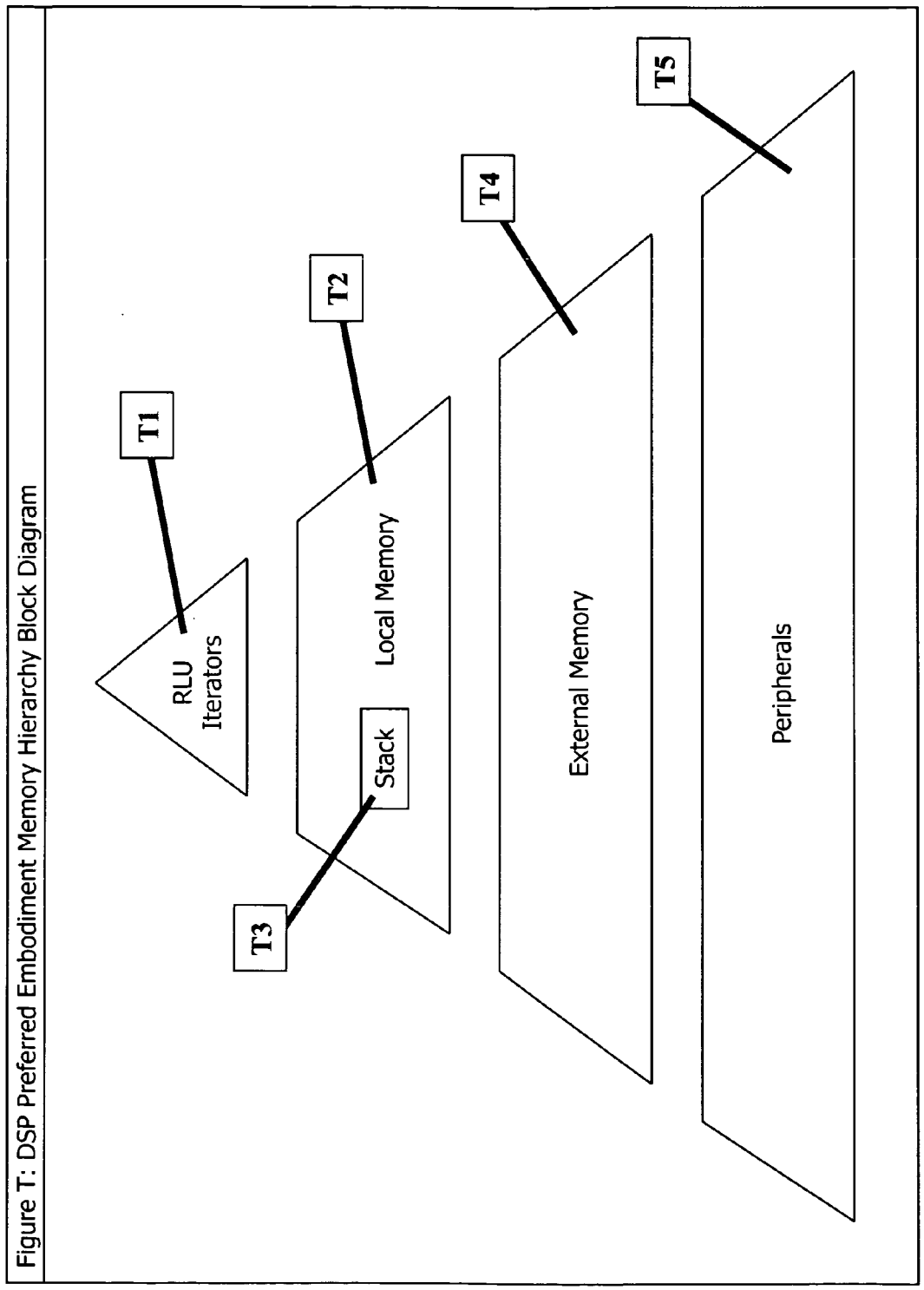

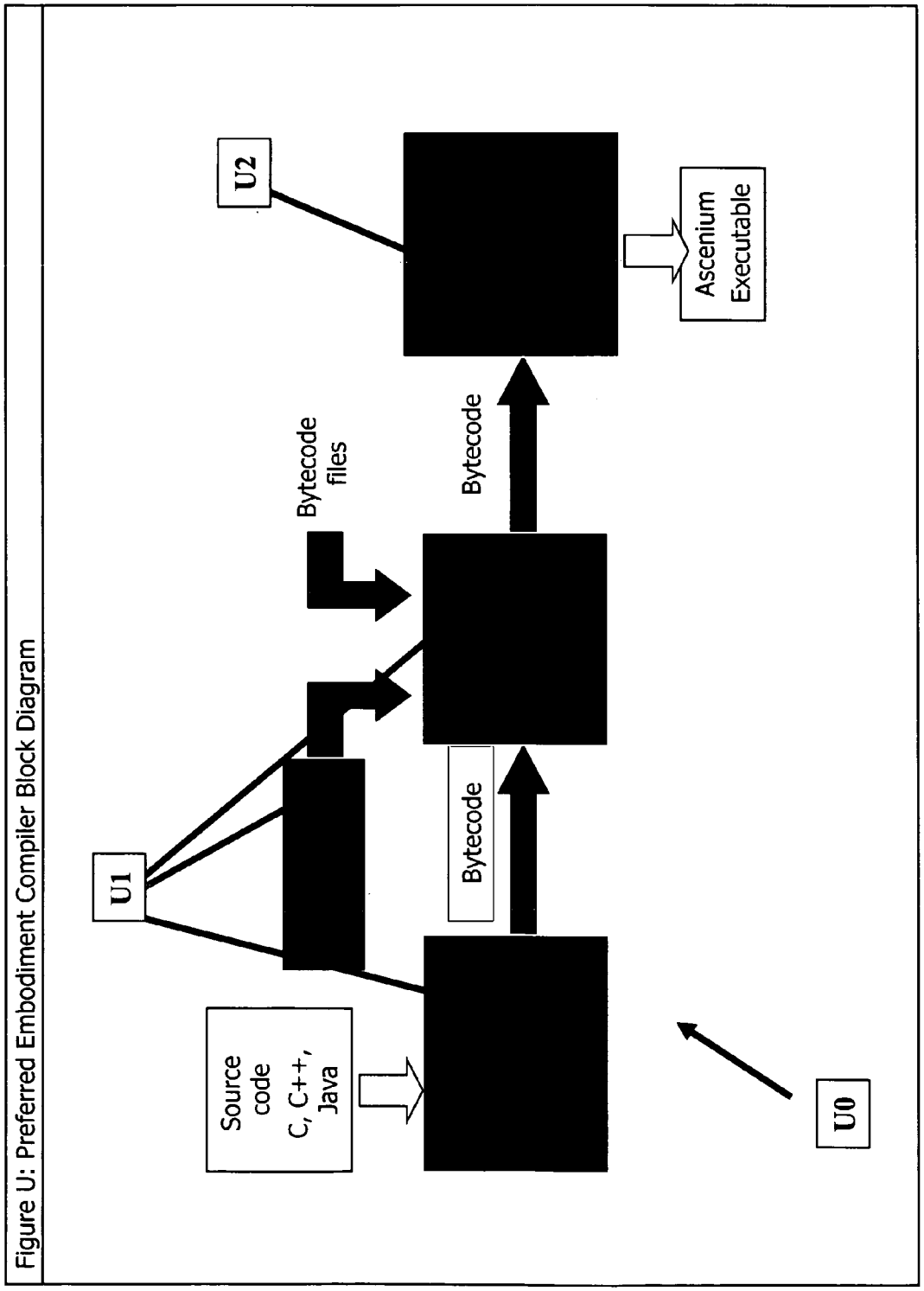

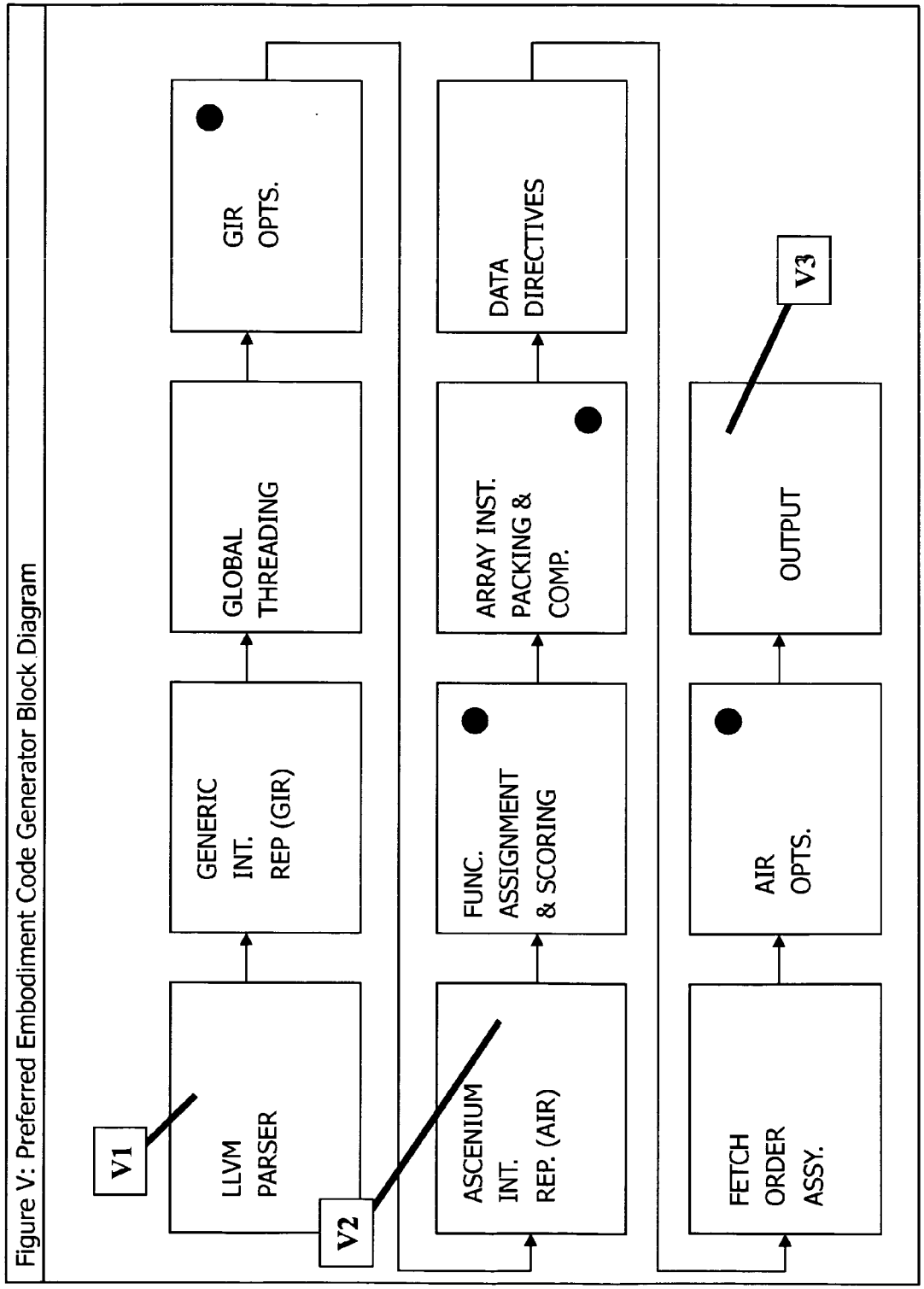

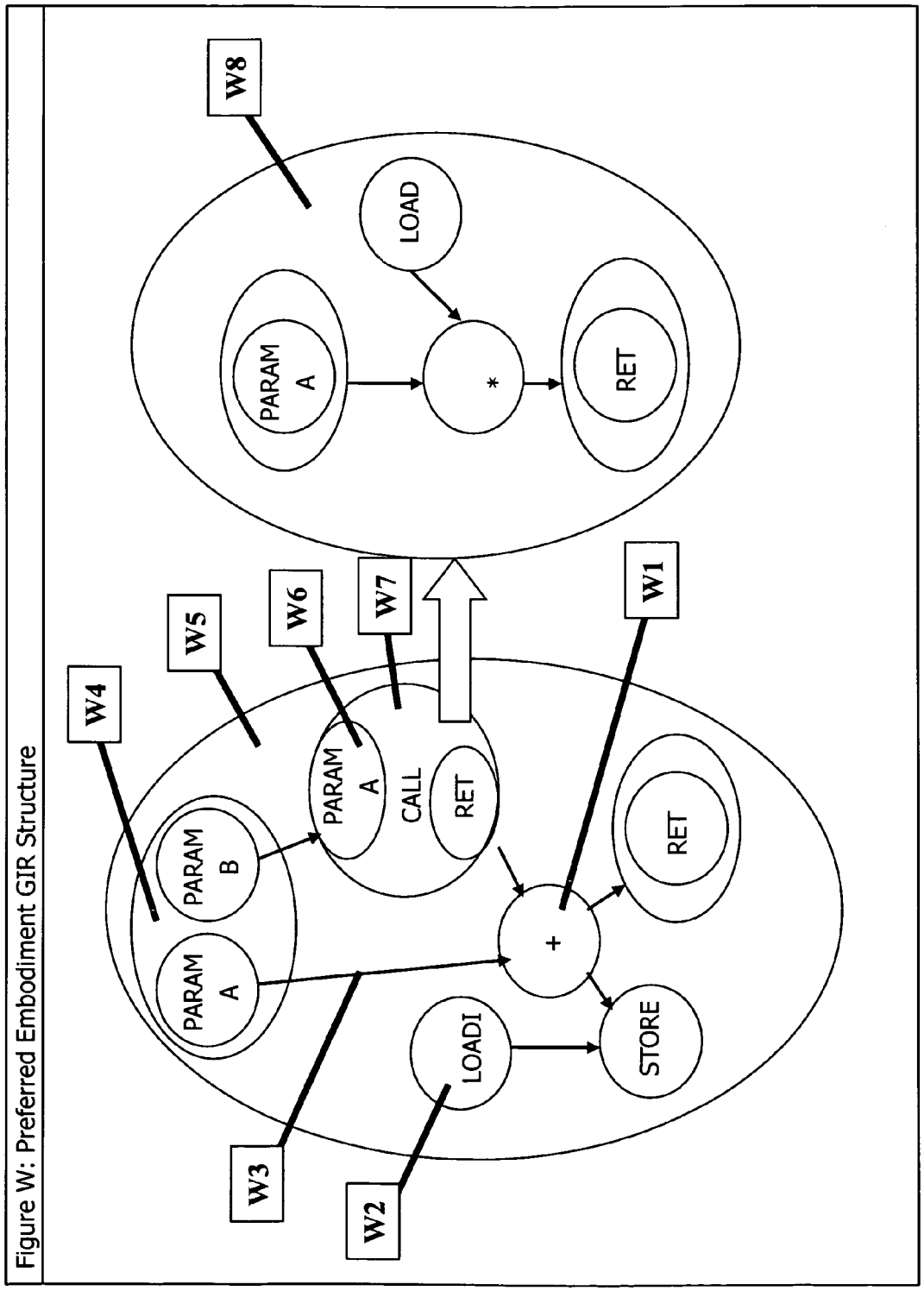

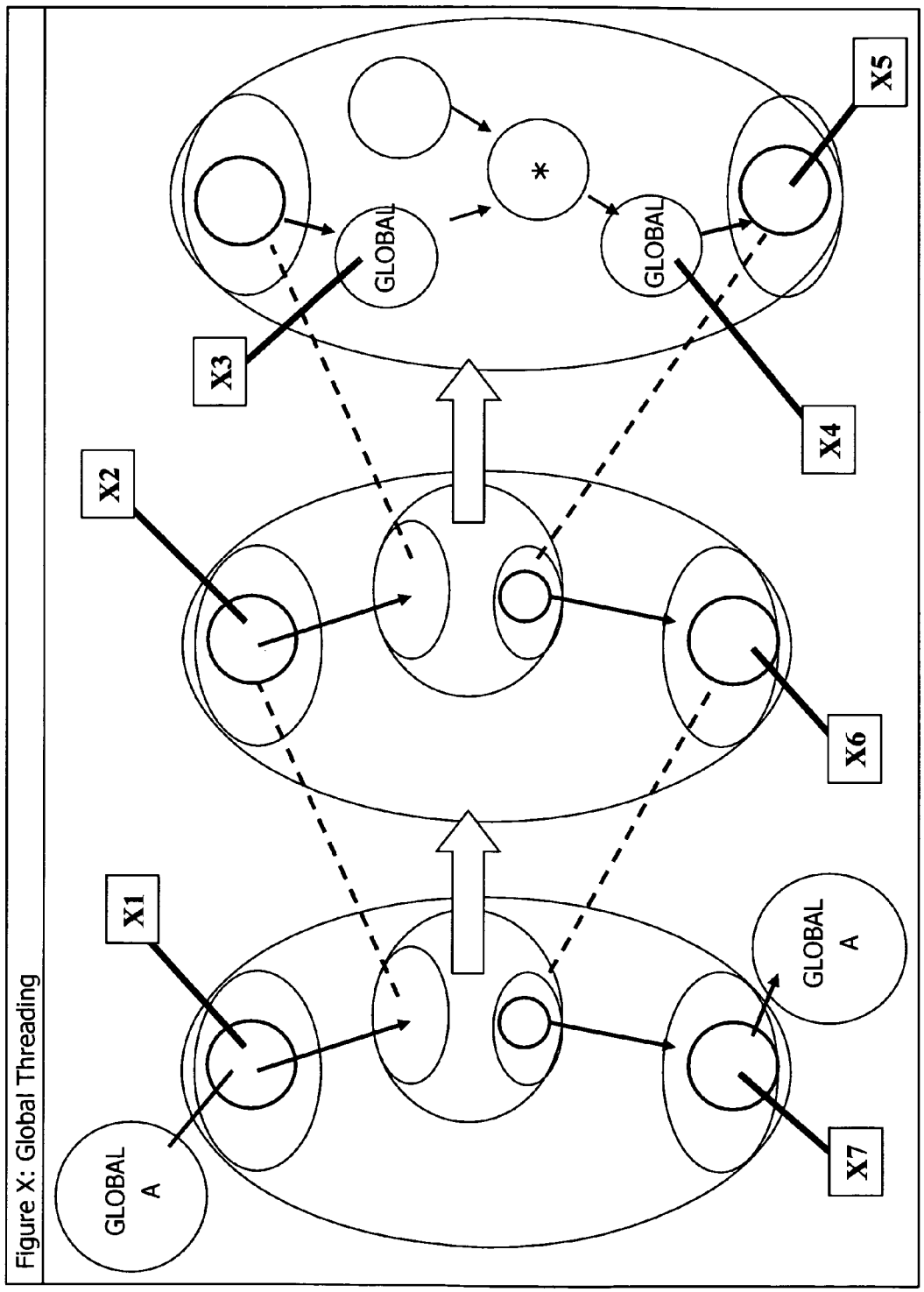

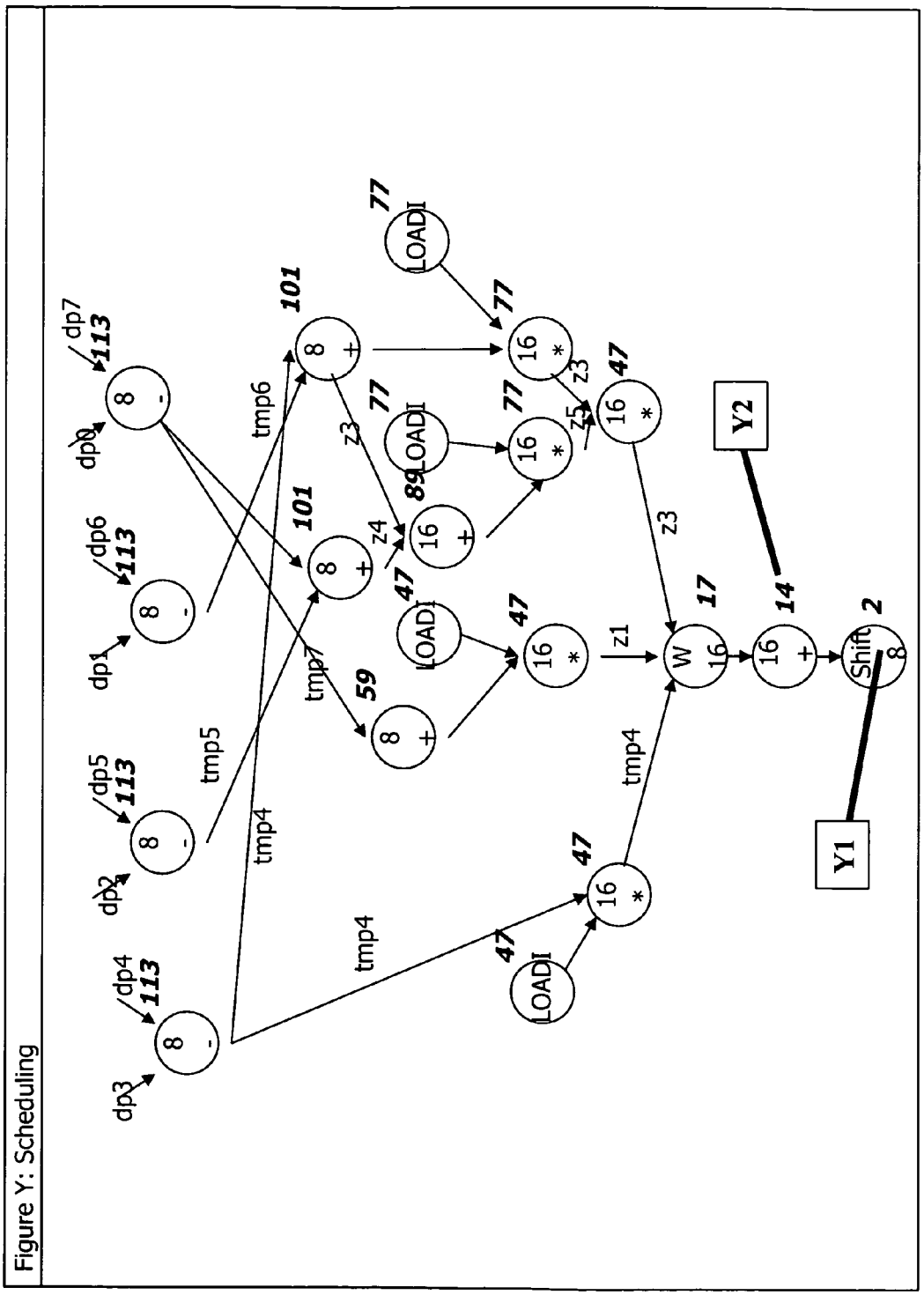
Figure Y: Scheduling

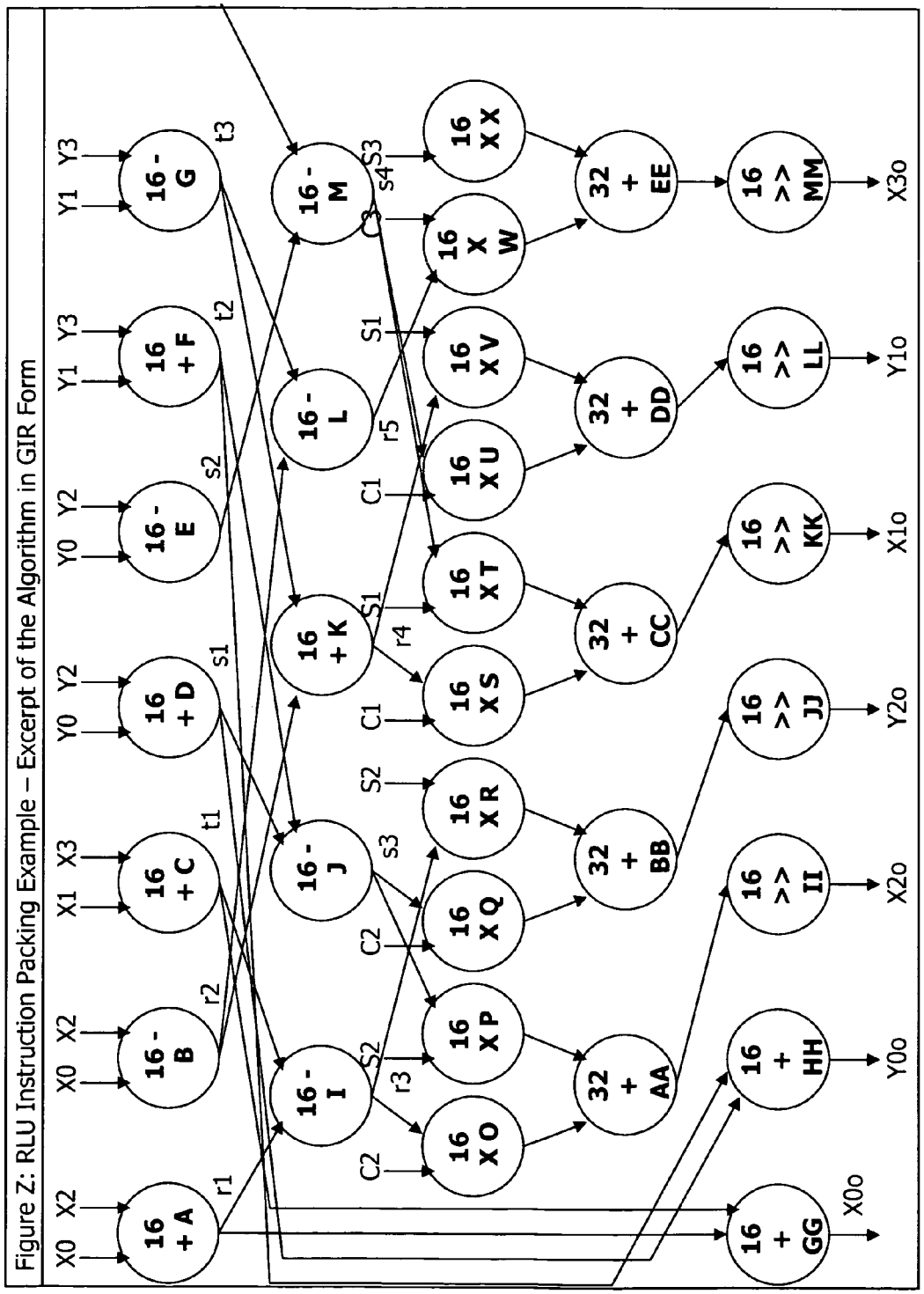

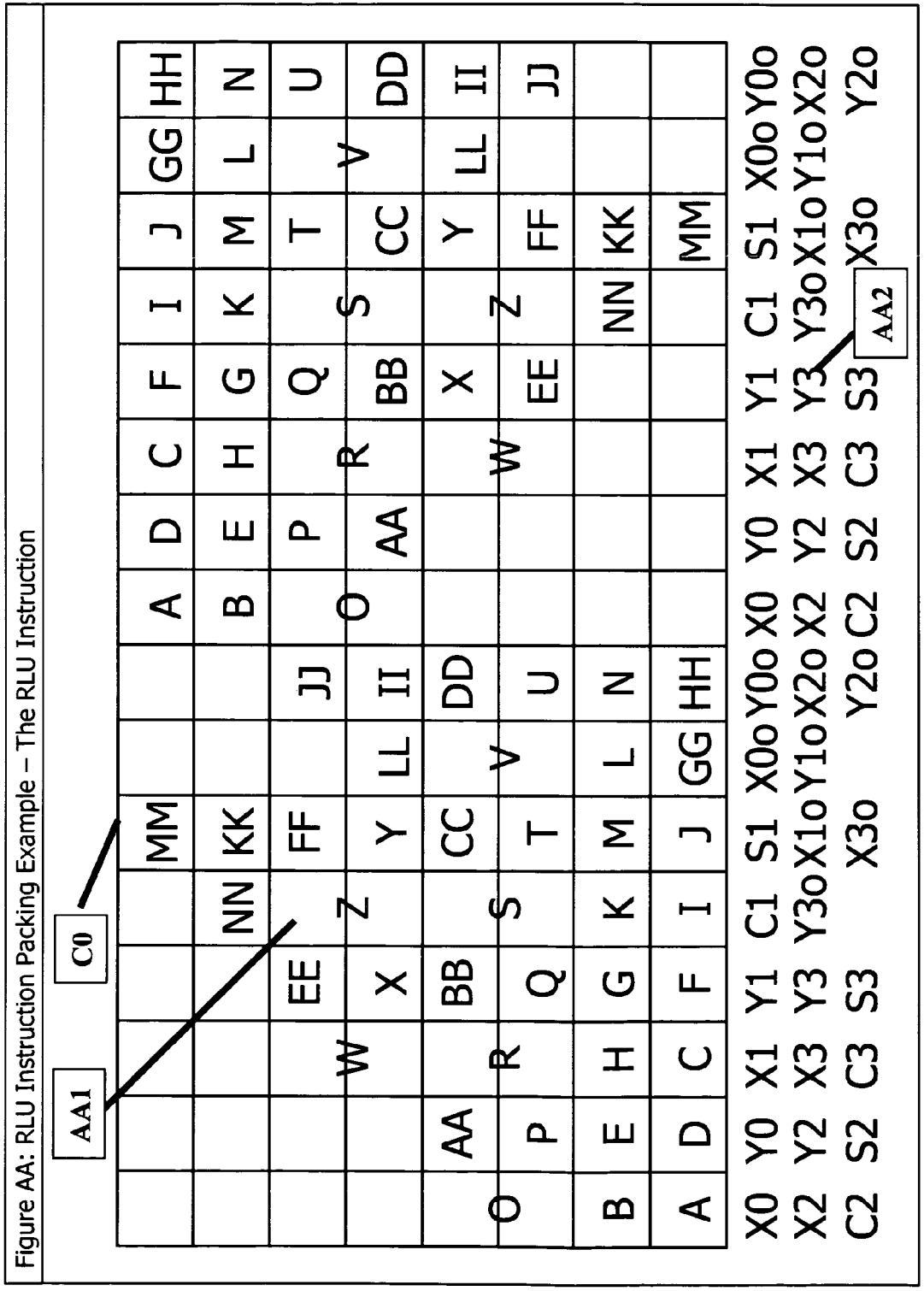

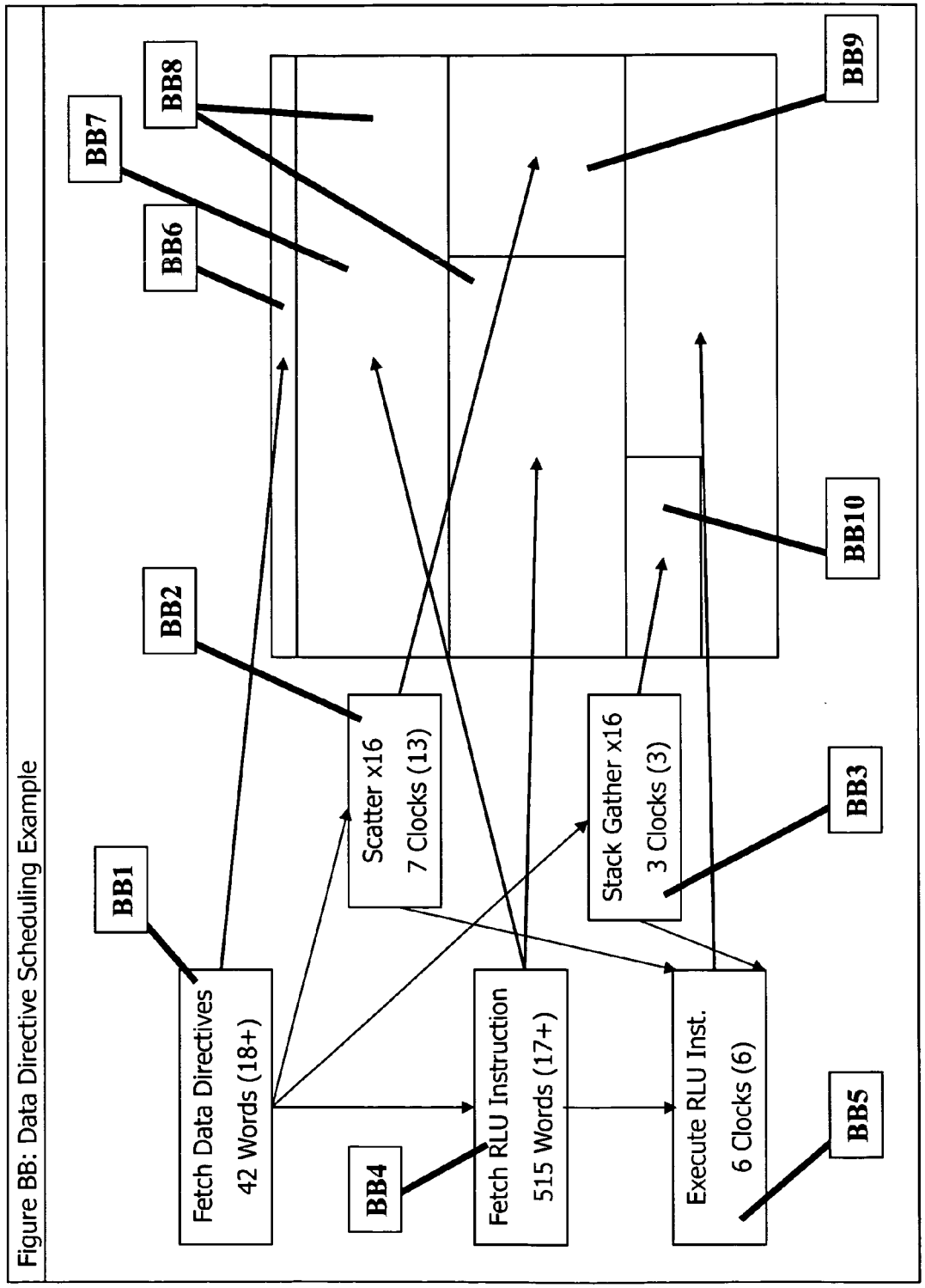

METHOD AND APPARATUS FOR DIRECTING A COMPUTATIONAL ARRAY TO EXECUTE A PLURALITY OF SUCCESSIVE COMPUTATIONAL ARRAY INSTRUCTIONS AT RUNTIME

CONTINUATION-IN-PART

This application is a continuation-in-part of U.S. Nonprovisional Utility patent application Ser. No. 10/128,940 filed on Apr. 24, 2002, now abandoned which is a continuation-in-part of Provisional Patent Application Ser. No. 60/288,986 filed on May 4, 2001. This present Nonprovisional U.S. Utility patent application does hereby claim the benefit of the priority dates of the aforementioned U.S. Provisional Patent Application No. 60/288,986 and the U.S. Nonprovisional Utility patent application Ser. No. 10/128,940. The aforementioned U.S. Provisional Patent Application No. 60/288,986 and the U.S. Nonprovisional Utility patent application Ser. No. 10/128,940 are hereby incorporated by reference in their entirety herein and for all purposes in this Patent Application.

BACKGROUND OF THE INVENTION

The present invention relates to the architecture of computing systems. More particularly, the present invention addresses requirements to flexibly apply the capabilities of reprogrammable logic to the tasks of general purpose computing.

FIELD OF THE INVENTION

Electronic information storage and management is a fundamental aspect of most business and government activities in the industrialized world. Improvements in the art of computing system design and operating method can have profound effects in the operational efficiencies of numerous organizations and entire sectors of the world economy.

It is well known in the art of computer systems design that an especially designed electronic logic circuit can often execute highly complex algorithms at rates superior to conventional general purpose computers. Yet the prior art applications and methods of using programmable logic fail to embody algorithms in programmable logic such that the reprogrammable logic can significantly and beneficially enable the general purpose application of high level computer language code and particularly event driven high level computer language code in the programming of these prior art systems.

There is, therefore, a long felt need in the art of computer design to apply the advantages of dedicated logic circuits in the execution of programs derived from high level computer languages and under the control of commercially prevalent operating systems and particularly event driven operating systems.

OBJECTS OF THE INVENTION

It is an object of the present invention to provide a computer architecture that uses reprogrammable logic in software program execution.

It is yet another object of the present invention to provide a computer system that includes reprogrammable logic and can execute at least one operating system.

SUMMARY OF THE INVENTION

According to the present invention, a computing device, or central processor, is provided. The preferred embodiment, or invented general-purpose computer, includes an integrated circuit computing device having an instruction pipe having an optional instruction decompression circuit 20, a reprogrammable logic unit, an a data pipe. The data pipe may be coupled with a data bus and/or a data source, such as a memory device or bus. The data pipe may be optionally coupled with a data target, such as a data bus or a memory, to which the computational results of the RLU are communicated via the data pipe. Alternately, the data pipe may be comprised of a separate data input pipe and a data output pipe, wherein data is communicated to the RLU from the data source via the data input pipe, and output from the RLU, e.g., computational results, are communicated to the data target via the data output pipe. The instruction pipe may be coupled with an instruction source, such as a memory device or bus. The data source, the data target and/or the instruction source may be comprised within a single memory device. The instruction pipe and the data pipe may optionally include the same communications bus circuitry in whole or in part, whereby data and instructions may be transmitted via elements of the same communications bus either simultaneously on different elements or in a multiplexed technique via one or more, or all, shared resource components of the communications bus. In certain alternate preferred embodiments of the present invention, the operating system executed by the integrated circuit computing device may be MICROSOFT NT, MICROSOFT WINDOWS 98, MAC O/S 10, LINUX, or another suitable operating system known in the art.

The data pipe is a processor used substantially for performing data movement. A computational array is a plurality of reconfigurable logic elements communicatively coupled. The inputs and outputs of a given reconfigurable logic element are communicatively coupled to a plurality of configurable logic elements using communicative coupling configuration data. The term reconfigurable is used here to include the meaning of being sequentially configurable a plurality of times. A reconfigurable logic element is a logic circuit whose behavior can be reconfigured with logic circuit behavior configuration data. A computational array instruction is: either/both logic circuit behavior configuration data and/or communicative coupling configuration data for all or any portion of the computational array.

In certain alternate preferred methods of the present invention, the reprogrammable logic unit, or RLU, may include pluralities or multiplicities of specific functional types of electronic logic circuits, to include but not limited to invented muxes, invented cones, invented iterators and/or look up tables. The outputs of certain of these functional electronic logic circuit types may be reprogrammably placed in communication with the inputs of certain functional electronic logic circuits. In certain still alternate preferred embodiments of the present invention, one or more outputs of at least one functional electronic logic circuit may be reprogrammably linked to one or more inputs of the same, whereby a functional electronic logic circuit may provide an input from an output of itself. Certain yet alternate preferred embodiments of the present invention additionally provide for the programming of the internal logic state or states of a functional logic circuit as determined in part or in whole by the computations or direction of the functional logic circuit itself.

The method of the present invention enables the application of reprogrammable logic circuits within an integrated computing circuit device in combination with the provision of instructions generated by a software compiler. The software compiler analyzes the original source code and generates instructions that program and reprogram the interconnects between the reprogrammable logic elements and enable or disable logic within the elements themselves in sequences that support the rapid execution of the commands specified by the source code.

The instructions are software commands that are generated by a software compiler or another suitable means or method of generating or creating software machine code known in the art. The compiler may maintain a model of part or of the entire reprogrammable logic unit. The compiler accepts a source code and creates a series of instructions that enable the effective programming of the reprogrammable logic unit and cause the reprogrammable logic unit to execute the commands of the source code when the reprogrammable unit is executing the resultant instruction or series of instructions generated by the compilation of the source code. In certain preferred embodiments the source code may be in higher-level languages, such as C, C++, JAVA, or other suitable programming languages known in the art.

Certain preferred embodiments of the present invention include novel and invented electrical circuits and novel and inventive combinations of the invented circuits that have newly invented circuits and/or prior art circuits. A newly invented data mux circuit, or mux, may be configured to effectively perform data processing of general logic and math data, it may be configured to effectively create partial products for multiplication operations, and/or to perform bit shifting or bit selection. A newly invented cone circuit, or cone, is useful for the digital data processing actions of parallel carry, parallel borrow, basic logic on a large number of inputs, and the counting of leading zeroes. A newly invented iterator circuit, or iterator, is useful for input/output actions to/from the data pipe and for storage of results from one execution cycle to subsequent execution cycles. Prior art look up tables and each of the newly invented mux, cone and iterator circuits are implemented solely or in combination in certain alternate preferred embodiments of the present invention.

A preferred embodiment of the data mux circuit has three inputs (data) feeding into eight three-input AND gates enabled by eight bits of RAM (instruction space). Each of the AND gates has one of eight possible configurations of straight and inverted signals.

Eight outputs of the eight AND gates may then be connected to an eight input OR gate, from which a single data logic level output is produced. Since only one of the AND gates can be high at any given time, the logic of this circuit can be embodied in eight multiple enable buffers tied to the eight RAM bits. The title of mux was chosen for this newly invented circuit from the fact that the input stage is logically a three to eight demultiplexer. One of the possibilities of certain preferred embodiments of the present invention is to provide a reconfigurable logic unit, or RLU, that does digital math and logic processing. Here are some of the functions that the mux may be configured to perform:

Two or three input logic circuits, such as:
A xor B is 0x66;
A and B and C is 0x80; and
A or B or C is 0xFE.
Many useful digital math circuits, such as:
Sum bit of an add is 0x96;
Difference bit of a subtract is 0x69; and
Carry bit of a Wallace tree node is 0xE8.

A plurality of muxes can be configured to produce the results of partial products. Given the basic mux circuit described above, instead of the RAM bits feeding into the eight buffers, one could design a mux having the outputs of eight surrounding muxes (as one possibility) feeding into the eight buffers the mux. For a general partial product bit, the result could be programmed as follows:

For multiplier bits A, B, and C and multiplicand bits X and Y:
Mux 0 gives 0 and feeds into bit 0 of the master mux;
Mux 1 gives Y and feeds into bit 1 of the master mux;
Mux 2 gives Y and feeds into bit 2 of the master mux;
Mux 3 gives X and feeds into bit 3 of the master mux;
Mux 4 gives /X and feeds into bit 4 of the master mux;
Mux 5 gives /Y and feeds into bit 5 of the master mux;
Mux 6 gives /Y and feeds into bit 6 of the master mux;
Mux 7 gives 0 and feeds into bit 7 of the master mux; and;
The master mux buffers being controlled by A, B, C.

Partial products and other similar complex logical quantities may thereby be created in muxes. Other suitable eight-mux operations could be combined this way.

Muxes may also be configured for bit shifting or bit selection. Instead of eight RAM bits, eight data inputs could be applied to the eight buffers of a mux. If the three mux inputs were a binary number, that data bit would be propagated through the circuit. This would allow one to logically shift among eight signals. One stage of such a circuit could shift or rotate a number right or left by up to seven bits. Two stages would shift up to 63 bits, and so on.

The title cone was chosen for the cone circuit from the word concentrator and the sense that these circuits are here to provide a fan-in capability. Cones configured for carry and borrow operations may have one of the following forms:

Mode zero is for higher stages of parallel carry or borrow;
Mode one is for parallel carry inputs;
Mode two is for the low eight input bits of parallel borrow; and
Mode three is for input bits higher than eight in a parallel borrow.

Modes one, two, and three accept the first operand on the low eight input bits and the second operand on the upper eight input bits. They output the eight parallel carry products on the low eight outputs. On the upper eight outputs they provide the OR products of the input bits (i.e. bit 3 of this would be (a0|b0) & (a1|b1) & (a2|b2) & (a3|b3)).

Mode zero accepts partial carry products from other cones on its low eight bits and OR products from other cones on its upper eight bits, using these to form higher order carry bits.

Cones are also useful for logical operations involving more than three inputs. Sometimes such operations are required in great numbers. A common need for this in digital math is counting leading zeroes and testing large numbers of bits equal to zeroes or ones.

In mode 4, for example, the cone meaning of the 16 cone outputs may be as follows:
0: AND of 16 inputs;
1: NAND of 16 inputs;
2: OR of 16 inputs;
3: NOR of 16 inputs;
4-7: A number between 0 and 15 specifying the position (from the left) of the first one in the inputs;
8: AND of lower 8 inputs;
9: NAND of lower 8 inputs;
10: OR of lower 8 inputs;
11: NOR of lower 8 inputs;
12: AND of upper 8 inputs;
13: NAND of upper 8 inputs;
14: OR of upper 8 inputs; and
15: NOR of upper 8 inputs.

An iterator circuit may be configured to perform input and output latch functions. To transition from the clocked circuitry of the data bus and the data pipe to the settling time world of the RLU, input and output latches may be required. The iterator may be used as either an input or output latch to the RLU. The title of iterator for this invented circuit comes from the latch's ability to store data from execution cycle to execution cycle (see below). It may be constructive to imagine an iterator as dual ported RAM.

It is may be useful for previous execution cycles to store data across execution cycles for future execution cycles. Iterators can be used for this purpose. Such iterators would not require the circuitry used for communicating with the data pipe.

Certain preferred embodiments of the present invention include look up table circuits, or look up tables. Various digital math algorithms such as Newton-Raphson iterations, Radix-4 and higher SRT division, etc. use lookup tables as an integral part of the circuit. To this end, sufficient lookup tables can be provided in the RLU.

Wallace tree reductions can be effectively performed in certain preferred embodiments of the present invention. As a partial product generation and the Wallace tree reduction step in a multiply may determine the maximum of pipelined performance in a loop, these connections could be optimized with their own single hop connection scheme. Direct addressing of groups of muxes for the following multiply sizes could be implemented according to the method of the present invention: 8 bits signed and unsigned, 16 bits signed and unsigned, 24 bits unsigned (for 32-bit IEE-754 floating point multiplies), 32 bits signed and unsigned, 54 bits signed (for 64-bit IEEE-754 floating point multiplies), and 114 bits signed (for 128 bit IEEE-754 floating point multiplies). These approaches may be advantageous when doing digital math because the connections will be faster and the instructions that create them will be smaller.

The present invention may optionally comprise a circuit designed into the RLU that ignores signal transitions for a certain period of time. After this period of time has passed, a low signal on the output signals to the instruction and data pipes that the execution cycle has completed. This invented aspect of the present invention allows valuable software programming techniques based on statistically improved execution times to be applied in generating and executing instructions for the invented general-purpose computer. Tremendous amounts of thought have gone into software algorithms that are optimized for more frequent cases at the expense of less frequent cases. These algorithms can now be applied to the instructions developed according to the method of the present invention. Furthermore, optimizing the algorithm towards the most frequent cases is a valuable software engineering technique. The method of the present invention optionally enables programmers to apply this method in either individual or multiple instructions generated for execution by the invented general-purpose computer.

In an example implementation, a clocked active low enable (/ENA) would run into a NOR gate along with the active low signal representing whether the circuit was done or not (/DONE). The /DONE signal would have to be stable by the time /ENA went low. Several decision points in the code could be examined in this way, each with different /ENA signals guaranteeing their stability. Their results could be ORed together to get an overall signal requesting the end of the execution cycle.

The method of the present invention further optionally enables a novel and inventive method of executing loops and/or decision trees. It is this realization: if your instructions are as large as instructions may be in certain alternate preferred embodiments of the invented general purpose computer, certain operational features critical for the efficiency for conventional microprocessors, e.g. branches, dwindle in importance. Thus the penalty for loading logic that would have been skippable by a conventional microprocessor gets small compared to the advantage received by all logic executing once it is loaded.

The fine structure of conventional microprocessor code contains many conditional evaluations and branches. However, the actual logic embodied by any given high level language rarely contains raw branches. In fact it is considered bad programming practice to use them and good programming practice to avoid them. Instead, other safer logical structures such as loops, "if" statements, and "case" statements serve similar functions. In the case of loops, unless they are never executed, loading them doesn't waste code space. A smart RCPC compiler can align loops into instructions whenever possible to minimize the size of the loop instruction and provide space to unroll the loop if possible. In the case of "if" statements and "case" statements, the compiler may evaluate whether the software code inside a given block is large enough to warrant its own instruction or instructions. If so the instant code may be a candidate for conditional instruction execution. If the instant code is smaller, the amount of logic that can be rolled into a single instruction that is so large that there is not much of a penalty if some of the instruction is not actually used.

Certain alternate preferred embodiments of the present invention accept configuration data resulting from the data processing or data transmission of computational or logic elements of the invented general-purpose computer, the RLU, or the data pipepipe or data pipe. These data configurations may be used to configure the invented general-purpose computer.

The method of the present invention further optionally enables a designer of a preferred embodiment of the present invention to lay-out pluralities or multiplicities of logic elements, e.g. muxes, cones, iterators, and look up tables, and signal interconnection pathways among the pluralities or multiplicities of logic elements quantities and patterns that provide effective execution of particular digital mathematics operations, to include, but not limited to, partial product calculations and Wallace tree reductions. This optional aspect of the method of the present invention can empower a software designer, a software engineer, a software compiler designer, and/or a compiler to leverage an understanding of the configurability and reconfigurability of the invented general purpose computer to apply software engineering methods in configuring and/or using the present invention, and particularly the RLU and the data pipe in efficient patterns.

The method of the present invention further enables the optional, novel and inventive technique of enabling input of instructions to the invented general purpose computer from an off-chip or external RAM by time for width multiplexing of data from the RAM and to the instruction bus. Because modern RAM is about four times slower than modern microprocessor cores, e.g. about 400 MHz for RAM versus about 1.6 GHz for microprocessor cores, it can be useful to employ time for width multiplexing between these two circuits. This allows for a wider effective bus to the microprocessor (e.g., by a factor of four) for a given microprocessor pin count. If it desirable to use cheaper RAM, or if microprocessor cores can get easily faster, one can produce an even higher speedup by providing a larger multiplexing factor. Current memories run at about 400 MHz (2.5 nS cycle time) in row access mode. When conventionally addressed they are slower. Clearly row access should be used whenever possible with truly random access possible but used only as a last resort. Most modern bus sizes are about 64 bits wide. This gives a theoretical throughput of approximately 3 gigabytes per second. The highest pin counts for integrated circuits are in the 1,600 pin range. To stay manageable one could use 512 pins for data I/O. This alone would provide a factor of eight speed increase over most current commercial microprocessor ICs.

The following signal descriptions describe an example implementation in accordance with the method of the present invention that would convert an eight-bit bus to a 32-bit bus:

UCLK: This clock would be driven by the microprocessor during writes and the multiplexer during reads. It makes signals across the microprocessor side of the bus impervious to skew;

R/W: This signal tells the multiplexer whether the microprocessor wants to read or write during the next operation;

UDx: Eight bi-directional data bus signals between the microprocessor and the multiplexer;

A/D: This signal tells the multiplexer whether the microprocessor is sending an address or data;

/RD: Read line to memory;

/WR: Write line to memory;

Ax: 32 address lines to memory; and

MDx: 32 bi-directional data lines to memory.

The method of the present invention further provides an optional technique of logic dependent instruction execution, wherein, based on a result derived by the RLU, the instruction pipe might decide to continue executing the current instruction or execute a next and loaded instruction. This optional invented technique provides that an instruction need not be loaded before the start of execution, and avoid bottlenecking of a loop by instruction loading. Because new instructions need not be fetched during a loop of sufficiently small size, the incidence of delays in loop execution caused by instruction loading may be reduced. In a preferred and inventive application of this optional aspect of the method of the present invention, at or shortly after the time each instruction execution cycle completes, the instruction pipe looks at a flag bit from the RLU to determine whether to release the back instruction into the front buffers.

The method of the present invention further provides an optional technique of logic dependent instruction fetching, wherein, on the basis of a signal produced as a result from data processing by the RLU, the instruction pipe, might decide to start fetching a particular instruction from two or a plurality of instructions for loading into the back buffer. It would sometimes be useful if this signal and its associated data were available before the end of instruction execution, as it would be efficient to overlap the loading of the new instruction with a current instruction execution. It is also likely that the current instruction could continue to do useful work after the invented general-purpose computer had determined that a new instruction needed to be loaded. Stored instructions may already exist in an optional plurality of back buffers of the invented general-purpose computer. These stored instructions could be valid, executable "bubble filling" instructions or they might be flushed. The signal should also indicate how existing instructions should be handled. Certain alternate preferred embodiments of the present invention that include this optional invented technique may reduce unnecessary processing activity by not executing instructions that won't yield valuable results. In one example application of the optional, novel and invented technique of logic dependent instruction execution, the invented general-purpose computer can provide a logic signal that is enabled from a timed clock circuit at some point during the execution (see logic dependent instruction execution times above). Along with this would be dedicated registers containing the address of the instruction to load and flag bits indicating what to do with the currently loaded instructions.

The method of the present invention further provides an optional technique of instruction swapping, wherein the invented general purpose computer, based on a result from the data processing activity of the RLU, the instruction pipe can be commanded to swap a foreground instruction with a background instruction during the next execution cycle. This optional, novel and invented technique of instruction swapping can provide the present invention with an ability to swap instructions and prevent unnecessary reloading during large loops. An preferred embodiment of the invented technique of instruction swapping may include the following steps:

A) An instruction A is loaded from the back buffer to the front buffer and begins executing;

B) Meanwhile, an instruction B is loaded into the back buffer;

C) After some delay but still during execution, instruction A is copied into a side buffer;

D) The execution cycle for instruction A ends;

E) Instruction B is loaded from the back buffer to the front buffer and begins executing;

F) If a swap is indicated, instruction A is loaded from the side buffer into the back buffer; and G) After the side buffer to back buffer load is safely complete, instruction B is copied into the side buffer.

The method of the present invention further enables an optional clock to width multiplexing of data from the invented general-purpose computer and to external and/or off-chip RAM. Because modern RAM is about four times slower than modern microprocessor cores (about 400 MHz for RAM versus about 1.6 GHz for microprocessor cores) it is useful to employ time for width multiplexing between these two circuits. This allows for a wider effective bus to the microprocessor by a factor of four for a given microprocessor pin count. If it desirable to use cheaper RAM or if microprocessor cores can get easily faster, a designer can provide even more of a speedup by providing a higher multiplexing factor. Current memories run at about 400 MHz (2.5 nS cycle time) in row access mode. When conventionally addressed they are slower, (.g., some run about 10 nS cycle time). Clearly row access should be used whenever possible with truly random access possible but used only as a last resort. Most modern bus sizes are 64 bits wide. This gives a theoretical throughput of about 3 gigabytes per second. The following signal descriptions describe an example implementation in accordance with the method of the present invention that would enable the optional clock to width multiplexing of data from the invented general purpose computer and to external and/or off-chip RAM and convert an eight-bit bus to a 32-bit bus:

UCLK: This clock would be driven by the microprocessor during writes and the multiplexer during reads. It makes signals across the microprocessor side of the bus impervious to skew;

R/W: This signal tells the multiplexer whether the microprocessor wants to read or write during the next operation;

UDx: Eight bi-directional data bus signals between the microprocessor and the multiplexer;

A/D: This signal tells the multiplexer whether the microprocessor is sending an address or data;

/RD: Read line to memory;

/WR: Write line to memory;

Ax: 32 address lines to memory; and

MDx: 32 data lines to memory.

The method of the present invention further provides an optional inclusion of multiple data busses with the invented general-purpose computer. In a preferred embodiment of this optional aspect of the present invention, the designer might split a 512 bit, or however wide, data bus, or data pipe, up into separate busses, each bus having their own separate memory areas. 64 data busses each 8 bits wide might be an effective design in certain alternate preferred embodiments of the present invention that include this optional circuitry. The compiler might place data in these different spaces for optimal row performance from the processor. Better row access may thereby be enabled, when the compiler and operating system can manage the spaces effectively. In certain preferred embodiments of the present invention, each bus could address its own space, other memory spaces, the instruction space, and other processor spaces. For example, bus zero addresses 2^32 32 bit numbers. Dividing that space into 128 sections gives 128 megabytes per section. The use of 64 of those sections for the 64 main memory spaces might be enabled. The use several spaces to address instruction RAM to load it or modify it might be enabled. The use of a space for addressing other processors in a multiprocessor configuration might be enabled. The use of one or more spaces for memory-mapped peripherals might be enabled. The use of one space for boot purposes might be enabled. The designer of a general purpose computer created in accordance with the method of the present invention might further split these spaces address-wise so that one can be loading some areas of memory while the processor is operating on other areas. For example, one could split the space up into even and odd megabytes so that one could load even megabytes with data using a blitter while the processor is using data in odd megabytes.

The method of the present invention further provides an optional technique of variable instruction execution times, wherein the compiler can build logic circuits with a wide variety of settling times. As such, the compiler may have a method for calculating safe settling times for the circuits it creates. This information is then transmitted as part of a memory directive instruction.

In certain still alternate preferred embodiments of the present invention, the instruction decompression circuit 20 may optionally or alternatively include hardwired logic circuits, reprogrammable logic circuits, or a combination of hardwired logic and reprogrammable logic circuits. Hardwired logic circuits elements of the decompression circuit 20 allow a compiler designer to rely upon the existence of decompression circuit 20s that comply with particular decompression techniques and applied algorithm standards as specified by the architect of the integrated circuit computing device. Alternatively, the existence of reprogrammable logic circuits within the decompression circuit 20 may enable the operating system/compiler designer to reprogrammably form logic structures in the decompression circuit 20 according to algorithmic decompression methods chosen by the operating system/compiler designer.

Certain alternate preferred embodiments of the present invention may comprise two or more parallel decompression circuit 20s, wherein each separate decompression engine may simultaneously decompress an instruction or a portion of an instruction. The portion of the instruction proceeds by a parallel decompression circuit 20 may be of fixed and/or variable length in various alternate preferred embodiments of the present invention.

Certain yet alternate preferred embodiments of the invented general-purpose computer, or invented processor, include the capability to cache compressed instructions prior to decompression by the decompression circuit 20 of the instruction pipe. This optional capability may reduce inefficiencies caused by introducing latencies while compressed instructions are being loaded from outside of the present invention.

The method of the present invention further optionally includes multiple instruction buffers 22, wherein instructions are stored after processing or decompression by the instruction pipe prior to execution by the RLU. The invented general-purpose computer thereby decompresses instructions while the RLU is executing a previously decompressed or processed instruction. When more than one decompressed instruction has been stored, the invented general purpose may than choose to ignore an instruction that the present invention has determined is not to be executed, thereby reducing wasted RLU configuring and/or execution activity. The instruction pipe may be double or multiply buffered to enable data for a next instruction to be prepared or decompressed while data from a current instruction is executing.

The method of the present invention further optionally enables the invented general purpose computer to have pluralities or multiplicities of logic elements, e.g. muxes, cones, iterators and look up tables, that are simultaneously addressable and configurable in blocks of programming addresses above and/or below a signaled programming address, whereby a plurality or multiplicity of logic elements may be simultaneously interconnected with other logic elements and/or configured internally. This optional capability allows, in one possible implementation, an ability to simultaneously configure a plurality of logic elements having programming addresses between a signaled programming address and a previously established programming address, e.g. between programming addresses 1,000 and 2,000.

The data pipe or data bus may be double or multiply buffered to enable data for a next instruction to be prepared while data from a previous instruction execution is stored within the invented general-purpose computer or written to a memory element outside of the present invention.

In certain yet alternate preferred embodiments of the present invention, the instructions received by the instruction pipe may direct the operation of the data pipe by commanding the order or location of storage of data within the data pipe, or alternatively or additionally by controlling the selection and presentation of data by the data pipe and to the reprogrammable logic unit. This optional ability of the instruction to control the flow and storage of data within and/or from the data pipe may further allow the instructions to use the data pipe to support the rapid execution of iterative or sequential processing steps of the reprogrammable logic unit. Alternatively or additionally, the reprogrammable logic unit may affect its own programming by directing the operation of the instruction pipe or the data pipe as a results of computations internal to the reprogrammable logic unit.

Certain alternate preferred embodiments of the present invention comprise a separate instruction-to-data pipe bus that communicates instructions to the data pipe from outside of the present invention wherein the operation of the data pipe is directed. Instructions received by the data pipe via the separate instruction-to-data pipe bus may optionally and simultaneously, or alternatively, command the data pipe to (1) load data for upcoming instructions, (2) command the data pipe to load data for future execution cycles, or store data resulting from or related to earlier execution cycles, (3) control execution or fetching of instructions, and/or (4) perform other suitable actions known in the art.

The method of the present invention optionally comprises an interrupt service function, wherein the operation of the invented general purpose computer is affected by inputs or signals received from external sources, such as a mouse, a keyboard or other suitable devices, channels or hardware peripherals known in the art.

Preferred embodiments of the present invention may be made of suitable materials known in the art of computational apparatus and system design, including but not limited to electronic, optical, mechanical, pneumatic, hydraulic, atomic, subatomic, biological, neural, gravitational, magnetic, and/or electromagnetic materials or components. Certain alternate preferred embodiments of the present invention comprise semiconductor materials such as Silicon or Gallium Arsenide, or other suitable semiconductor materials known in the art, in singularity or in combination. Certain alternate preferred embodiments of the present invention may alternatively or additionally include individual or mixtures of suitable materials known in the art of electronic, neural, biological and/or optical circuit manufacture. More particularly, the preferred embodiment may include suitable dopants, metallization materials, gas deposition materials and/or sputtered material known in the art of logic or microprocessor circuit manufacture.

In operation, the preferred embodiment of the present invention, or preferred embodiment, accepts a single uncompressed or decompressed instruction, or a set of instructions that may individually be uncompressed or partially or wholly compressed instructions, through the instruction bus, or alternatively through a shared instructions and data bus. The integrated circuit computing device, or invented processor, then processes the compressed instructions through the decompression circuit 20. The decompression circuit 20 then transmits the decompressed instruction bus to the reprogrammable logic unit. The reprogrammable logic unit then modifies and establishes connections between and among part or all of the functional circuits of the reprogrammable logic unit. The data pipe may make data available to the reprogrammable logic unit. The reprogrammable logic unit may then wait for the passing of a specified or required settling time period or latency time period. The invented processor executes an instruction cycle after the reprogrammable logic unit is programmed and/or reprogrammed in accordance with the directions contained within the uncompressed or decompressed instruction or instructions that have been transmitted via the instruction bus, instruction pipe and optionally the decompression circuit 20. The preferred embodiment further provides that instructions received by the instruction pipe may be transmitted to the data pipe and may direct the ordering of data within the data pipe and/or control the sequence, pathway or method of presentation and transmission of data from the data pipe to the reprogrammable logic unit or elsewhere within, to or from the invented processor.

The software compiler of the preferred embodiment may accept a source code program written in a higher-level software language, such as JAVA, or another suitable software language known in the art. The software compiler of the preferred embodiment or compiler, may analyze or deconstruct the source code program in order to generate a set of instructions that may efficiently program the invented processor. The compiler may analyze the executable acts or logical steps that the invented processor shall perform in order to cause the invented processor to produce the results or behavior desired by the source code program. The compiler may maintain a software model of the invented processor and/or logical states and interconnect assignments of the reprogrammable logic unit, the functional devices of the reprogrammable units, and other elements of the invented processor. The compiler may reference the software model to determine which elements of the invented processor may have been configured, programmed or reprogrammed in a potential or required instruction cycle or other time period. The compiler may use the software model of the invented system to fully or partially analyze the logical sequences directed by the source code in order to establish a set of instructions that may efficiently program or reprogram elements of the invented processor, such as the functional circuits of the reprogrammable logic unit. The compiler may generate a set of instructions that are designed to support the rapid execution of the set of instructions by efficiently programming and reprogramming the functional circuits of the reprogrammable logic units so that the number of instructions required to be provided to the invented processor is reduced. The compiler may additionally or alternatively generate a set of instructions that reduce a total execution time required for the invented processor to produce the behavior or results directed by the source code. The compiler may additionally or alternatively generate a set of instructions that reduce the length of a time period required for the invented processor to produce the behavior or results directed by a segment of the source code. By way of example, suppose that a particular complex logical sequence is required to be performed numerous times by the reprogrammable logic unit. The compiler may derive, from an analysis of the source and the software model of the invented processor, that a certain group of functional logic circuits, that might include muxes, cones, look up tables and iterators, may be programmed and reprogrammably interconnected together to perform the instant complex logical sequence, and that an execution time advantage results when this group of functional logic circuit is maintained and available for repeated use by the invented processor. In this example, the invented processor may reduce the number of instructions and/or the reduce the length of certain instructions that are sent to the instruction pipe. This reduction in instruction count and/or the length of certain instructions may provide execution efficiencies by reducing the time required to transmit a set of instructions to the instruction pipe and/or reducing the time required to program or reprogram the invented processor, the reprogrammable logic unit or other elements of the invented processor, such as the decompression circuit or the data pipe. The compiler may also consider the sequence, or alternative sequences, of logical processes that may be executed in order to satisfy the dictates of the source code. The compiler may, for example, elect to reprogrammably connect or configure selected functional logic circuits in certain patterns and sequences in order to streamline and make more efficient a set of instructions, where the invented executes the set of instructions in accordance with the required behavior and results of the source code. The compiler determined patterns and sequences of reprogrammable connections or interconnections of the functional logic circuits, and/or other elements of the invented processor, may be selected to increase or optimize the speed with which the invented processor executes a single instruction, a partial set of instructions, or a set instructions.

The method of the present invention enables the design and use of a compiler that can elect to create two or a plurality of functionally equivalent instructions, wherein a first alternate instruction may be pipelined in the RLU over several execution cycles, and a second alternate instruction would execute in a single instruction cycle. The complier may determine which alternate instruction, from between the first and second alternate instructions, or from a plurality of alternate instructions, more or most efficiently drives the operation of the present invention, and thereupon create the more or most efficient instruction. The determination of the efficiencies or relative efficiencies of the alternate instructions may, in certain preferred embodiments of the method of the present invention, be made without or before generating any alternate instruction.

The method of the present invention enables the design and use of a complier that may examine source code that describes repetitive logic, or mathematical actions or cycles, such as the C programming language commands FOR, WHILE or DO commands can define, and therefrom derive and generate effective loop instructions executable by the present invention. An effective loop instruction may include several iterations of, or several portions of an iteration or iterations of, one or more loop actions or cycles.

The method of the present invention optionally further comprises the generation and/or execution of software code that may embody design methods employed by digital logic circuit designers, such as employing Wallace tree reductions to reduce several addition operations to a single addition operation, and other suitable digital circuit design methods known in the art.

Alternate preferred embodiments of the present invention may implemented with suitable semiconductor device materials known in the art and using complementary metal oxide substrate, or CMOS, structures, or emitter coupled logic, or ECL, or transistor to transistor logic, or TTL, or another suitable electronic circuit materials and structures known in the art. Still alternate preferred embodiments of the present invention may include suitable materials known in the art of logical device design, including but not limited to quantum physics phenomena and/or electronic, electrical, optical, magnetic, electromagnetic, biological, neural, molecular, atomic, and/or sub-atomic materials, components or characteristics.

Certain preferred embodiments of the present invention can repeatably provide an instruction to the RLU that can generate a body of reconfigurable logic sufficient to instatiate a computing power equivalent to dozens or hundreds of conventional von Neumann instructions. This optional capability of communicating to the RLU via a large and sustainable bandwidth enables the configuration of more optimized reconfigurable states of the RLU and faster reconfigurable circuits. The delivery of large instructions to the RLU via a large and sustainable rate and bandwidth increases the magnitude of computing effected during certain, all or most clock cycles of these preferred embodiments. The transmission of larger instructions to the RLU can make possible better impression gains.

The architectural parallelism of the method of the present invention as embodied in certain alternate preferred embodiments of the present invention enable the compiler to examine the source code and identify and act on opportunities to exploit the present invention's capabilities by forming RLU instructions that more efficiently reconfigure the RLU and/or generate more computationally powerful reconfigured states within the RLU. More computation can thus be accomplished within an individual clock cycle by more intelligently packing and associating selected source code elements within better struction reconfiguration commands placed within the instruction by the compiler.

Certain still alternate preferred embodiments of the present invention additionally or alternatively reduce the quantity of bits or information necessary to reconfigure the RLU by organizing a subset or all reconfigurable circuits of the RLU of into pluralities of associated circuits, wherein each plurality may comprise a group of circuits that are reconfigurable with one command consisting of one bit, or a few bits. This optional capability of reconfiguring a plurality of associated circuits by means of a single bit or element of the RLU instruction reduces the size of the instruction necessary to reconfigure the RLU in a given reconfiguration step.

In certain alternate preferred embodiments of the invented cone, the cone has no or little native or dedicated connectivity circuitry, but rather makes use of the connectivity circuitry of other logic circuits. This optional design feature reduces the area required for formation of a cone on the substrate or platform of the present invention.

Certain still alternate preferred embodiments of the present invention employ 8 bit words within the instruction. This optional actuation of an 8-bit architecture within these preferred embodiments may produce savings in areas of the substrate or platform of the present invention devoted to connectivity circuitry itself and/or to effectivity connectivity functions. Additionally, this optional employment of an 8-bit architecture may have a minimal or acceptable impact on the computational power capabilities of the present invention and as delivered by the muxes and iterators.

The foregoing and other objects, features and advantages will be apparent from the following description of the preferred embodiment of the invention as illustrated in the accompanying drawings.

BRIEF DESCRIPTION OF THE DRAWINGS

These, and further features of the invention, may be better understood with reference to the accompanying specification and drawings depicting the preferred embodiment, in which:

FIGS. 6A through 6H is a schematic diagram of a cone.

FIG. A is a block diagram of a DSP Preferred Embodiment.

FIG. B is a schematic of features of the DSP Preferred Embodiment of FIG. A.

FIG. C is a block diagram of a logic element of the DSP Preferred Embodiment of FIG. A.

FIG. D is a schematic of general features of the logic element of FIG. C.

FIG. E is a schematic of specific features of the logic element of FIG. C.

FIG. F is a block diagram of an Input B of the logic element input of FIG. C.

FIG. G is a block diagram of a multiplier-accumulator of the DSP Preferred Embodiment of FIG. A.

FIG. H is a block diagram of a modular fast carry/borrow of the DSP Preferred Embodiment of FIG. A.

FIG. I is a schematic of a 3-to-1 lookup tables bit-slice (Bit 0) of the DSP Preferred Embodiment of FIG. A.

FIG. J is a block diagram of a lookup table of the DSP Preferred Embodiment of FIG. A.

FIG. K is a schematic of an Iterator of the DSP Preferred Embodiment of FIG. A.

FIG. L is a block diagram of an output B of the DSP Preferred Embodiment of FIG. A.

FIG. M is a schematic of a plurality of logic elements of FIG. C in an RLU of the DSP Preferred Embodiment of FIG. A.

FIG. N is a schematic of an example 1 of RLU data busses of the RLU of FIG. M.

FIG. O is a schematic of an example 2 of RLU data busses of the RLU of FIG. M.

FIG. P is a schematic of RLU I/O busses of the RLU of FIG. M.

FIG. Q is a schematic of RLU configuration busses of the RLU of FIG. M.

FIG. R is a block diagram of a data pipe of the DSP Preferred Embodiment of FIG. A.

FIG. S is a block diagram of a fetch splitter of the DSP Preferred Embodiment of FIG. A.

FIG. T is a block diagram of a memory hierarchy of the DSP Preferred Embodiment of FIG. A.

FIG. U is a block diagram of a preferred embodiment of a compiler of the DSP Preferred Embodiment of FIG. A.

FIG. V is a block diagram of a code generator of the compiler of FIG. U.

FIG. W is a diagram of a possible GIR structure of the compiler of FIG. U.

FIG. X is a representation of a global threading of the compiler of FIG. U.

FIG. Y is a representation of scheduling of the compiler of FIG. U.

FIG. Z is an RLU instruction packing example related to the GIR structure of FIG. W and the RLU of FIG. M.

FIG. AA is an RLU instruction packing example, i.e., an RLU instruction, of the compiler of FIG. U and the DSP Preferred Embodiment of FIG. A.

FIG. BB is a representation of an example of data directive scheduling of the compiler of FIG. U and the DSP Preferred Embodiment of FIG. A.

DETAILED DESCRIPTION OF THE PREFERRED EMBODIMENT

In describing the preferred embodiments, certain terminology will be utilized for the sake of clarity. Such terminology is intended to encompass the recited embodiment, as well as all technical equivalents which operate in a similar manner for a similar purpose to achieve a similar result.

Figure 1:
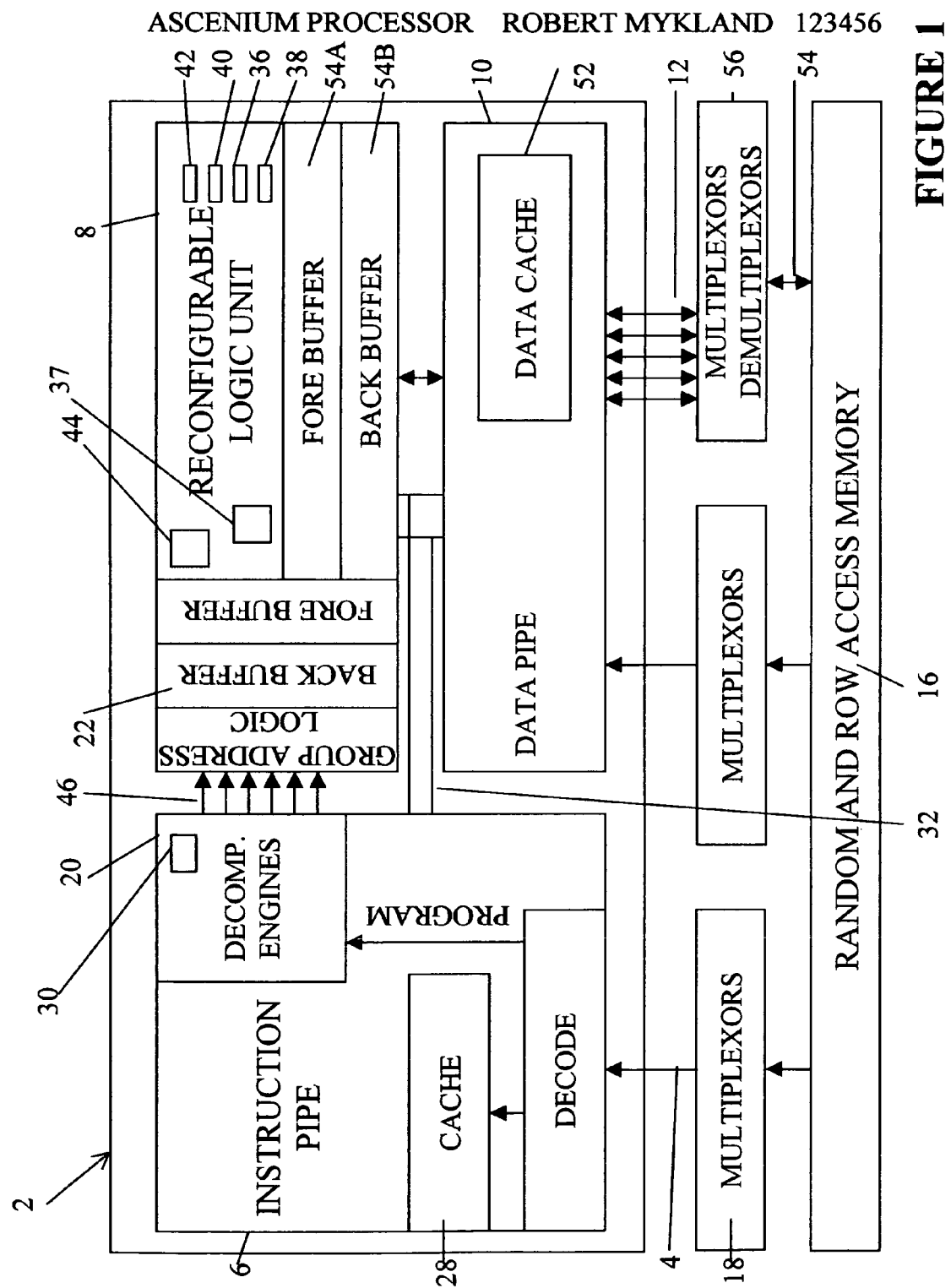
FIG. 1 depicts a preferred embodiment of the present invention.

Referring now generally to the Figures and particularly to FIG. 1, a preferred embodiment of the present invention 2, or invented processor, is an integrated circuit and includes an instruction bus 4, an instruction pipe 6, a reprogrammable logic unit 8, a data pipe 10 and a data bus 12. The instruction bus 4 receives instructions from a RAM 16 that is outboard of the invented processor 2. The instructions are transmitted as digital logic signals from a RAM 16 and via a set of clock-to-width multiplexers 18 of the instruction source and to the instruction bus 4. The instructions are then read from the instruction bus 4 and into the instruction pipe. The instruction pipe 6 collects the instructions and decompresses the received instruction in a decompression circuit 20. One, more than one, all or none of the instructions might be uncompressed and one, more than one, all or none of the instructions might be compressed. Uncompressed instructions are transmitted from the instruction pipe 6 to the reprogrammable logic unit 8, or RLU 8. Compressed instructions are decompressed in the decompression circuit 20 and transmitted from the instruction pipe 6 to the reprogrammable logic unit 8. Alternatively or additionally, decompressed instructions may be stored in instruction buffers 22 located within, or associated with, the instruction pipe 6 and/or the RLU 8.

The invented processor 2 can receive and respond to interrupt signals from the instruction pipe 6, the data pipe 10. The invented processor 2 can also elect to fetch new instructions from an external or off-chip source in response to an interrupt signal received from the same or another external or off-chip interrupt source, or upon the basis of data received and/or logical determinations produced by the data or logic processing of the invented processor 2 itself.

Compressed instructions are received by the instruction pipe 6 from the instruction bus 4 and may be immediately decompressed or may be stored in a pre-decompression instruction cache 28. Compressed instructions may be stored in an instruction cache 28 while other instructions, such as earlier received compressed instructions, are being decompressed. The instruction pipe 6 will later elect to read a stored compressed instruction from the instruction cache 28 and then decompress and transmit the decompressed instruction to the RLU 8.

The RLU 8 may execute one instruction while substantially simultaneously receiving another instruction from the instruction pipe 6. The invented processor 2 may swap instructions by deciding, upon the base of data received and the execution of instructions, which decompressed instruction to execute from among two or more compressed instructions stored in the instruction cache 28 or externally in the instance of a cache miss. Alternatively or additionally, the invented processor 2 may swap instructions by deciding, upon the base of data received and the execution of instructions, which compressed instruction to decompress and execute from among two or more compressed instructions stored in the instruction buffers 22.

Alternatively or additionally, decompressed instructions may be stored in instruction buffers 22, the instruction pipe 6 and/or the RLU 8. The storage of decompressed instructions in buffers 22 enables the invented processor 2 to decide among two or more possible instructions to execute, whereby the processing of the invented processor 2 is used to direct the instruction level operation of the invented processor 2 itself. As an illustrative example, the invented processor 2 may determine, on the basis of the results of previously executed commands sent to the RLU 8, that a particular instruction, that has been decompressed and stored in an instruction buffer of the instruction pipe 6, should not be executed and should be ignored and overwritten. In this case the invented processor 2 eliminates a waste of time that would have occurred by unnecessarily executing this particular decompressed instruction. Alternatively and/or additionally, the compressed instructions may be stored in the instruction cache 28.

The decompression circuit 20 contains reprogrammable logic elements 30 that accept decompression programming instructions from the instruction pipe 6 and/or data pipe 10, whereby the decompression method of the invented processor 2 may be defined, modified or altered by the instructions and/or data transmitted to the invented processor 2 via the data bus 12 and/or instruction bus 4. This reprogrammability of the decompression circuit 20 extends the range of methods that the invented processor 2 can use in formatting, compressing, transmitting, and decompressing instructions transmitted to and from the invented processor 2. Certain instructions received by the instruction pipe 6 may control the operations of the data pipe 10. Instructions directing the storage, transmission, receipt, or movement of data or instructions stored in the data pipe 10 can be transmitted from the instruction pipe 6 via an instruction pathway 32 of the decompression circuit 20. The instruction pathway 32 may decompress an instruction received by the instruction pipe 6 in a compressed state and meant for transmission to the data pipe 10.

Optionally included are two or more parallel decompression circuits 20. These parallel decompression circuits 20 act substantially simultaneously and decompressed compressed instructions and/or elements or portions of instructions and substantially simultaneously transmit the resultant decompressed instructions and/or portions or elements of decompressed instructions to the RLU 8.

The reprogrammable logic unit 8 includes a plurality of functional logic circuits, including but not limited to muxes 36, parallel carry circuits 37, cones 38, iterators 40 and look up tables 42. The reprogrammable logic unit 8 further comprises reprogrammable interconnects that enable the selective connection of the outputs of certain functional logic circuits 36, 37, 38, 40, & 42 to the inputs of other functional logic circuits 36, 37, 38, 40, & 42. It is significant that certain functional circuits 36, 37, 38, 40, & 42 may be connected such that the output of a given circuit 36, 37, 38, 40, & 42 is transmitted into the input of the same given circuit circuits 36, 37, 38, 40, & 42.

In operation, the invented processor 2 may accept a set of instructions into the instruction pipe 6, and decompress and transmit the instructions to the reprogrammable logic unit 8 and optionally the data pipe 10. Data associated with the set of instructions may be accepted by the data pipe 10 from an outboard RAM 16 and via the data bus 12. The invented processor 2 may then wait until the set of instructions has programmed and/or reprogrammed selected reprogrammable interconnects 44 of the reprogrammable logic unit 8. The invented processor 2 may wait for a propagation delay and a settling latency as the interconnects 44 among and between functional logic circuits 36, 37, 38, 40, & 42 of the reprogrammable logic unit 8 are established and settled. The invented processor 2 may then execute an instruction cycle, whereby the reprogrammable logic unit 8 executes the programming previously received in both the most recent transmission of instructions from a communications pipeline 46 as well as the programming received by the reprogrammable logic unit 8 in programming or reprogramming actions previous to the most recent receipt of instructions. This computing sequence of programming and reprogramming the reprogrammable logic unit 8 and optionally the data pipe 10, and accepting data into the data pipe 10 from the outboard RAM 16, and then executing an instruction cycle after a programming and reprogramming delay and settling latency is used to efficiently deliver a set of instructions and data to the reprogrammable logic unit 8 and to efficiently execute one, or more than one, or a set of instructions in a single instruction cycle.

In a configuration period, the RLU 8 reconfigures the interconnections among the functional logic elements circuits 36, 37, 38, 40, & 42, to include muxes 36, cones 38, iterators 40, look up tables 42, logic gates, and other suitable logic circuits known in the art. This reconfiguration may be directed by instructions and/or data received by the RLU 8 from the instruction pipe 6, the data pipe 10, and/or the interrupt source 25. In a following execution cycle, the RLU 8 executes an instruction and generates the results of digital logic processing by processing data and/or instructions generated by the invented processor 2 or by processing data and/or instructions received from the instruction pipe 6, the data pipe 10, and/or a interrupt source. The processing of data and/or instructions in the execution cycle is performed in accordance with the interconnections made during the configuration period and/or previous configuration periods and/or the results created by previous execution cycles.

The functional logic elements of the RLU 8, including muxes 36, cones 38, iterators 40, look-up tables 42 and/or other suitable logic circuits known in the art, are addressable in blocks and may be substantially simultaneously configured en masse. An en mass configuring of a block of functional logic elements circuits 36, 37, 38, 40, & 42 may affect the internal configuration of the functional logic elements circuits 36, 37, 38, 40, & 42 and/or the interconnections of each functional logic unit circuits 36, 37, 38, 40, & 42 to another functional logic element circuits 36, 37, 38, 40, & 42, an external device, or to the invented processor 2. A block may be designated to comprise all addresses of functional logic elements above a low threshold address and below a high threshold address, either inclusive or exclusive of the threshold addresses. The block may consist of a single type of functional logic unit circuits 36, 37, 38, 40, & 42, e.g. cones 36, muxes 38, iterators 40, look up table 42, or another suitable type of logic circuit known in the art. This capability of the invented processor 2 enables highly efficient configuring of the RLU 8 by the substantially simultaneously configuring of pluralities or multiplicities of functional logic elements circuits 36, 37, 38, 40, & 42.

Figure 2:
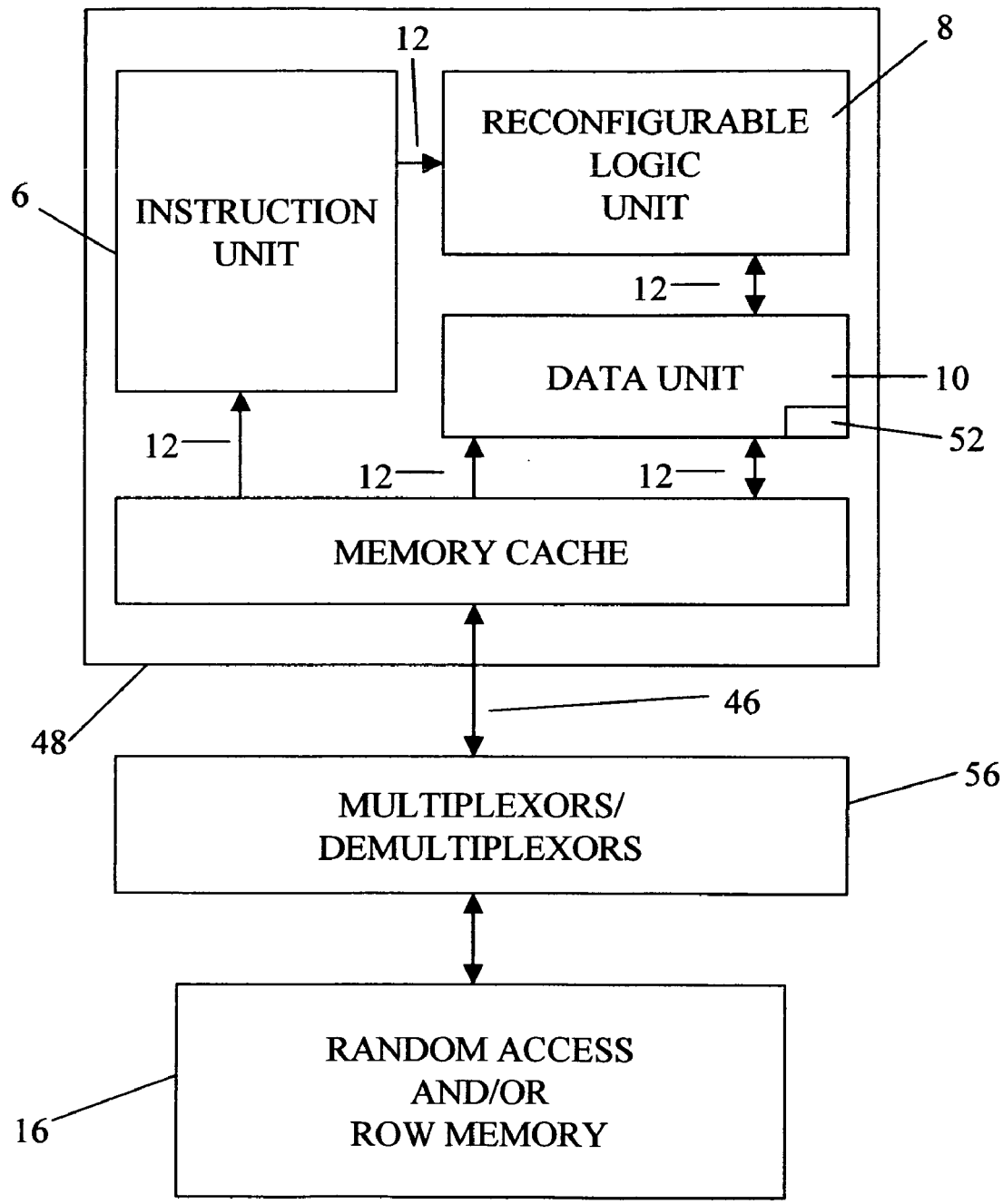
FIG. 2 shows the preferred embodiment of FIG. 1 modified by eliminating separate interface circuits and providing a single, unified instruction and data bus.

Referring now generally to the Figures and particularly to FIG. 2, the invented processor 2 of FIG. 1 is modified to have single data and instruction bus 46 through which data and instructions are transmitted to and from the invented processor 2. The separate data and instruction buses 4 & 12 of the invented processor 2 of FIG. 1 have been eliminated in the alternate modified invented processor 48 of FIG. 2. Referring now back to FIG. 1, modified invented processor 2 further comprises a plurality of data buffers 54A and 54B located in the RLU 8 or the data pipe 10, multiple data buses 12, a data pipe 10, instruction bus 4 and a data cache 52. The method of the present invention as embodied with the invented processor 2 uses a clock-to-width multiplexer 56 to bi-directionally communicate data to and from a data interface 54 of the invented processor 2 and a RAM 16. The RAM 16 and the clock-to-width multiplexer 56 are located external to the invented processor 2.

The data buffers 54 contain data provided by the RLU 8, the instruction pipe 6, an interrupt circuit and/or the data pipe 10. The RLU 8 may access the data stored in the buffers 54, or have data communicated from the buffers 54 and to functional logic elements circuits 36, 37, 38, 40, & 42 of the RLU 8. This buffering of data enables the RLU 8 to have a plurality of datum or sets of data available in anticipation of potential elections of processing steps or execution cycles of the invented processor 2. The plurality of data buffers thereby enables the invented processor 2 to operate more efficiently by making data necessary for alternate configuration steps and/or execution cycles be available to the RLU 8 substantially simultaneously.

The multiple data buses 12 bi-directionally and substantially simultaneously communicate with sources external to the RLU 8 and thereby enable the communication of larger amounts of data at faster rates than a single data bus might operate.

The data cache 52 stores information, instructions or data for later access by the data pipe 10 or the modified invented processor 48. The data cache 52 enables the data pipe 10 to accept and store data received from an external RAM 16, or the invented processor 2, while substantially simultaneously communicated with an external device or interface, with the RLU 8, with the instruction pipe 6, or with the invented processor 2.

The instruction pipe 6 accepts data pipe instructions from an external source and communicates the data pipe instructions to the data pipe 10. The data pipe 10 then executes the instruction, whereby the data pipe 10 directs or affects the operation of itself, the RLU 8, the instruction pipe 6 and/or the invented processor 2.

Figure 3:
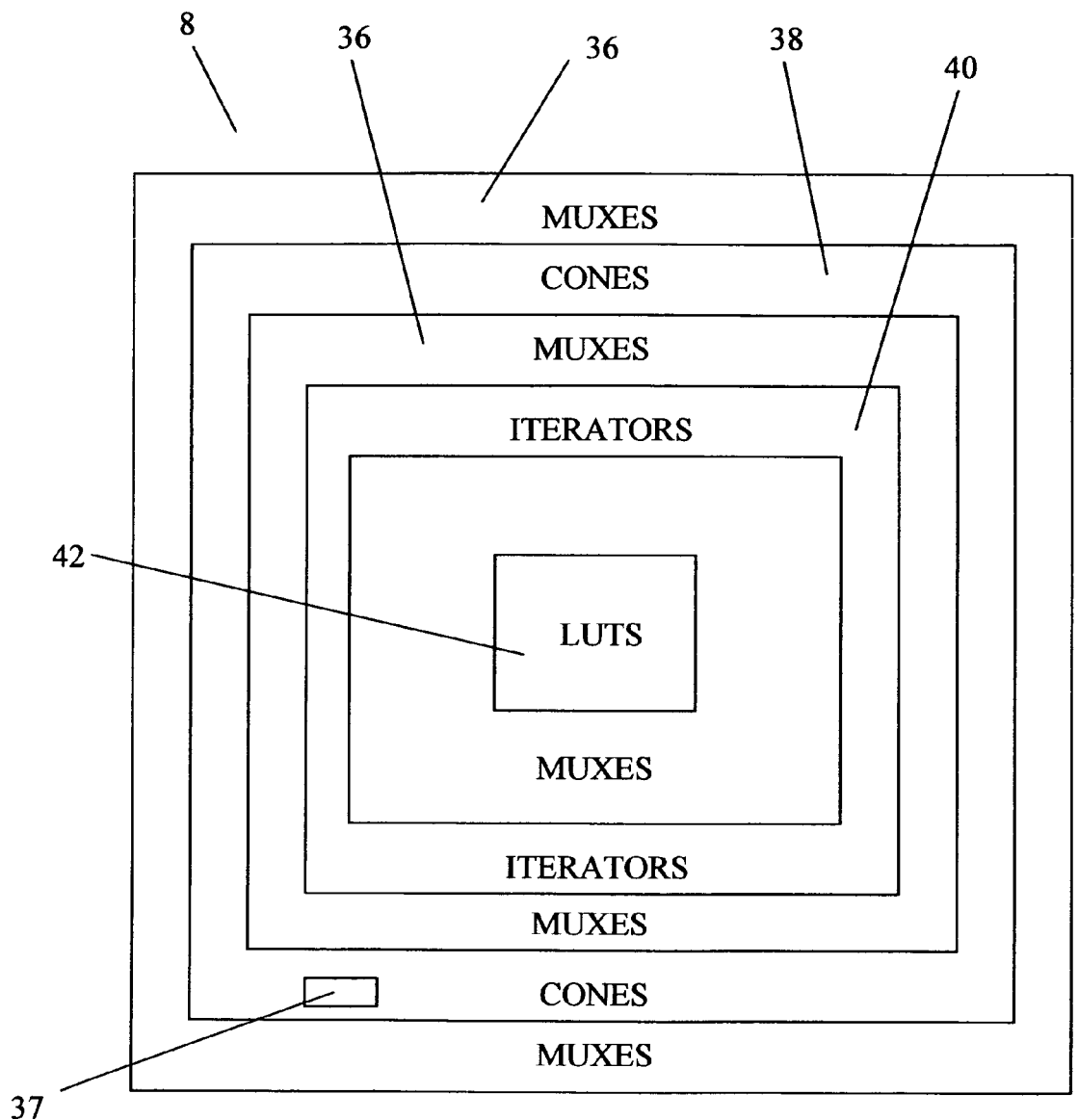
FIG. 3 depicts a close view of the reprogrammable logic unit of FIG. 1.

Referring now generally to the Figures and particularly to FIG. 3 the reprogrammable logic unit 8 of FIG. 1 comprise a plurality of functional logic circuits 36, 37, 38, 40, & 42, including but not limited to muxes 36, parallel carry circuits 37, cones 38, iterators 40 and look up tables 42, or LUTS 42. The functional logic circuits are configurably and/or reconfigurably interconnected and/or intraconnected. The configuration and reconfiguration of interconnections between, among and within the functional logic elements circuits 36, 37, 38, 40, & 42 may, in various alternate preferred embodiments of the present invention, be directed, initiated, released and/or modified by decompressed or uncompressed instructions transmitted to the RLU 8 solely, alternately or additionally from the instruction pipe 6, the data pipe 10 or the invented processor 2.

Figure 4:
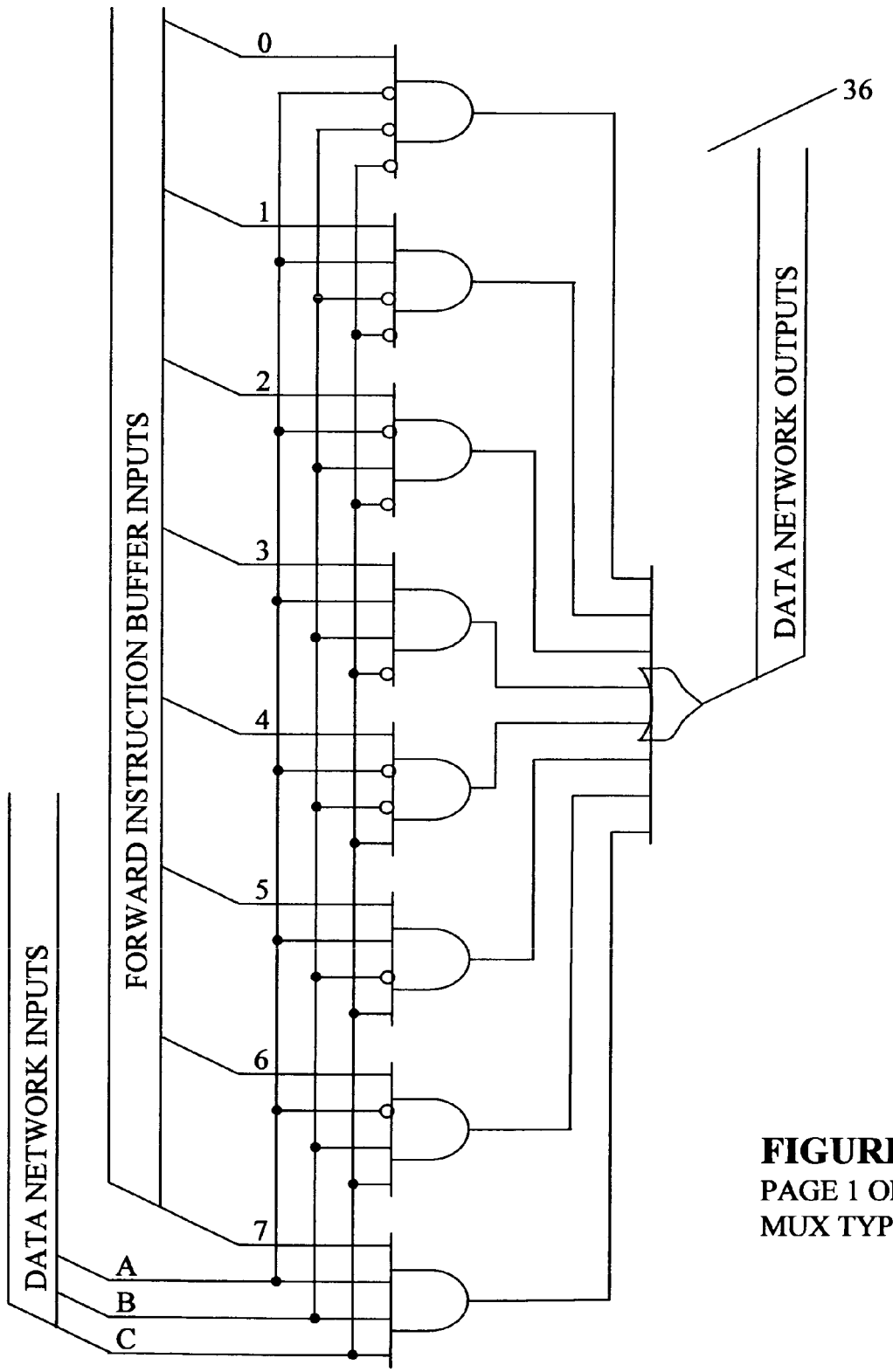
FIG. 4 is a schematic of a preferred embodiment of a mux.

FIG. 4 is a schematic of a preferred embodiment of a mux 36.

Figure 5A:
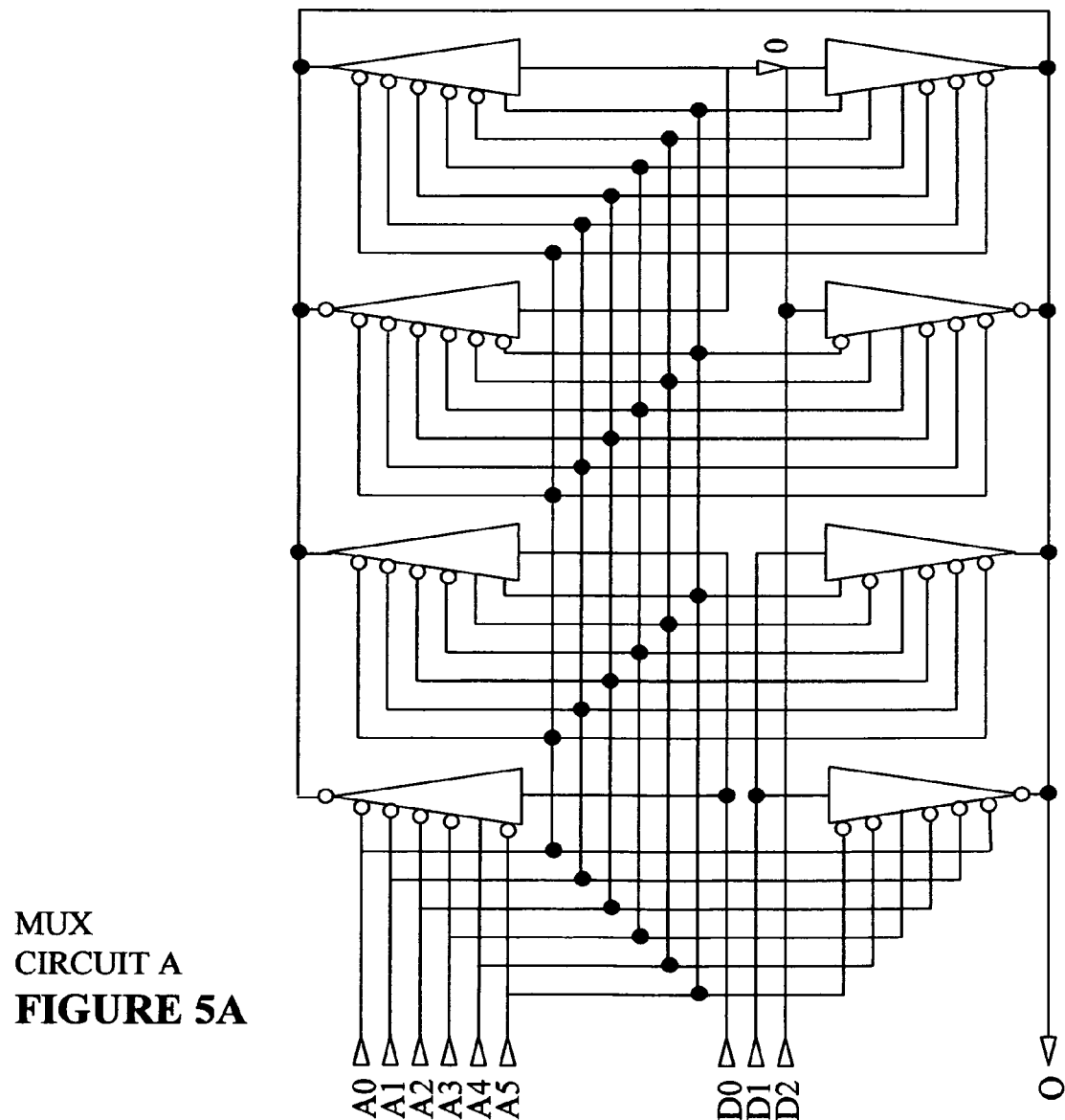
FIGS. 5A through 5N is an alternate preferred embodiment of a mux.
Figure 5B:
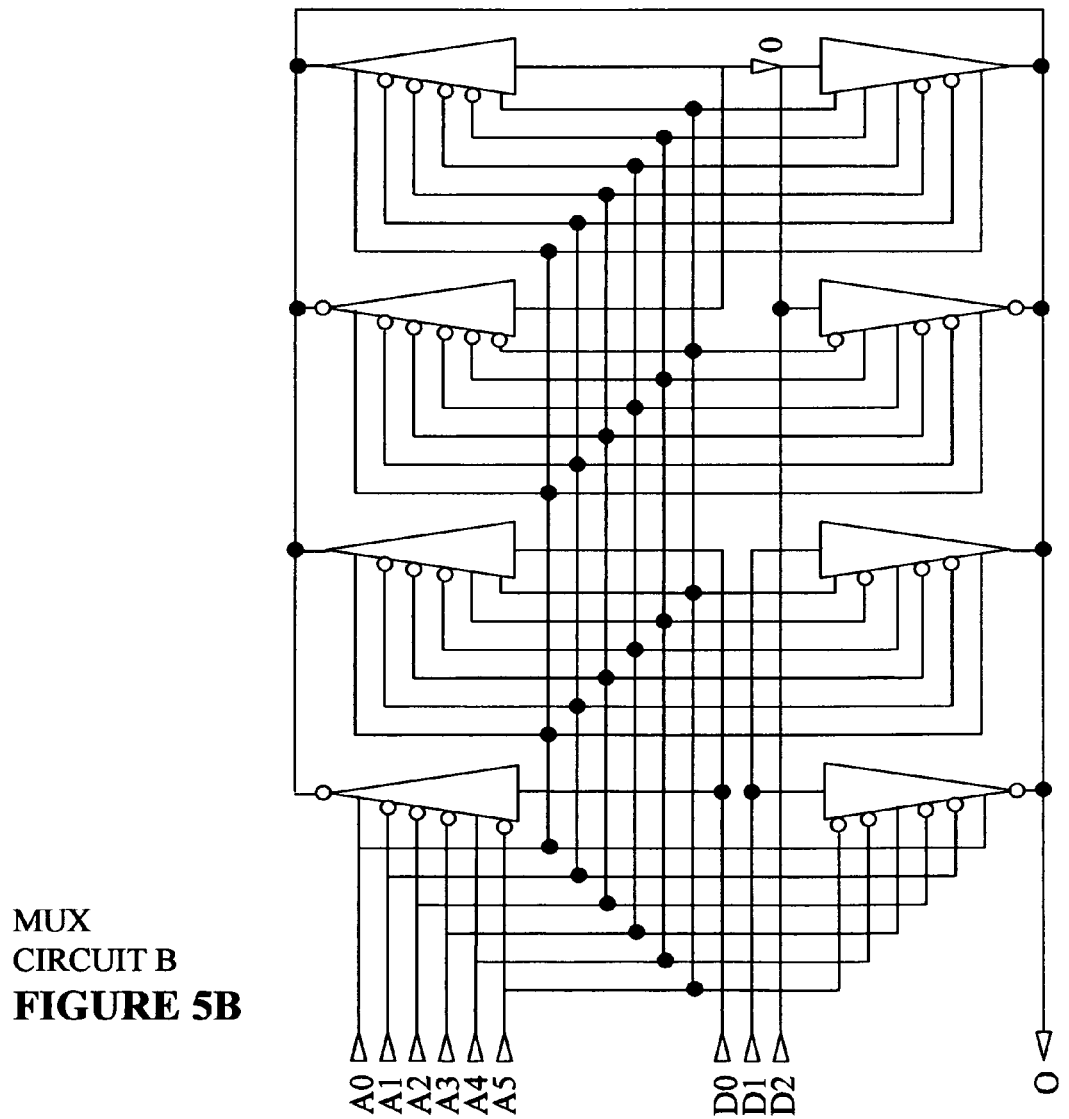
Figure 5C:
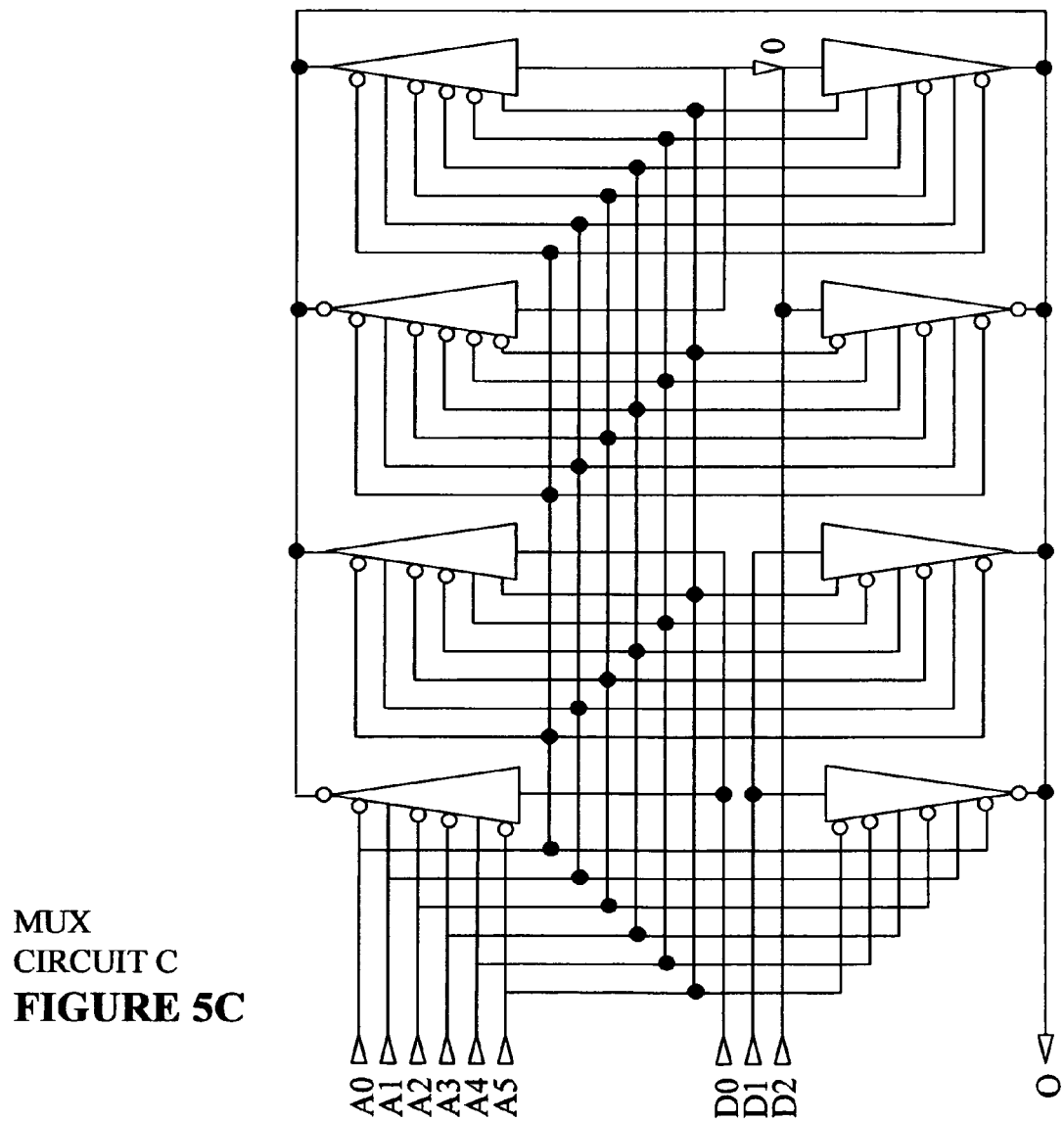
Figure 5D:
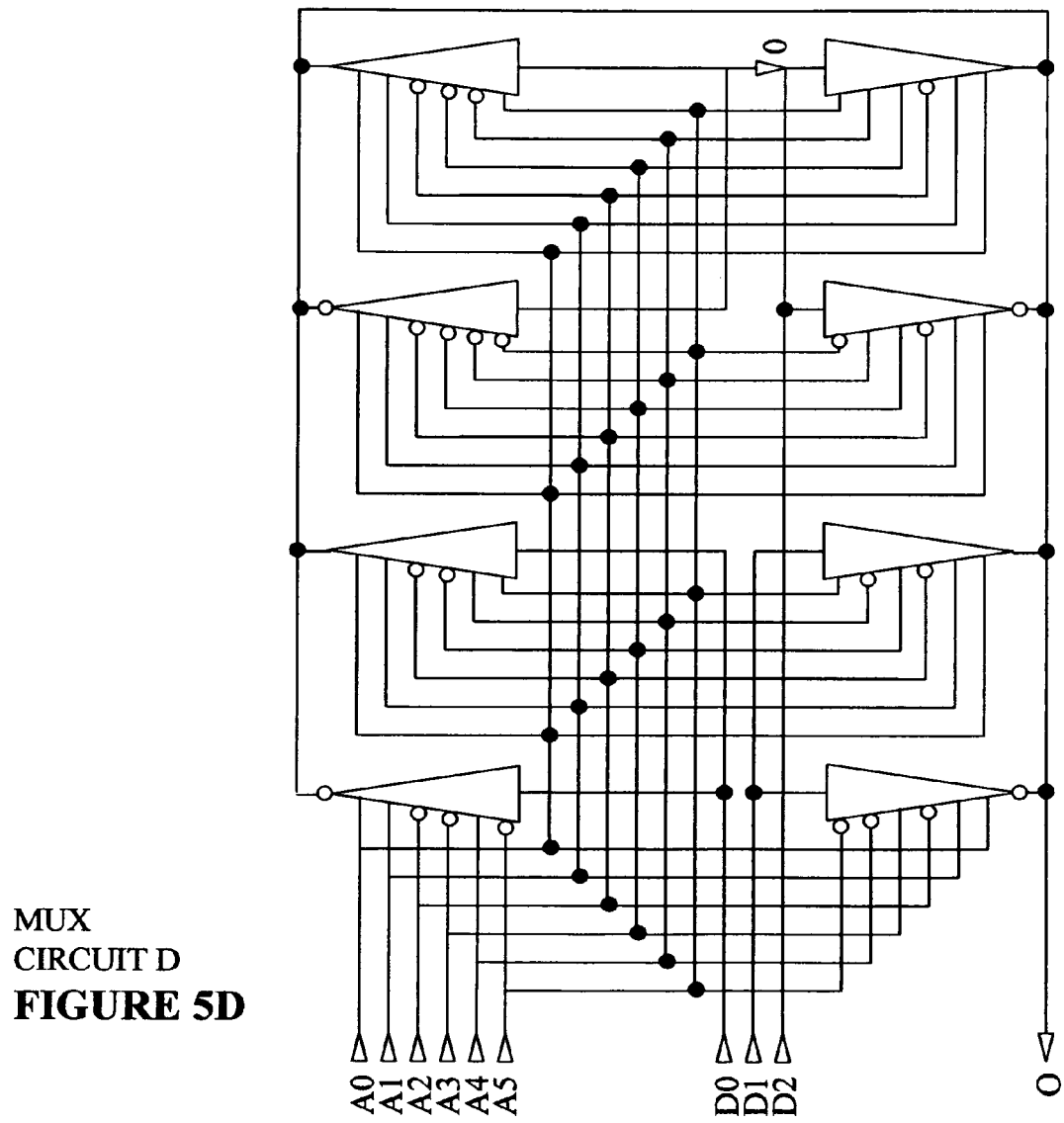
Figure 5E:
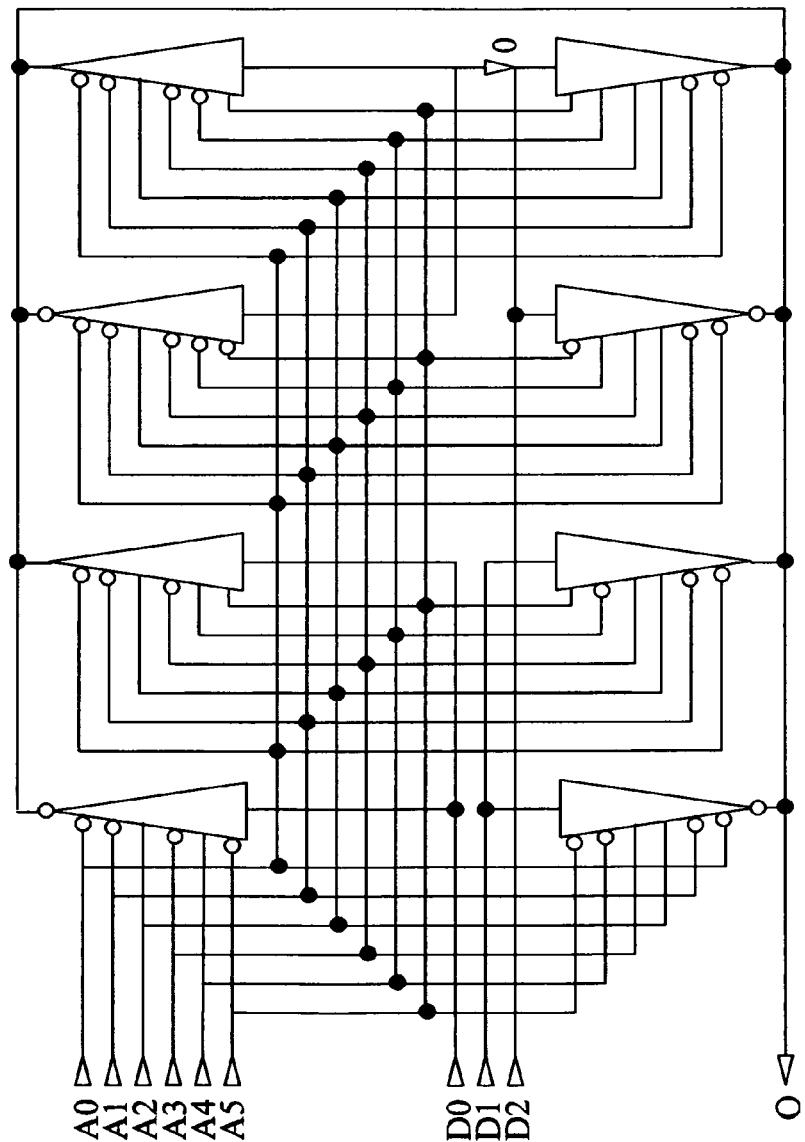
Figure 5F:
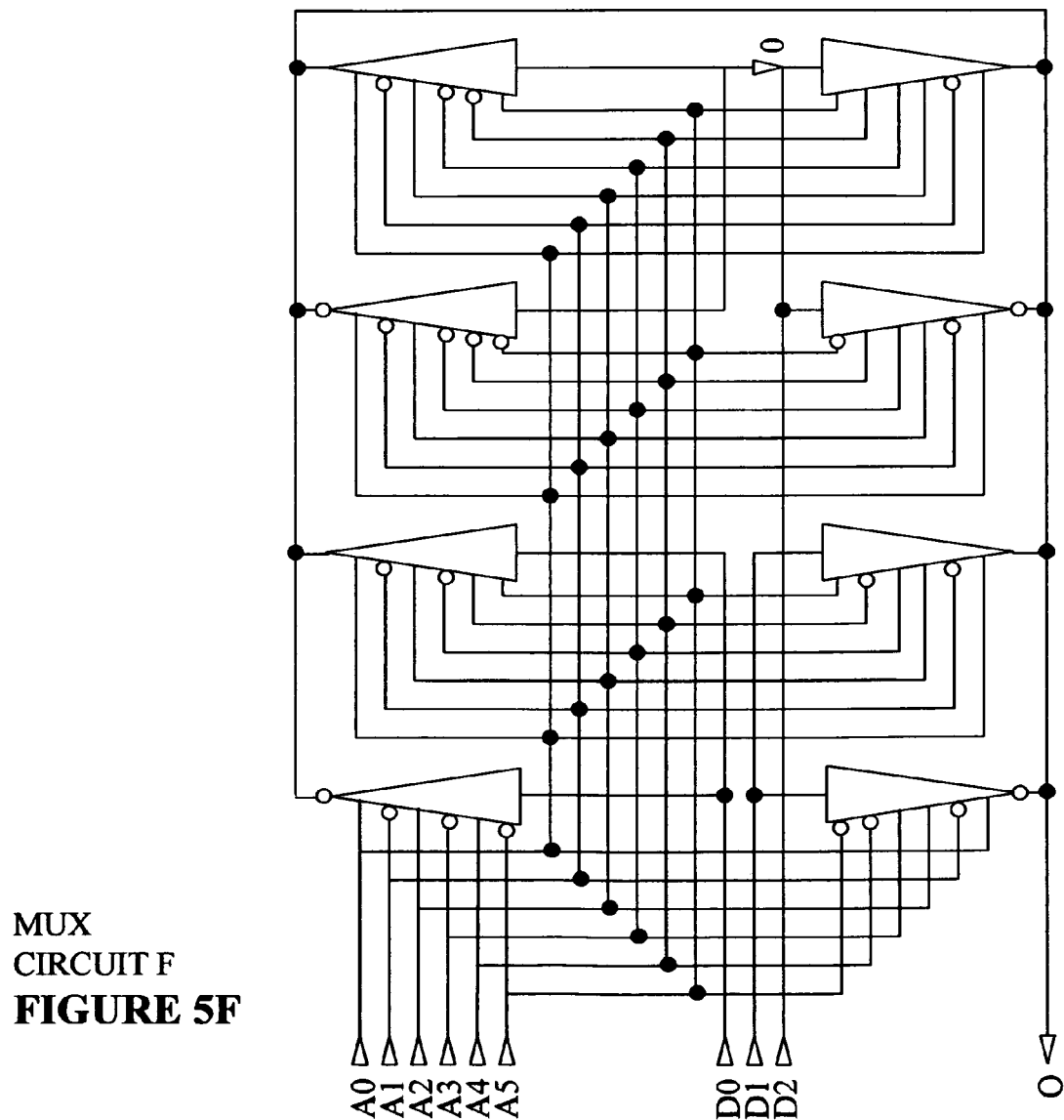
Figure 5G:
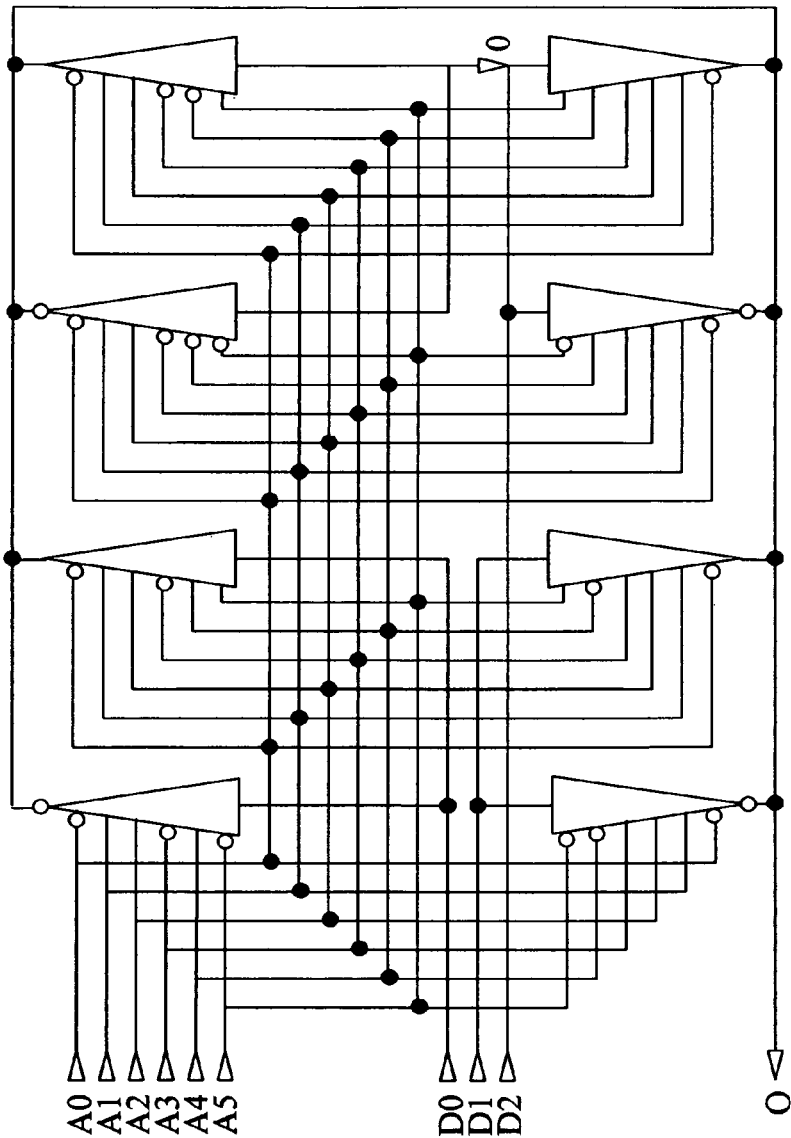
Figure 5H:
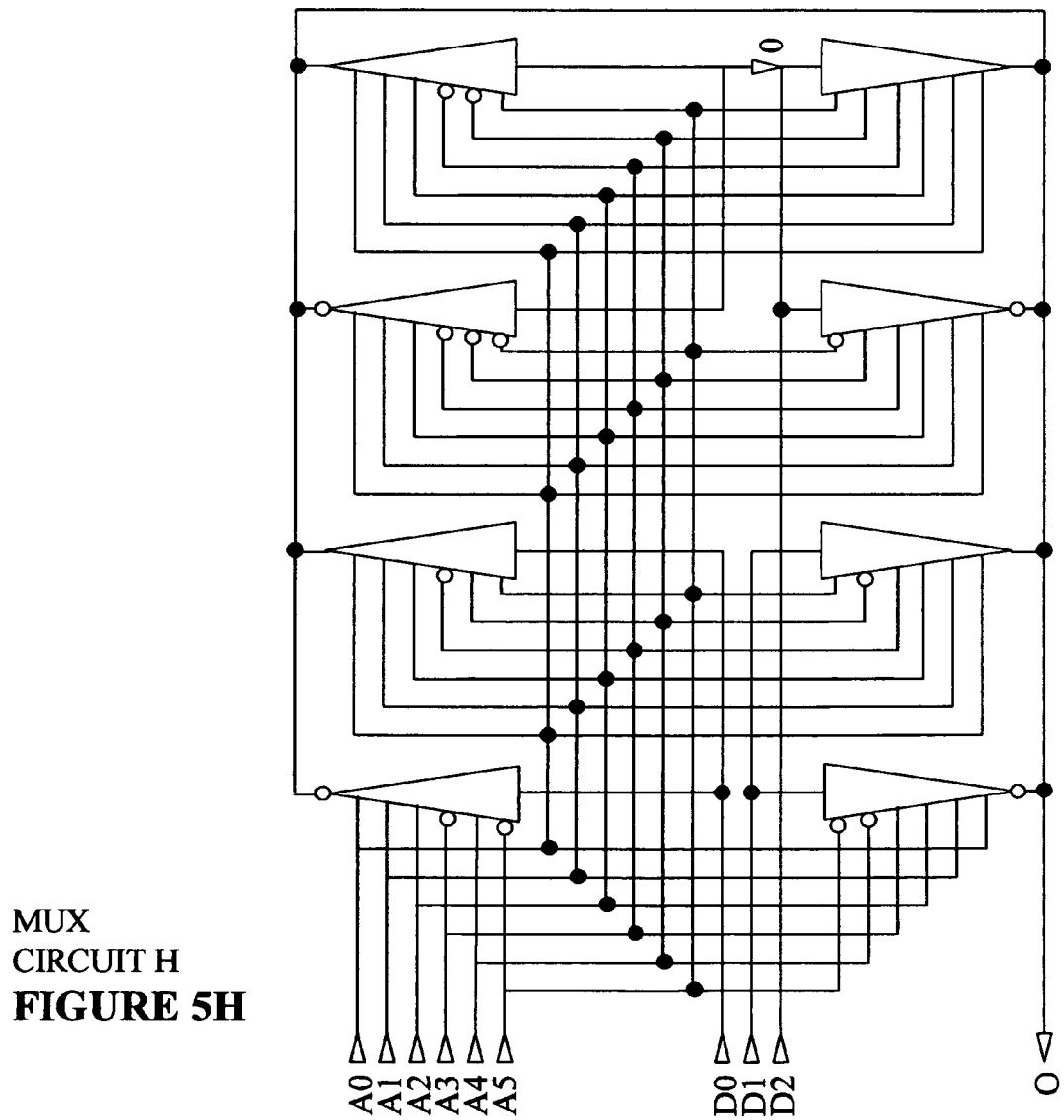
Figure 5I:
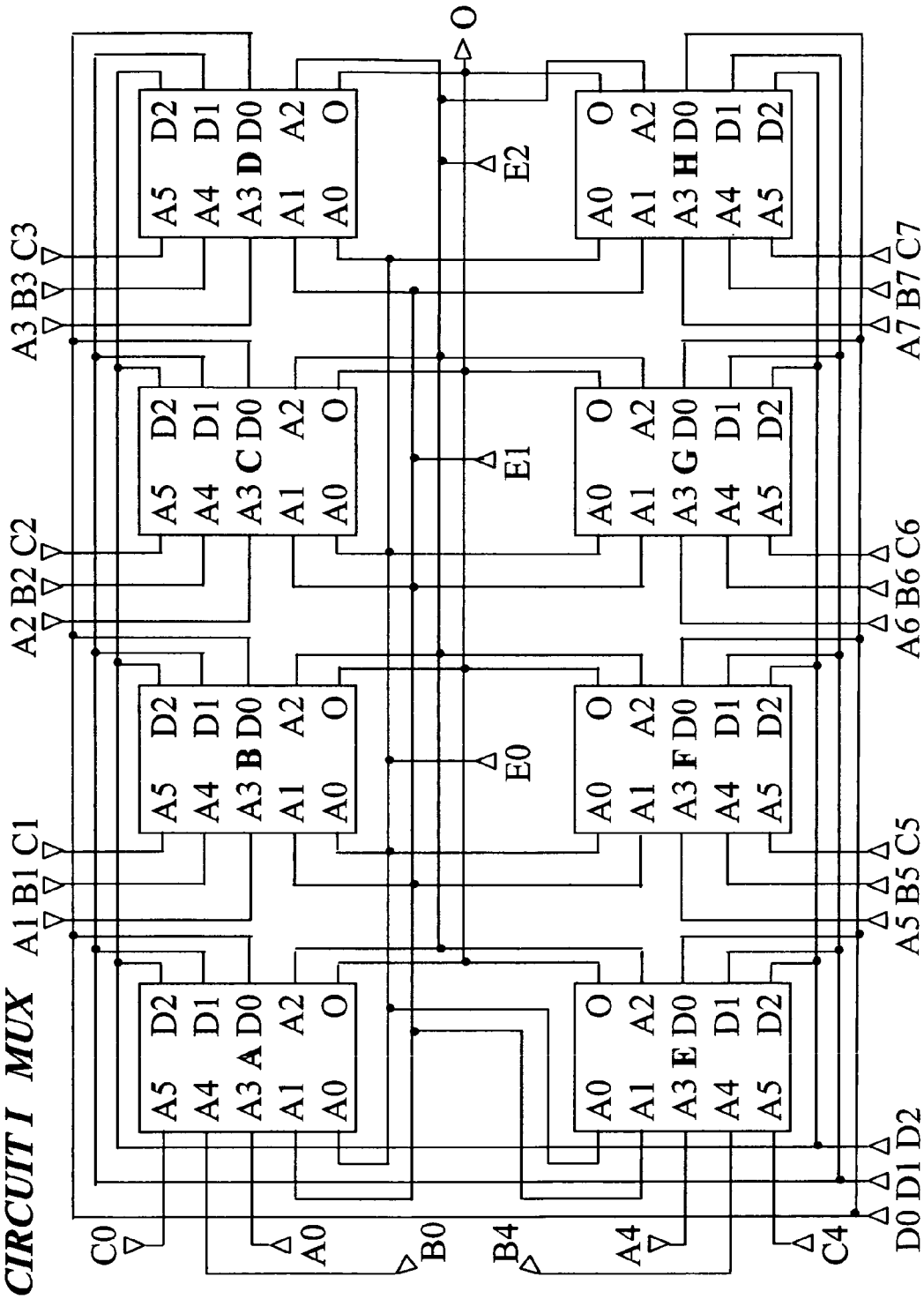
Figures 5J, 5K:
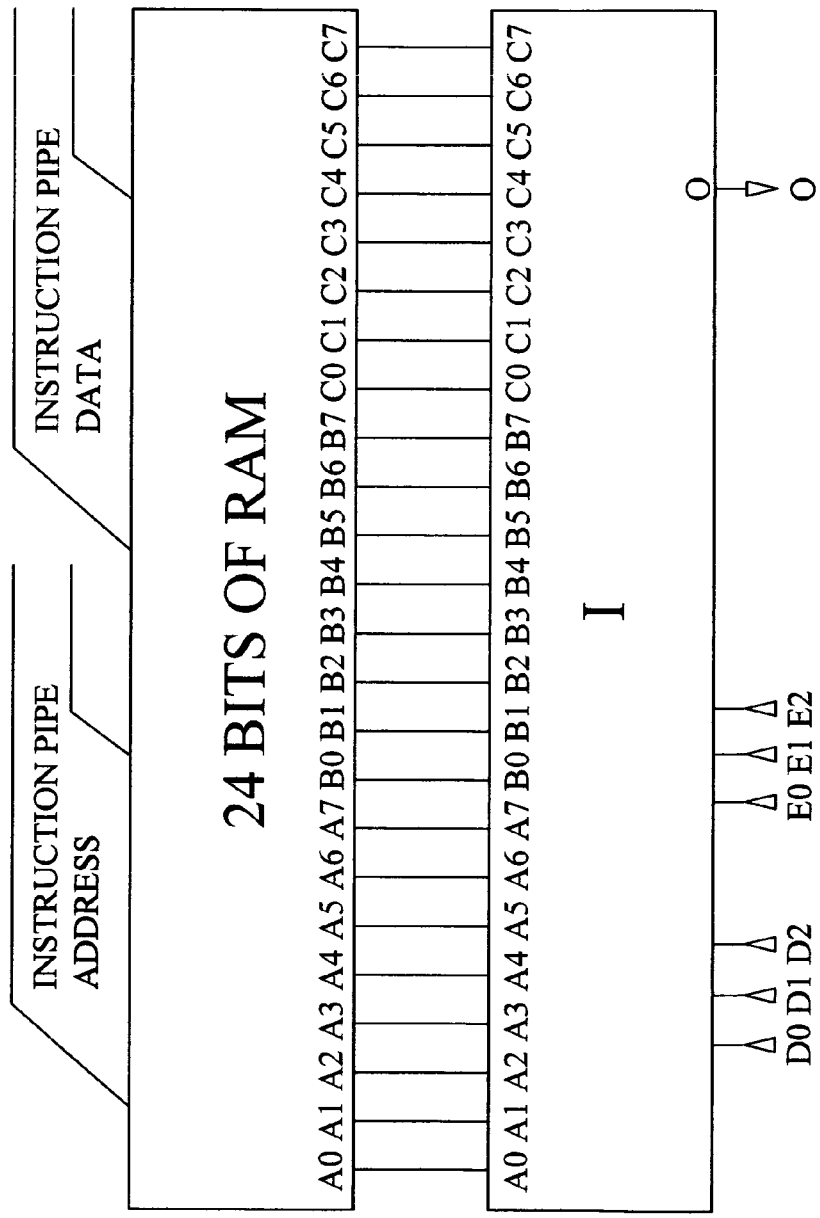
Figure 5L:
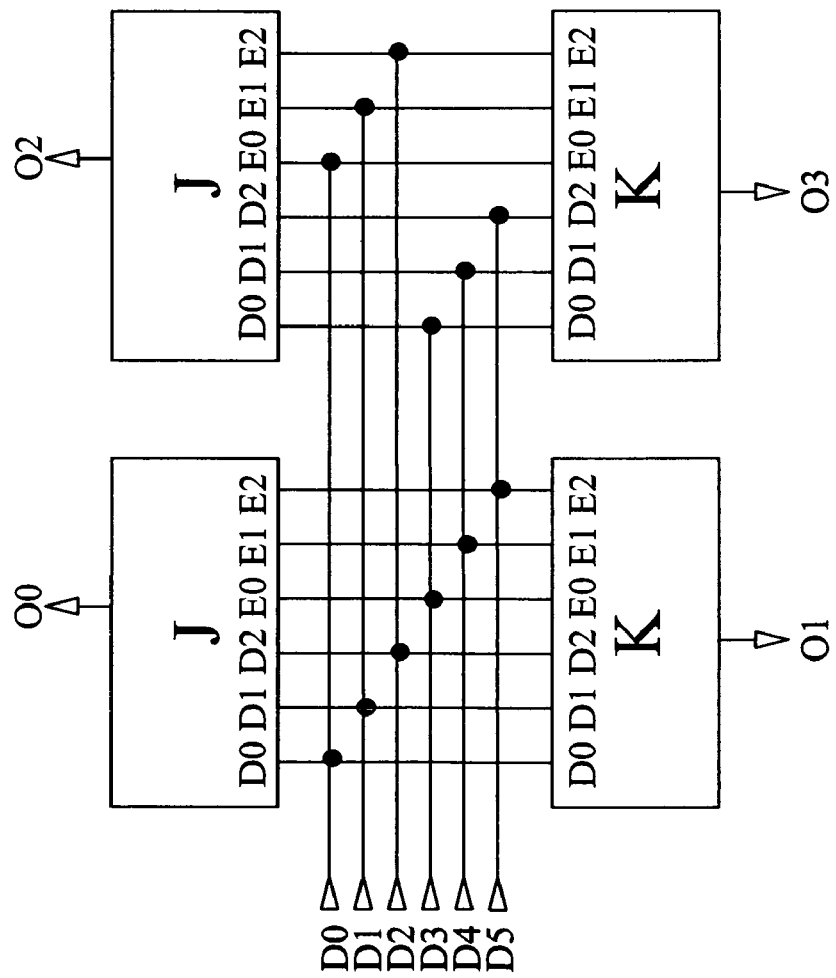
Figure 5M:
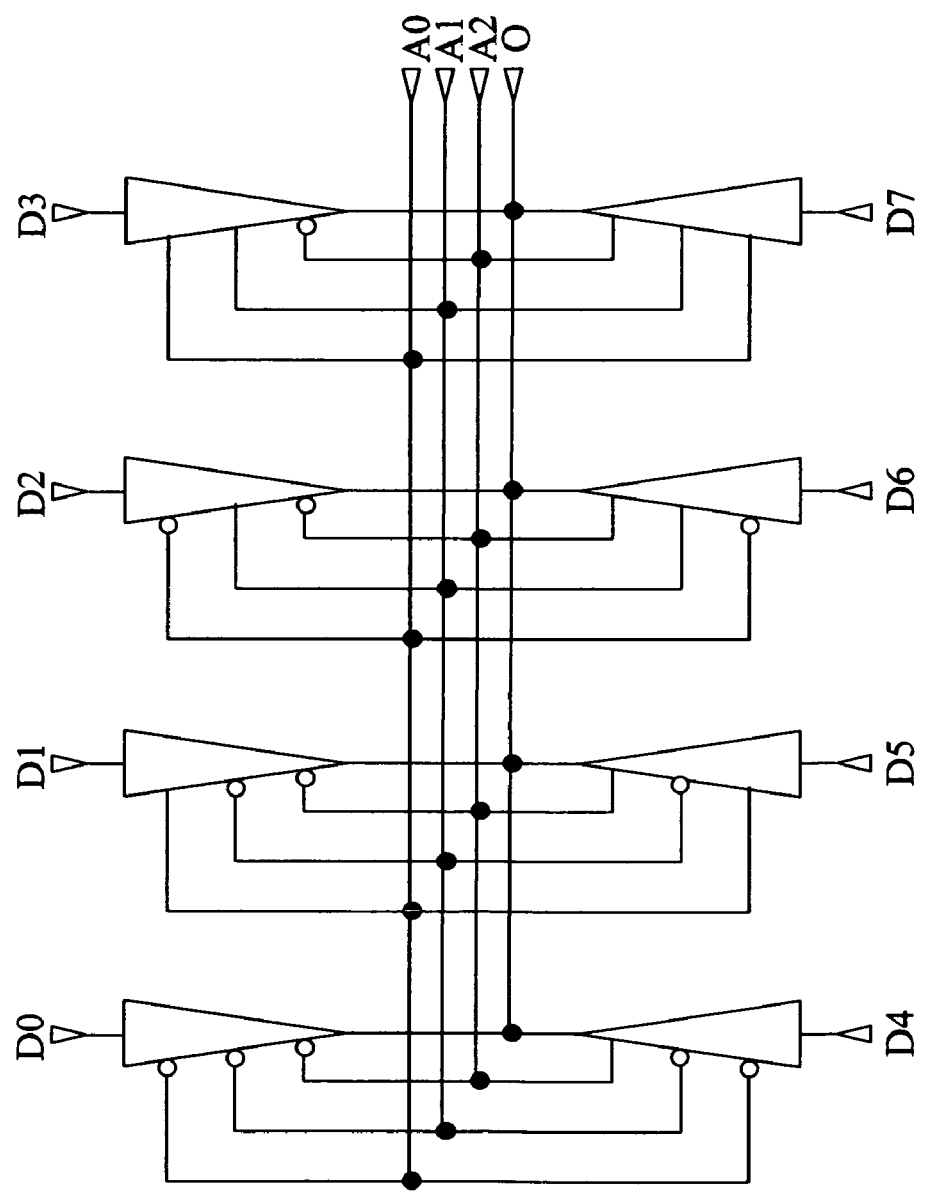
Figure 5N:
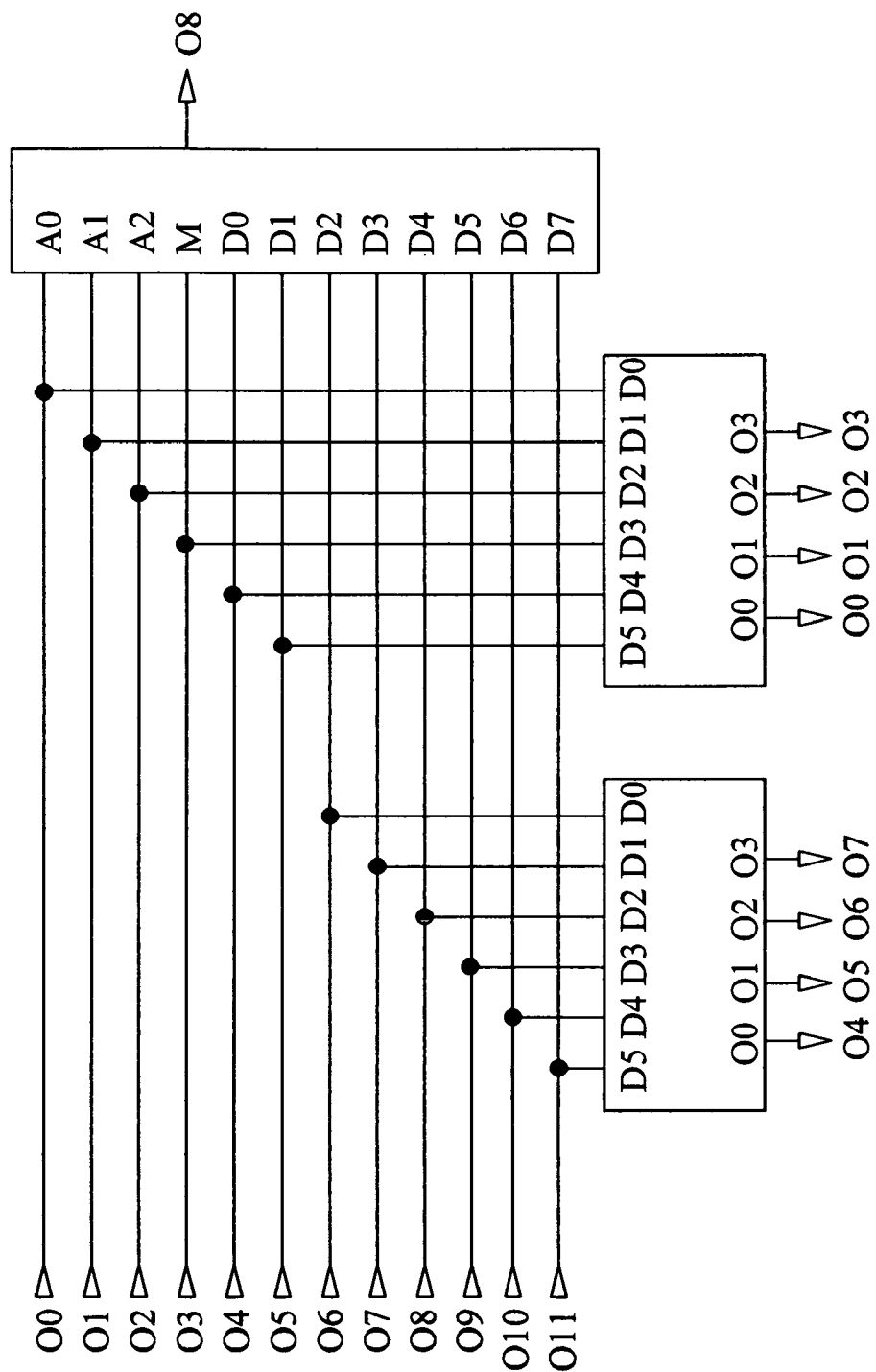
Figure 6E:
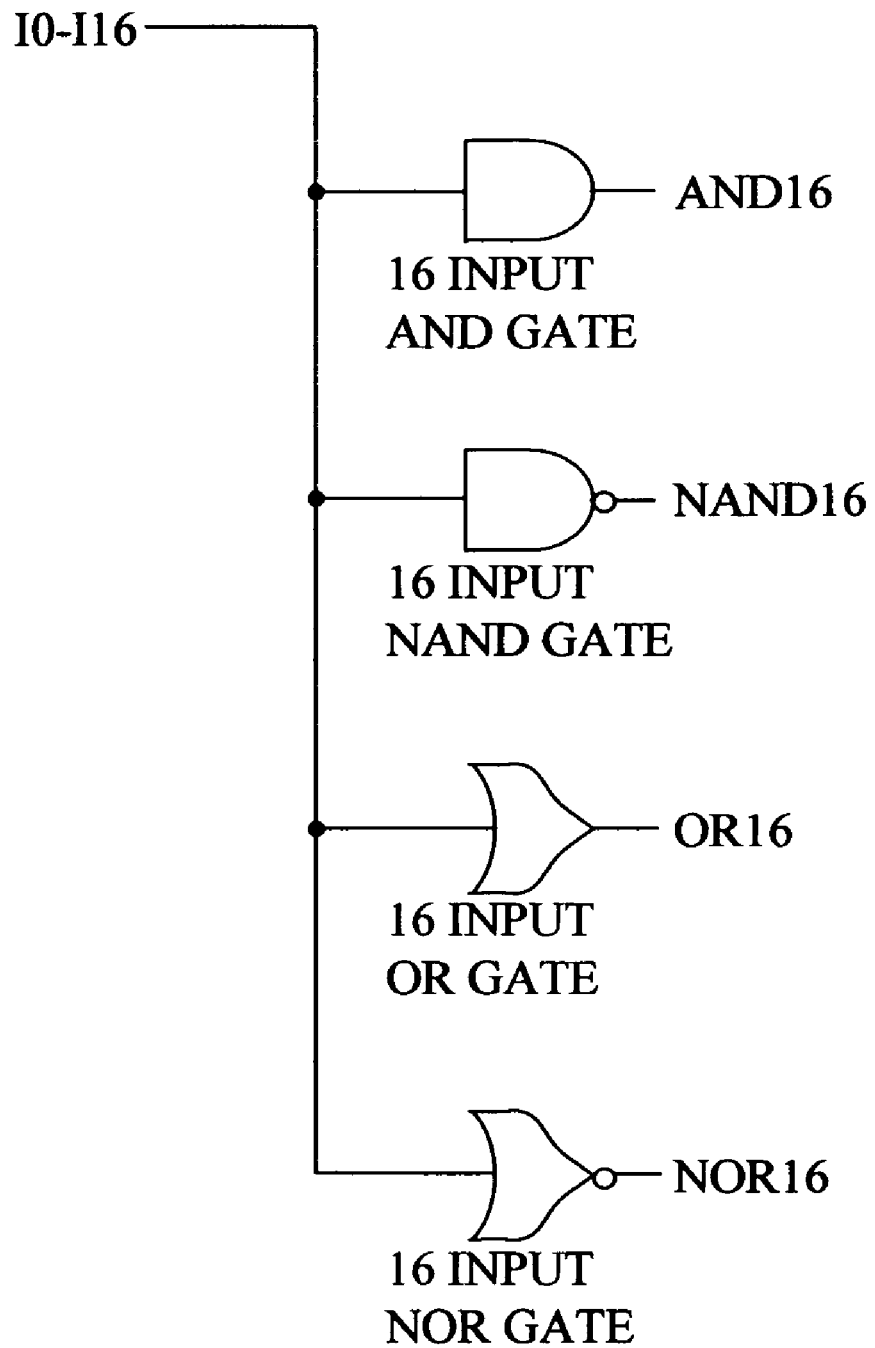
Figure 6F:
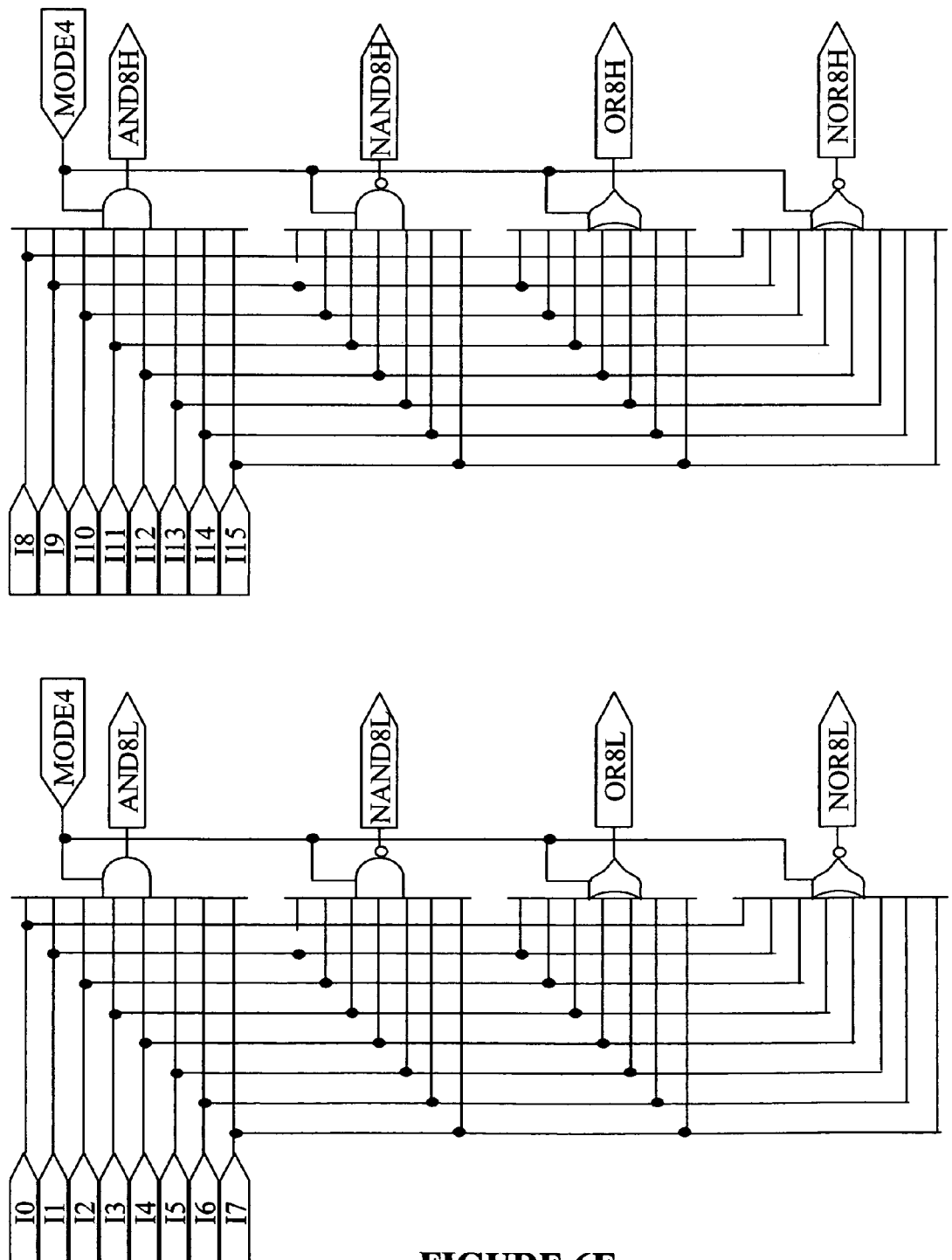
Figure 6G:
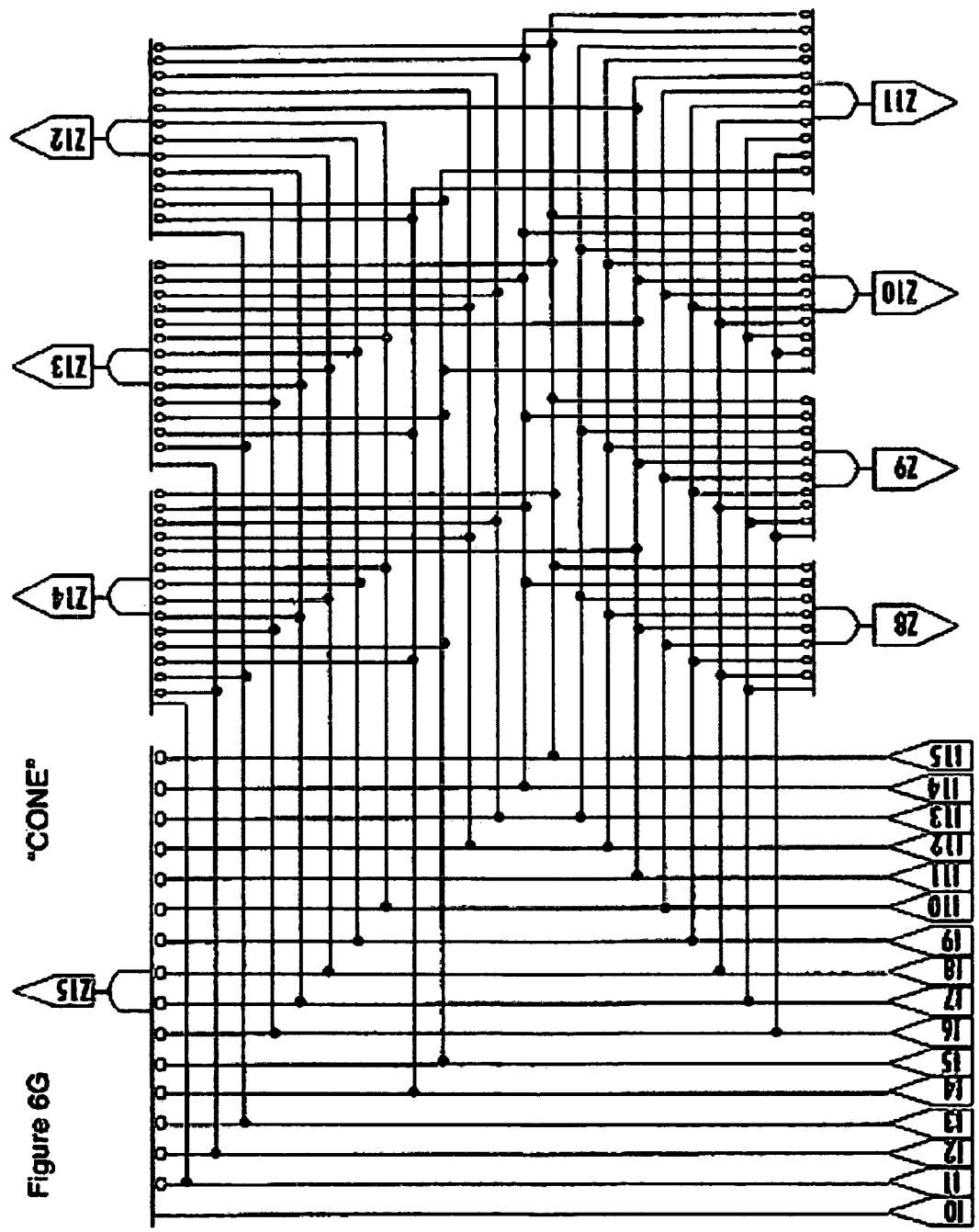

FIGS. 5A through 5N is an alternate preferred embodiment of a mux 36A.

FIGS. 6A through 6H is a schematic diagram of a cone 38.

Figure 7:
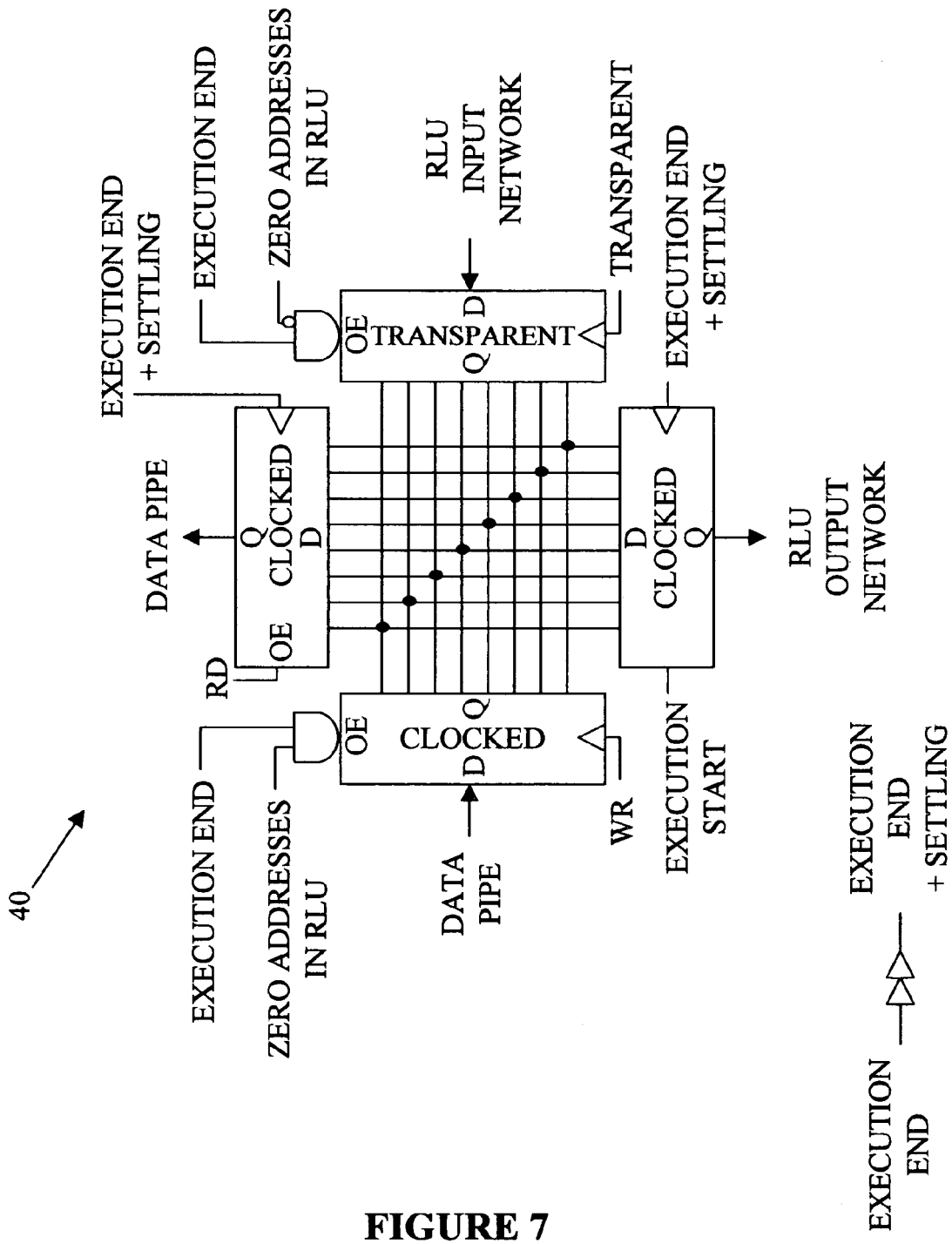
FIG. 7 is a schematic of a preferred embodiment of an iterator.

FIG. 7 is a schematic of a preferred embodiment of an iterator 40.

Figure 8:
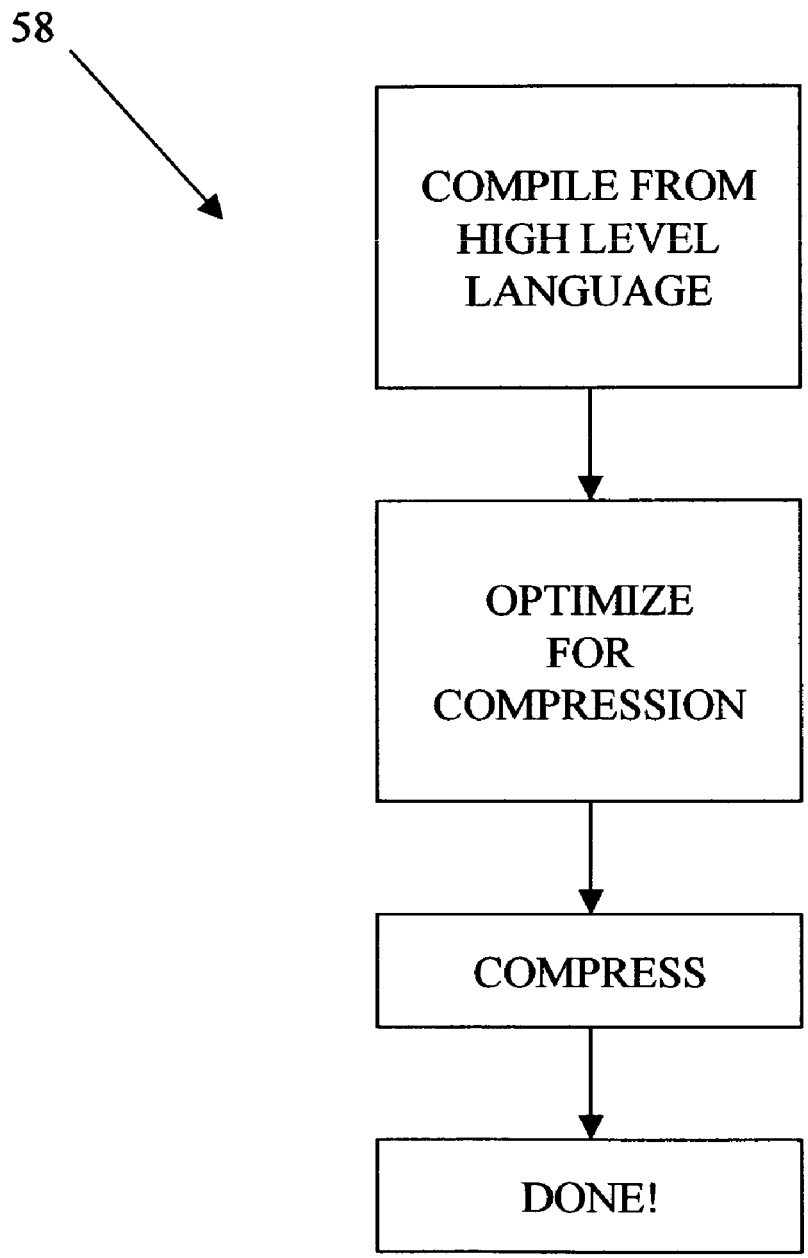
FIG. 8 depicts a program flow of a compiler that accepts source code and generates instructions for the preferred embodiment of the present invention of FIG. 1.

Referring now generally to the Figures and particularly to FIG. 8, a program flow 58 of an invented compiler of certain preferred embodiments of the present invention accepts a source code that may include or consist of a high level language software commands, data and/or program. The invented compiler then creates or generates processor software code that commands, configures, and/or reconfigures the invented processor 2 and/or the alternate invented processors 2 & 48 of FIGS. 1 and 2. The invented compiler then optimizes the processor software code for compression. The optimized processor software code is then compressed. The method of the present invention enables various preferred embodiments of the invented compiler to perform the source code compilation, processor software code compression optimization and the processor software code compression actions in efficient and coordinated temporal actions.

Figure 9:
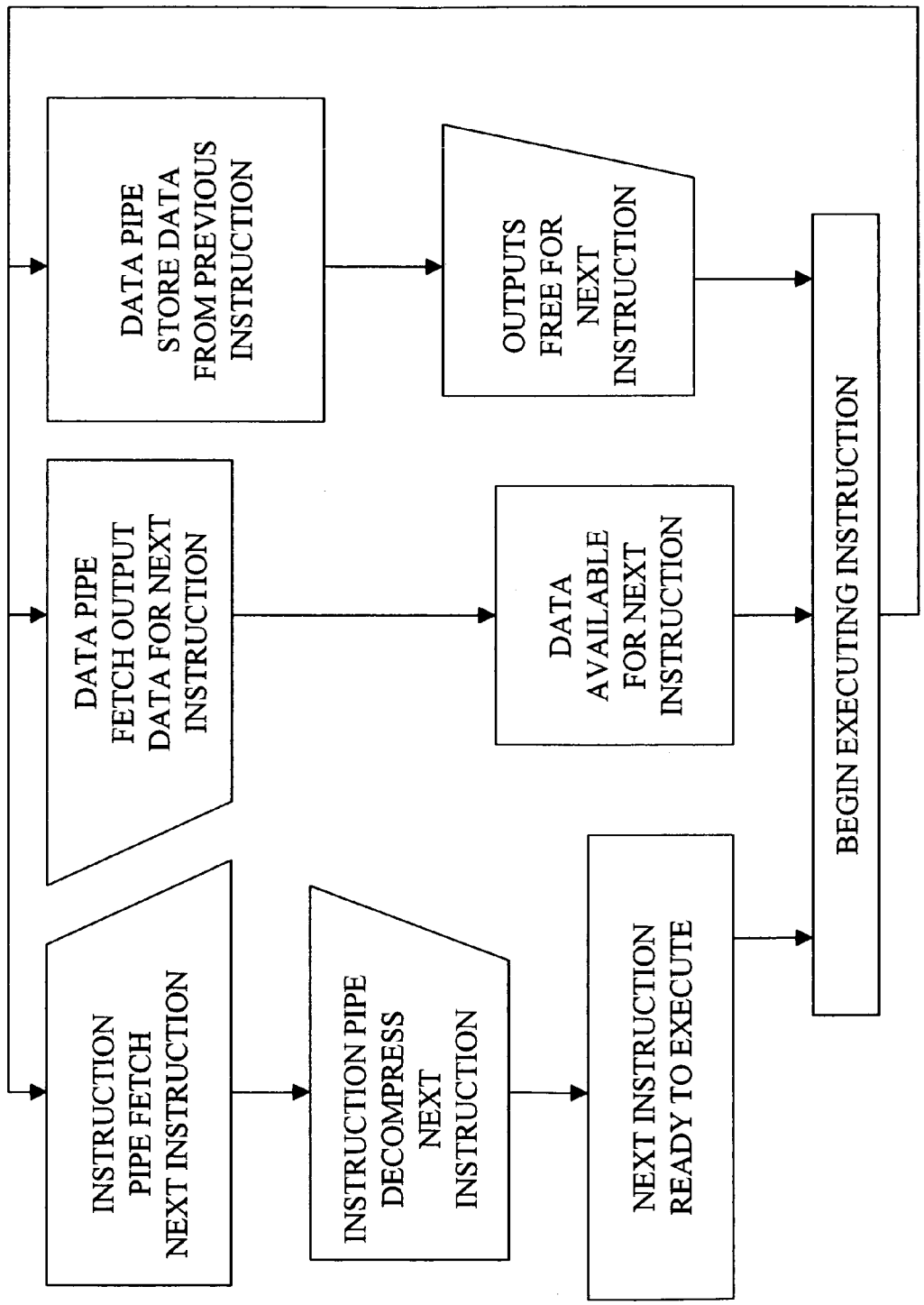
FIG. 9 depicts a flow chart of the configuration and execution of the invented processor of FIG. 1.

Referring now generally to the Figures and particularly to FIG. 9, FIG. 9 is the dynamic logic schematic illustrating an aspect of a preferred embodiment of the method of the present invention teaches that the compressed processor software code is fetched by the invented processor 2 and decompressed. The decompressed processor software code is then used to configure the interconnections and/intraconnections within and among the muxes 36, the cones 38, the iterators 40, the look up tables 42, and other suitable functional logic circuits or suitable memory circuits of the RLU 8, the data pipe 10 and the present invention 2. The data pipe 10 fetches data and makes data available to the RLU 8 and the invented processor 2. The data pipe 10 may store data relating to or generated by the execution of a previous a previous instruction received from the RLU 8 or the invented processor 2. The invented processor 2 then loads decompressed configuration directions into the RLU 8 and begins an execution cycle. The method of the present invention enables the design and use of preferred embodiments of the present invention as described in the Figures in configuring the present invention and providing data to the data pipe 10 and the RLU 8, and managing data within the present invention, and performing an execution cycle, as described in FIG. 9.

Figure 10:
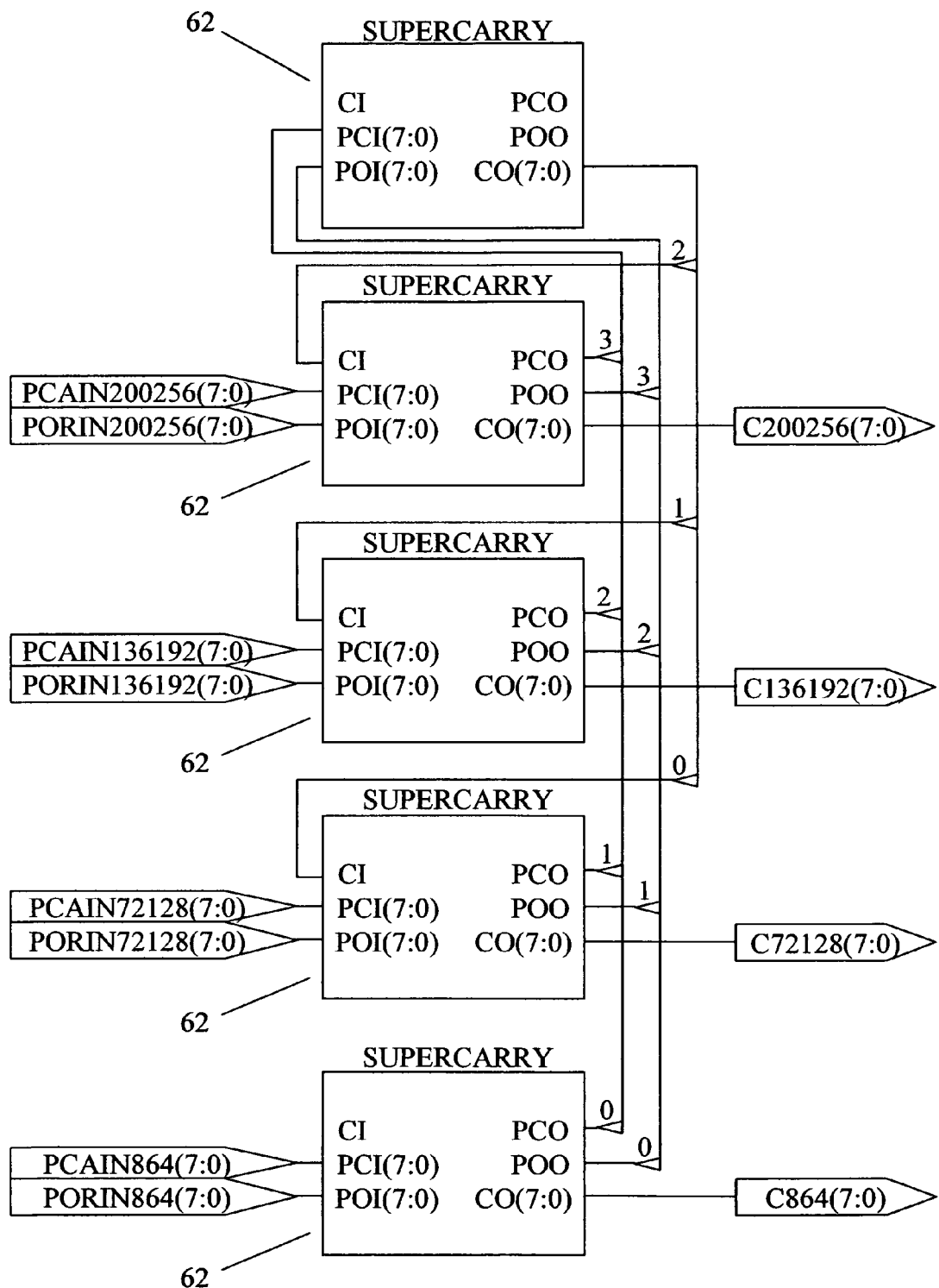
FIG. 10 is a schematic of a plurality of a preferred embodiment of a supercarry circuit.

Referring now generally to the drawings, and particularly to FIG. 10, FIG. 10 is a schematic of a plurality of a preferred embodiment of a supercarry circuit 62.

Figure 11:
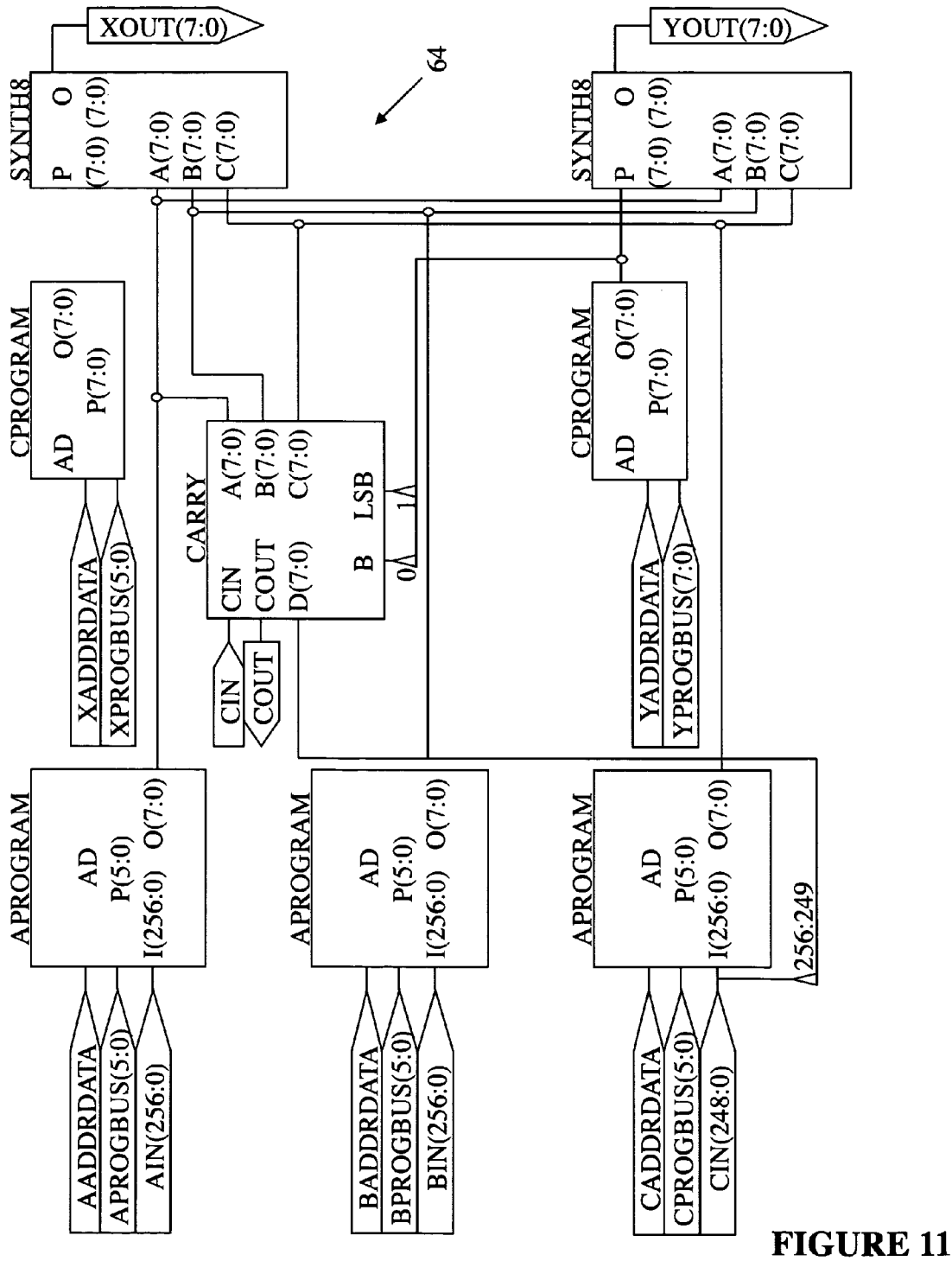
FIG. 11 is a schematic of a preferred embodiment of the mux circuit.

Referring now generally to the drawings, and particularly to FIG. 11, FIG. 11 is a schematic of a preferred embodiment of the mux circuit 64.

Figure 12:
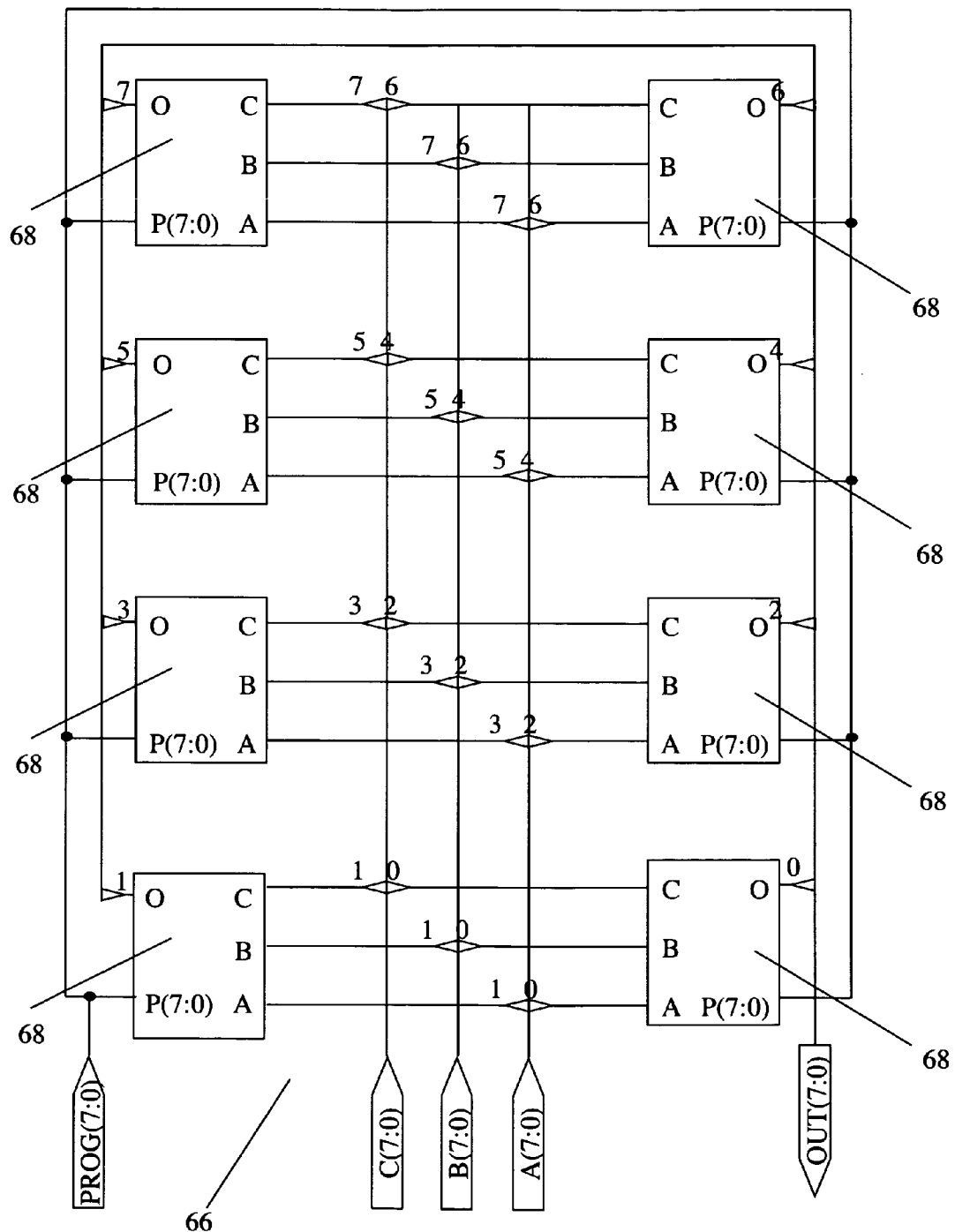
FIG. 12 is a schematic of a circuit having eight alternate preferred embodiments of a mux circuit.

Referring now generally to the drawings, and particularly to FIG. 12, FIG. 12 is a schematic of a circuit 66 having eight alternate preferred embodiments of a mux circuit 68.

Figure 13:
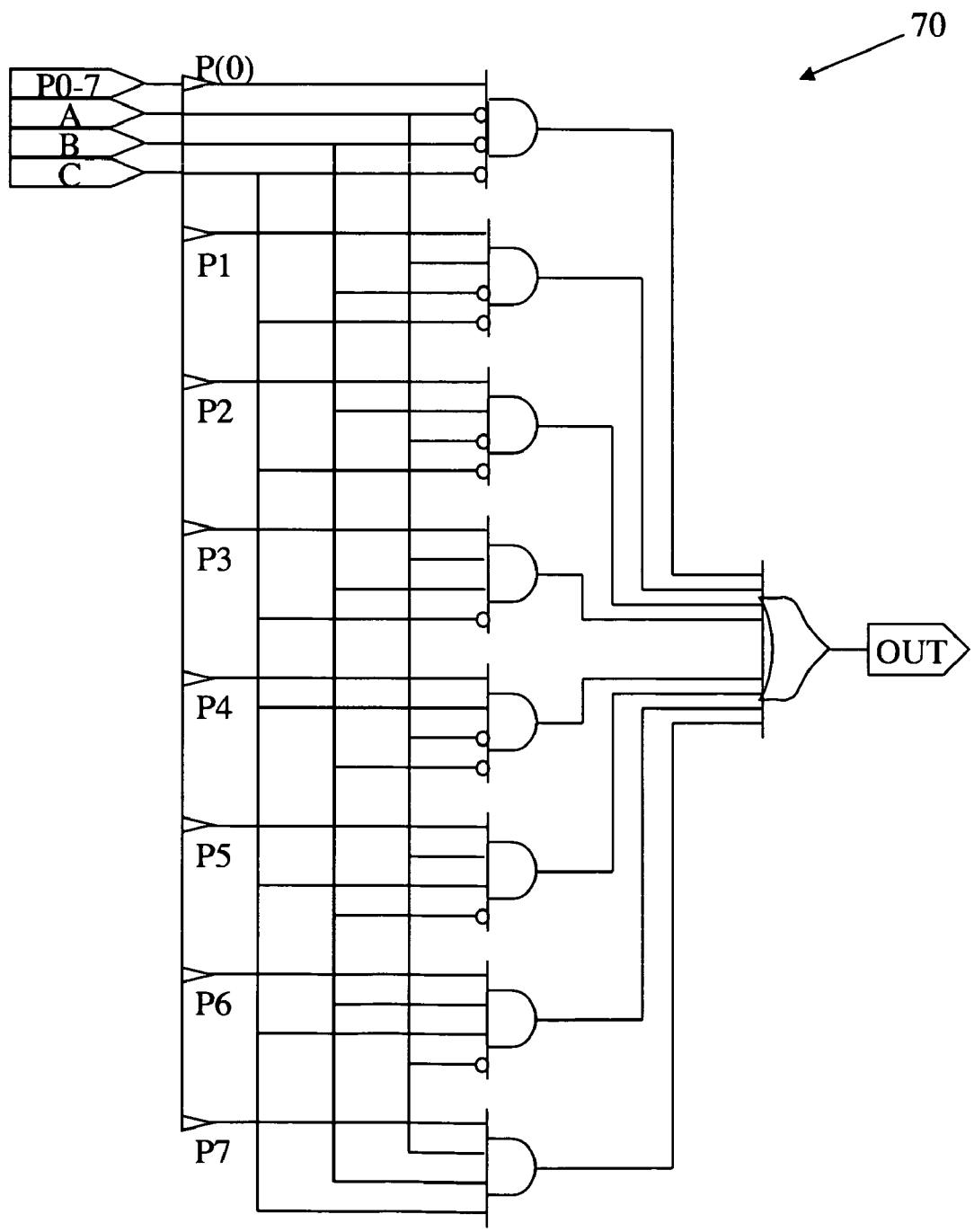
FIG. 13 is a schematic of a one bit wide mux circuit.

Referring now generally to the drawings, and particularly to FIG. 13, FIG. 13 is a schematic of a one bit wide mux circuit 70.

Figure 14:
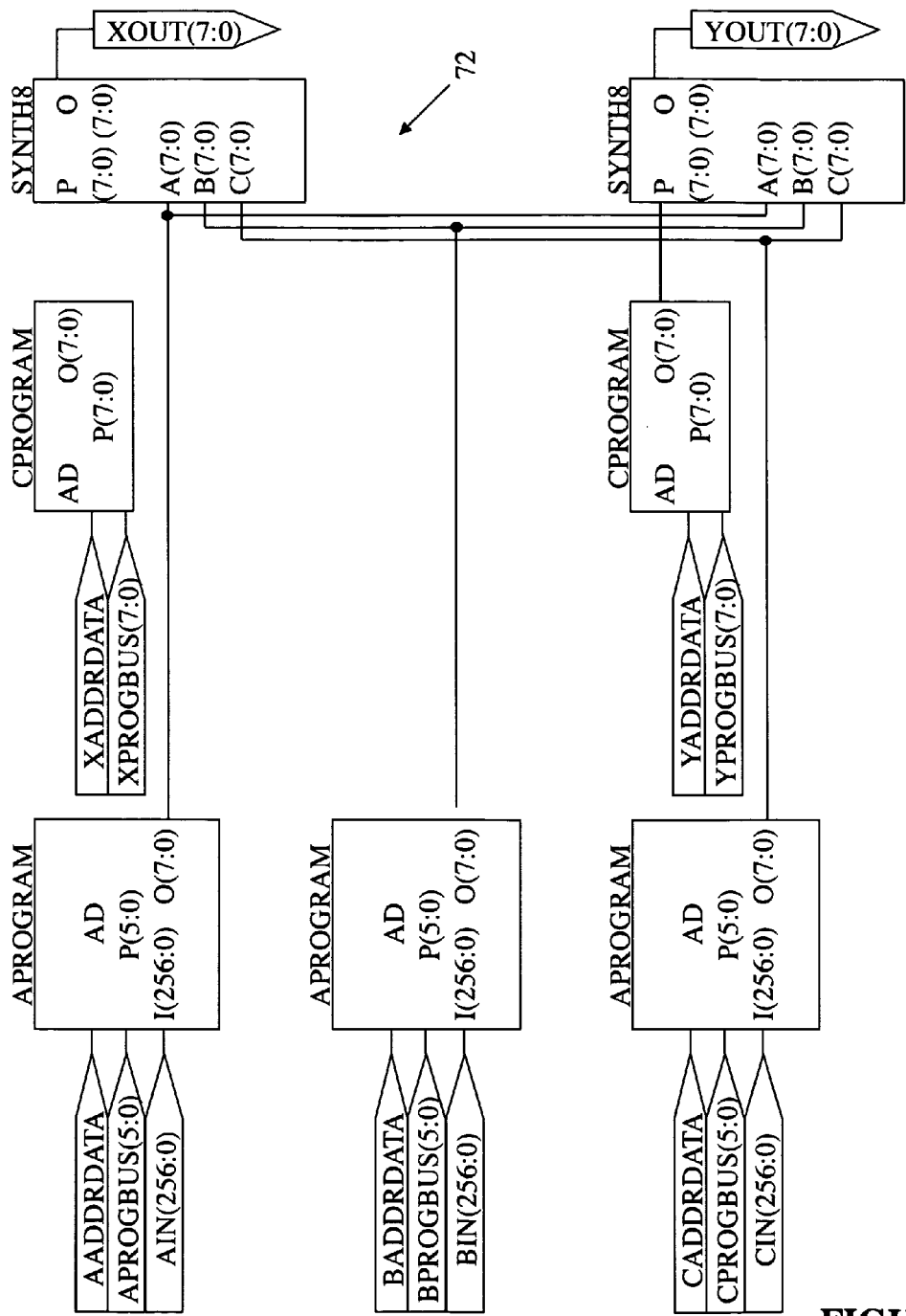
FIG. 14 is a schematic comprising a preferred embodiment of a mux having a 3 byte input and a two byte output.

Referring now generally to the drawings, and particularly to FIG. 14, FIG. 14 is a schematic comprising a preferred embodiment of a mux 72 having a 3 byte input and a two byte output.

Figure 15:
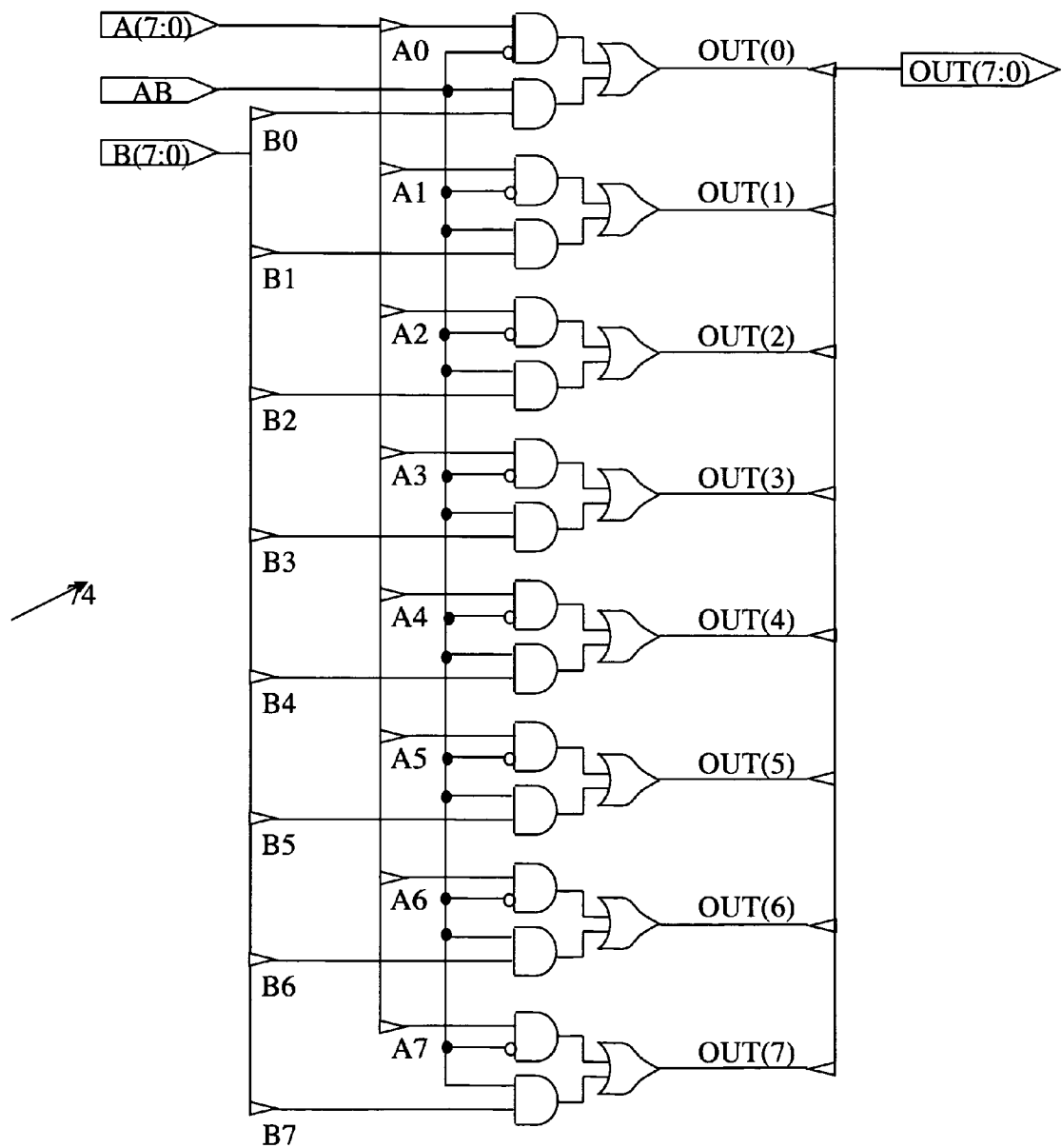
FIG. 15 is a schematic of a part of a preferred embodiment of an iterator circuit.

Referring now generally to the drawings, and particularly to FIG. 15, FIG. 15 is a schematic of a part of a preferred embodiment of an iterator circuit 74.

Figure 16:
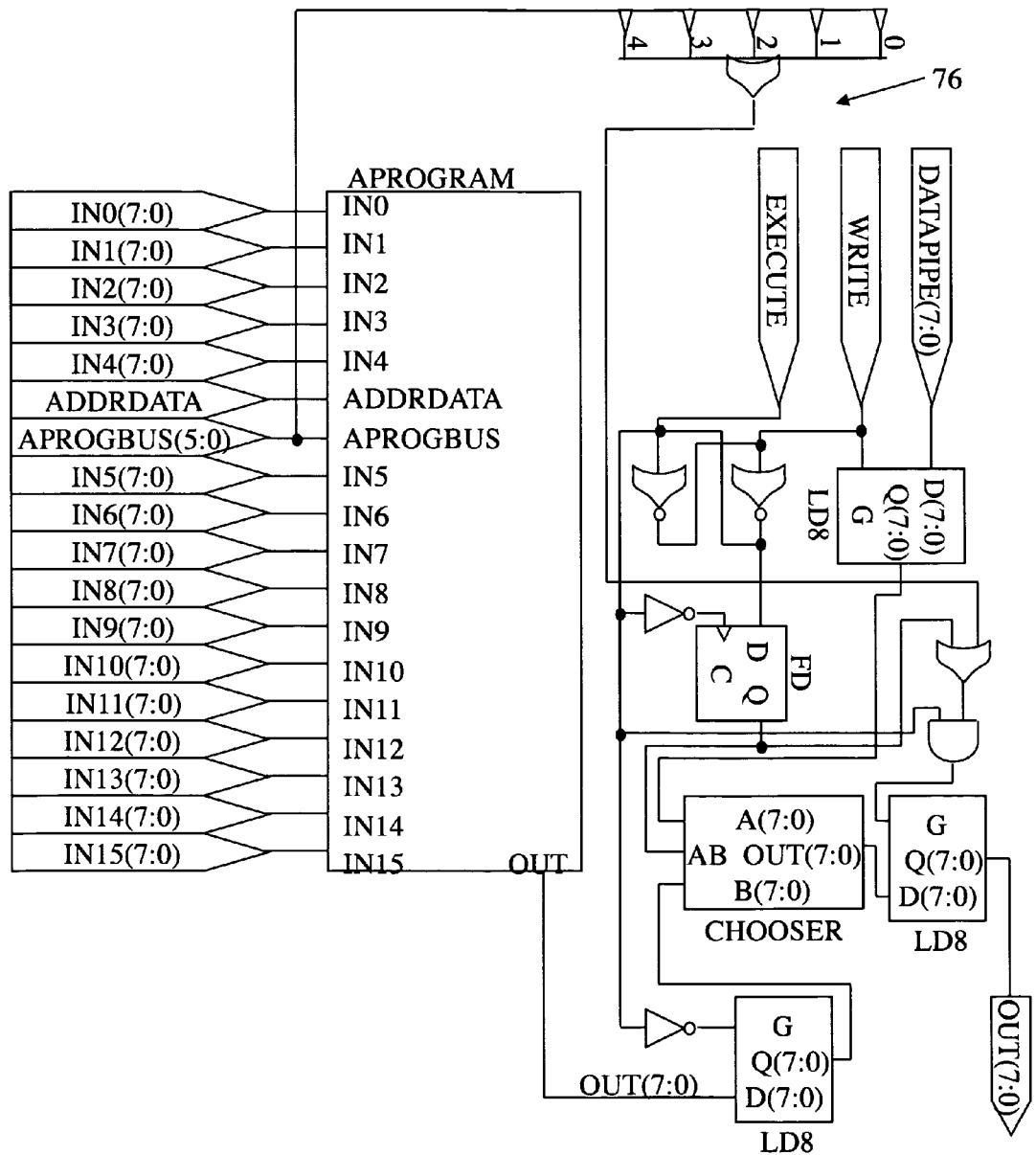
FIG. 16 is an alternate preferred embodiment of an iterator circuit.

Referring now generally to the drawings, and particularly to FIG. 16, FIG. 16 is an alternate preferred embodiment of an iterator circuit 76.

The discussion below refers generally to the drawings, and particularly to Figures A through BB, and describes the a preferred embodiment of the method of the present invention for digital signal processing, or DSP preferred embodiment, which consists of two parts: an Ascenium DSP Processor A0 and an Ascenium Compiler U0. The Ascenium Compiler U0, as shown in FIG. U, takes ordinary high level language code such as that written in FORTRAN, C, or Java, etc. and converts it into a sequence of machine instructions for the Ascenium Processor A0. The Ascenium Processor A0 fetches this sequence of machine instructions and executes it.

Additionally a specially designed Ascenium Debugger is described. This tool is useful for finding and fixing defects in computer programs.

DSP Ascenium Processor A0

Here we will discuss the basic features of the Ascenium Processor A0 and their importance. The remainder of this section will go through each of the major functional blocks of the Ascenium Processor A0 in greater detail. By way of example, a specific design targeting a DSP instruction mix will be discussed: the DSP Preferred Embodiment.

As shown in FIG. A: "DSP Preferred Embodiment Block Diagram," the Ascenium Processor A0 consists of a data movement engine called a Data Pipe (A1), an instruction decoder and loader called an Instruction Pipe (A2), a fine-grained reconfigurable computational array called the Reconfigurable Logic Unit (RLU) (A3), and optionally local on-chip memory resources (A4). The RLU A3 performs all calculations in the device except some data-movement-oriented calculations such as offset calculations, which are performed by dedicated circuits in the Data Pipe. The Instruction Pipe decompresses and loads configuration data for the RLU into the RLU (A5). The Data Pipe controls all data movement in the Ascenium Processor A0 (A6). It also responds to hardware and software interrupts (A7) and performs memory management functions such as address aliasing and memory protection.

The sequence of machine instructions consist of two types of instructions: configuration data for the RLU directed at the Instruction Pipe, known as RLU Instructions, and data movement instructions directed at the Data Pipe, known as Data Directives. Data Directives statically control all data movement in the Ascenium Processor A0, except in the case of the receipt of an interrupt. A state machine in the Data Pipe processes data Directives. There are four types of Data Directives: reads, writes, fetches, and configuration.

Upon reset, the Data Pipe consults an interrupt vector address table to determine the starting address of the first instruction fetch operation. Subsequently, fetches are explicitly called out as instructions embedded in the instruction stream, except in the case of interrupts.

The most important functional feature of the Ascenium Processor A0 is its near-hardware speed computational performance coupled with its ability to be targeted by a Compiler U0 of standard high-level languages such as C, FORTRAN, and Java. The near-hardware performance comes from the feature that for many useful computational situations the average operation performed by the Processor A0 happens in a reconfigurable logic circuit that is settling. This means that other than the overhead introduced by the reconfigurable nature of the circuit, the average operation happens at hardwired hardware speeds. The C programmability comes from three aspects of the Processor A0: 1) its ability to reconfigure on the fly at or near the speed of the processing time of an instruction, 2) its near homogeneous nature from a programming standpoint, 3) its fine-grained nature from a programming standpoint.

Reconfiguration on the fly, that is, continuous dynamic reconfiguration at runtime, is important because high-level programming languages have an implied expectation of an arbitrarily large or infinite in time runtime computational resource such as that offered by a conventional Von Neumann processor. Ascenium's performance is based on the continuous or near continuous execution of large custom RLU Instructions just like a conventional Processor A0s performance is based on the serial execution of instructions in a static instruction set that is arbitrarily long in time.

Without an arbitrarily large or infinite in time computational resource, a high level language Compiler U0 must synthesize computation priorities from guesses about the runtime situation in order to appropriately allocate a finite amount of computational capability across the entire compute problem. This is approximately an n! packing problem where n is the number of operations that could be relevant to overall performance. Many attempts have been made to create such a Compiler U0 that could have reasonable performance in all cases. Though simple cases are easy to synthesize, useful cases have been shown to require human intervention into the design similar to that of a hardware circuit design tool.

The reconfiguration on-the-fly comes from the feature that each logic element, as per FIG. C requires relatively few bits of programming to do its job, something like 100 times less than that of a standard FPGA. Because there are fewer bits to program in a short time, the wires can be built to deliver the configuration data in parallel rather than serially as in FPGAs. This can result in a fixed programming time on the order of 20 clock cycles or less rather than a serial programming time for FPGAs determined by the number of logic elements in the device and conventionally lasting half a second to many seconds.

Another important feature to automatic programmability is the homogeneity and granularity of the device. In a non-homogeneous and coarse-grained device such as a modern VLIW DSP, it has proven intractable to map regular C code implementations of popular algorithms using a C Compiler U0 on to this DSP hardware. Instead, hand coded libraries that have been developed in conjunction with the architecture are used. If a given algorithm is not available as a hand-coded library, then to receive optimal or near-optimal solution, hand coding is required. C Compiler U0s for these architectures can produce functional solutions in all cases, but these solutions tend to be unacceptably sub-optimal.

In standard programmable DSP devices, optimal performance depends on making use of multiple arithmetic units that may vary in their capabilities along with special preprogrammed data streaming modes. These features must often be used together in particular ways to achieve performance. How does the Compiler U0 identify in the fine-grained structure of C code a pattern that will fit into this particular hardware optimally? Similarly, how does the Compiler U0 pack the work to be done optimally into all different kinds of hardware resources? These are the problems that have confounded Compiler U0 writers for these architectures.

In contrast, with Ascenium Processor A0s, the logic elements C0 in the RLU have near-homogeneous capabilities and near-homogeneous access to external data, allowing any of them to be used to satisfy any fine-grained C operation called out in the code. This makes it straightforward for Ascenium's C Compiler U0 to map a given C computational or data movement operation to a given resource, and thus there is no need in Ascenium's Compiler U0 to identify large-scale algorithmic constructs in the C code. Similarly, packing is straightforward because in most circumstances the next empty logic element is used to fulfill the operation. There is some small need to consider alternate mappings due to small non-homogeneities, but the Compiler U0 need only find the first of many available near-optimal solutions instead of few or one available solution in the conventional DSP case.

Features of the Ascenium DSP Processor A0, as indicated on FIG. B, "DSP Preferred Embodiment Features":

Near hardware performance for many instruction mixes (B1)

Targetable by high-level languages like C

Most computations performed in a fine grained homogeneous array of computational logic elements (RLU) (B2)

Very fast instruction/circuit reconfiguration time due to few programming bits and parallel load and optional hardware decompression (B3)

Design intention is towards resource homogeneity versus designing specific special hardware & computation for a few cases Executes many loops as RLU instructions (B4)

Performs arbitrary execution pipelining down to one RLU timer cycle (B5)

RLU instruction back buffers for pipelined instruction loading and quick instruction swapping (B6)

Asynchronous interrupts (B7)

Explicit software scheduled block fetches (B8)

Optional variable width hardware stack (B9)

Optional hardware decompression of RLU instructions (B10)

High bandwidth rapid access variable width local memory (B11)

Optional iteration/loop counter separate from the RLU (B12)

Logic Element

FIG. C: "DSP Preferred Embodiment Logic Element Block Diagram" is a block diagram of this DSP logic element C0. The details of each of these blocks are described in subsequent subsections. The logic element is designed to perform the computational operations of the software in an efficient manner. Logic elements taken as a whole need to be able to perform all necessary parts of software computations so that when used as a group they can perform any operation that appears in software. Minimally this functionality would include bitwise logic (C1), wide logic (C2), and bit shifting (C3). Practically it would almost certainly include things like dedicated fast carry circuitry (C4).

The optimization question for a given instruction mix is between size and functionality. Logic elements need to be small to minimize the power consumed by the RLU connections running long distances across many logic elements. Logic elements must be able to do the instruction mix they are given quickly and in a small number of elements. In some cases this might involve giving some logic elements special non-homogeneous properties in order to have a balance between small size and efficient operation. When this is done great care must be taken to co-design effective Compiler U0 optimization techniques that can handle the added heterogeneity.

General logic element features, as shown in FIG. D, "DSP Preferred Embodiment Logic Element General Features":

- Several inputs, each selectable among a number of inputs from other nearby logic elements (D1)
- One or more outputs (D2)
- Static (configurable) or dynamic bit and word shift (D3)
- Wide 3-to-1 lookup tables for digital math bitwise logic (D4)
- Modular fast carry/borrow circuit for fast/small adds and subtracts (D5)
- General purpose wide logic AND, OR, NAND, NOR (D6)
- Partial product circuitry for faster/smaller multiply (D7)
- Configurable bit-to-word circuitry (D8)
- Some words of persistent storage and I/O (D9)
- Optional zero counter for fast/small floating point add/subtract (D10)

In this and following subsections, we will be describing a specific design for a DSP-like mix of instructions. From the logic element's perspective, for this design, we will assume a mix of operations roughly as follows:

- 24% 16-bit add/subtract
- 16% 32-bit add/subtract
- 14% 16-bit full multiply (32-bit result)
- 11% 16-bit less than
- 8% 16-bit wide NOR
- 5% 32-bit fixed shift
- 5% 16-bit choose
- 4% 8-bit wide NOR
- 4% 8-bit add/subtract
- 2% 8-bit bitwise XOR
- 1% 16-bit bitwise OR
- 1% 16-bit variable shift
- 5% Miscellaneous Some design decisions can be made based on this mix of operations. 16-bit wide lanes are indicated because the small number of 8-bit or smaller operations doesn't justify the added addressing circuitry needed by finer grained addressing. Adds and subtracts are very important. Stuff that slows them down clearly needs to be avoided unless avoiding it makes something in the set of required operations impossible. Multiplies are very important, and a closer examination of the algorithms that make up the instruction mix shows additionally that most multiplies are part of multiply-accumulate operations. A study of circuit size against performance suggested that having half a 16-bit full multiplier per logic element might be the best way to go with the design even though it would add some heterogeneity to the Compiler U0's job.

Specific DSP logic element features as shown in FIG. E: "DSP Preferred Embodiment Logic Element Specific Features":

- Three 16-bit wide inputs each selecting from 32 previous logic element outputs (E1)
- Two 16-bit wide outputs that can be configured on/off (E2)
- Configurable full static or dynamic shift of all three inputs (E3)
- Two 16-bit wide 3-to-1 bitwise lookup tables (E4)
- 16 bits of modular fast carry/borrow circuit with programmable carry in bit (E5)
- 16 bits of wide AND, OR, NAND, and NOR (E6)
- ½ of a 16-bit full multiplier (using existing fast add circuitry for the final stage) (E7)
- 16-bits of configurable bit-to-word circuitry (E8)
- Three 16-bit storage and I/O registers (E9)
- 16-bits of zero counter for fast/small floating point adds (E10)
- Dedicated multiply-accumulate circuitry (E11)

Inputs

In the DSP logic element example there are three 16-bit inputs labeled Input A, Input B, and Input C. FIG. F: "DSP Preferred Embodiment Logic Element Input B Block Diagram" shows Input B in detail as an example.

All three of the inputs can receive input from the outputs of the previous eight logic elements (F1). In addition, this output can be bit-shifted either statically from a configuration value or in the case of Inputs A and B, dynamically configured based on the value of Input C (F2). The bit shift can also be a bit rotate of the addressed word (F3). The value shifted in can also be all zeroes, or in the case of Inputs B and C, ones or a sign extension (F4). Each input can also accept input from the same 16 distant outputs (F5). Inputs A, B, and C also accept input from Iterators X, Y, and Z, respectively (F6).

Input B can also accept input from Iterator Z (F7) and can switch between accepting input from Iterator Y to accepting input from Iterator Z (F8). This feature is called "click flip" and is useful for making more complete use of the array when processing FIR filters. Click flip is reset when a new instruction is loaded. In the second execution cycle for the given RLU Instruction, Logic Element 0 flips from Y to Z input if it is using the click flip input. At the beginning of each subsequent execution cycle, the next higher address logic element flips from Y to Z input if it is using the click flip input. So the click flip ripples through the RLU.

Input C does not dynamically shift its inputs. It additionally accepts input from the fast carry circuit.

Multiplier-Accumulator

In the DSP Preferred Embodiment Logic Element the designed multiplier can be configured to either produce the high word or low word of a 16-bit full multiply or multiply accumulate. FIG. G: "DSP Preferred Embodiment Multiplier-Accumulator Block Diagram," shows two logic elements combined to make a multiply accumulate function.

Each logic element contains one half of a radix-4 partial product generation block (G1). In the case of the high word, bits are reversed going into this block (G2). This, along with a slight modification of the partial product block, switches it from generating the lower half of the partial products to the upper half of the partial products. These partial products are then reduced in a Wallace Tree network (G3) with carry in from the low word Wallace Tree network (G4). An accumulated sum is also optionally fed in at this stage (G5). Finally, each half-multiplier uses the 16-bits of fast adder in the logic element to produce the final 32-bit multiply accumulate.

Modular Fast Carry/Borrow

FIG. H: "DSP Preferred Embodiment Modular Fast Carry/Borrow Block Diagram" shows the modular carry/borrow circuit that connects among individual logic elements for faster large carries and borrows. The circuit in each logic element is a 16-bit carry circuit that can invert (ones complement) the B operand and introduce a one, a zero, or the carry in bit as the carry in bit to turn the circuit into a carry or borrow circuit (H1). Because the one or zero is separately selectable the circuit can also add one to a conventional fast add operation or subtract one from a conventional fast subtract.

These 16-bit carry/borrow circuits are in turn connected to a larger carry borrow circuit (H2). They input their carry out and the OR of all their inputs (H3) and in turn receive modular carry/borrow information from lower order logic elements more rapidly than a ripple carry would allow (H4).

Lookup Tables

In the DSP logic example this circuit is a bitwise 3-to-1 lookup table requiring 8 bits of configuration information. Each bit performs the same logic operation. One bit slice of the lookup table can be seen in FIG. 1: "DSP Preferred Embodiment 3-to-1 Lookup Tables Bit-Slice Schematic—Bit 0." In this circuit, different level combinations of three bits A, B, and C (I1) are combined with 8 bits of configuration (I2). Only one of the resulting NAND outputs (I3) can be low. Based on the state of the configuration bit for that sequence, the output is low if the programming bit is high and vice versa. If the output is low the output of the final NAND (I4) is high, otherwise it is low. Thus the circuit can with eight bits of configuration produce any logical combination of the three input bits.

One of the 16-bit 3-to-1 lookup tables shown in the logic element block diagram is shown in block diagram form in FIG. J: "DSP Preferred Embodiment Lookup Table Block Diagram." Sixteen copies of the bit slice circuit are used together (J1) with each three bit input connected to one of the three input words at the same bit order (J2). The outputs are collected into a 16-bit word (J3). Every bit slice is configured with the same byte (J4).

Iterators

An iterator is shown in FIG. K: "DSP Preferred Embodiment Iterator A Schematic." Each iterator has a forward DQ type latch (K1) that contains data that is asserted by the iterator (K2) and readable by the data pipe (K3). This forward latch is clocked by the timer execute signal (K4) so that new data is latched at the beginning of every execute cycle. A multiplexer that selects between two inputs (K5) feeds this latch. Based on the configuration, input can either come from signals in the logic element (K6) or from a latch that initializes to zero and can be modified by the Data Pipe (K7).

Wide Logic Functions

In the DSP Preferred Embodiment, several wide logic functions are combined in one block. First there are four 16-bit wide gates: AND, OR, NAND, and NOR. Second there is the bit-to-word circuit. It expresses a given bit of the input word as a 16-bit word. For example if bit 5 of Input C is one and the circuit is configured to grab bit 5 of Input C, the resulting word will be 0xffff. If enabled, the zero digit counter counts the number of zero binary digits left to right in the input word. This operation is generally used as a precursor to dynamic bit shifting to normalize the result mantissa of a floating point add/subtract.

Outputs

There are two 16-bit outputs in the DSP logic element example design. Output B is pictured in FIG. L: "DSP Preferred Embodiment Output B Block Diagram." The output multiplexes (L1) among seven possible inputs from the logic element (L2). A final enable stage (L3) enables or disables the drivers (L4) that assert the output among neighboring logic elements.

Configuration Image

Input selection is programmed with a 32-bit word:

| Bits | Description |
| --- | --- |
| 0-3 | Input A bitwise addressing |
| 4-6 | Input A word addressing. If = 7 bitwise addressing is interpreted as follows: 0 = near word straight up, 1 = dynamic, 2 = iterator X, 3-7 reserved, 8-f = distant addresses 0-7 |
| 7 | Input A selects X/Y outputs for input |
| 8-9 | Input A shift mode: 0 = contiguous, 1 = rotate, 2 = zeroes left, 3 = zeroes right |
| 10-13 | Input B bitwise addressing |
| 14-16 | Input B word addressing. If = 7 bitwise addressing is interpreted as follows: 0 = near word straight up, 1 = dynamic, 2 = iterator Y, 3 = iterator Z, 4 = click flip from iterator Y to iterator Z, 6-7 reserved, 8-f = distant addresses 0-7 |
| 17 | Input B selects X/Y outputs for input |
| 18-20 | Input B shift mode: 0 = contiguous, 1 = rotate, 2 = zeroes left, 3 = zeroes right, 4 = reserved, 5 = signed right, 6 = ones left, 7 = ones right |
| 21-24 | Input C bitwise addressing |

-continued

| Bits | Description |
| --- | --- |
| 25-27 | Input C word addressing. If = 7 bitwise addressing is interpreted as follows: 0 = near word straight up, 1 = fast carry, 2 = iterator Z, 3-7 reserved, 8-f = distant addresses 0-7 |
| 28 | Input C selects X/Y outputs for input |
| 29-31 | Input C shift mode: 0 = contiguous, 1 = rotate, 2 = zeroes left, 3 = zeroes right, 4 = reserved, 5 = signed right, 6 = ones left, 7 = ones right |

Internal configuration is also programmed with 32 bits:

| Bits | Description |
| --- | --- |
| 0-7 | LUT X configuration byte |
| 8-15 | LUT Y configuration byte |
| 16 | Carry/Borrow. If = 1 input B is complimented at the input to carry/borrow |
| 17-18 | Carry in bit: 0 = carry in zero, 1 = carry in one, 2 = carry from previous element, 3 = carry from modular carry circuit |
| 19-23 | Special purpose configurations: 0-15 bit-to-byte bit selection of input C, 16 = AND input C, 17 = OR input C, 18 = NAND input C, 19 = NOR input C, 20 = AND LUT Y, 21 = OR LUT Y, 22 = NAND LUT Y, 23 = NOR LUT Y, 24 = reserved, 25 = zero count, 26 = low multiply, 27 = high multiply, 28 = low multiply accumulate, 29 = high multiply accumulate, 30 = reserved, 31 = disable |
| 24-25 | Output X: 0 = disable, 1 = LUT X, 2 = input A, 3 = iterator X |
| 26-28 | Output Y: 0 = disable, 1 = LUT Y, 2 = input A, 3 = wide logic, 4 = input B, 5 = iterator Y, 6 = input C, 7 = iterator Z |
| 29 | Iterator X input select: 0 = LUT X, 1 = Data Pipe |
| 30 | Iterator Y input select: 0 = LUT Y, 1 = Data Pipe |
| 31 | Iterator Z input select: 0 = wide logic, 1 = Data Pipe |

Reconfigurable Logic Unit (RLU)

The RLU is made of an array of logic elements. The array can be any shape or in the general case. In the DSP Preferred Embodiment the array contains 128 logic elements (C0) arranged in 8 rows and 16 columns as shown in FIG. M: "DSP Preferred Embodiment Logic Elements in RLU."

The RLU has three kinds of busses connecting the logic elements with each other and the outside world. The first are the data busses. These one-way busses distribute data from logic elements to other higher address logic elements in a toroidal connection fashion. The second are I/O busses. These busses carry data bidirectionally between the data pipe and the logic element iterators in the RLU. The third are configuration busses. These are one-way busses that bring configuration data to the back buffers of the logic element configuration circuitry.

Data Busses

In the general case, the data busses could connect to logic elements arbitrarily far ahead in the RLU. In the DSP Preferred Embodiment RLU the X and Y of each logic element connect to the following relatively addressed logic elements: +1, +2, +3, +4, +5, +6, +7, +8, +10, +12, +14, +16, +18, +20, +22, +24.

Two routing examples are explicitly shown. The routing for logic element 28 is shown in FIG. N: "DSP Preferred Embodiment RLU Data Busses Example 1." The routing for logic element 49 is shown in FIG. O: "DSP Preferred Embodiment RLU Data Busses Example 2" to show how routing wraps around from one side of the array to the other.

I/O Busses

The I/O busses can be few or numerous in the general case. The can come in from one or two sides of the RLU. In the DSP Preferred Embodiment design there are three 16-bit I/O busses per column each with a separate memory unit on one side of the RLU for a total of 48 busses and memory units. Each memory unit has three bits of programming that determine which logic element will assert data on the bus if it is read. In addition each logic element has one bit of programming per iterator that determines whether it receives data from the Data Pipe or from within the logic element. FIG. P: "DSP Preferred Embodiment RLU I/O Busses" shows how these busses run in the RLU.

Configuration Busses

Configuration data busses in the general case can come in from one or two sides of the RLU. In the DSP Preferred Embodiment configuration busses come in from both the left and right sides of the RLU as shown in FIG. Q: "DSP Preferred Embodiment RLU Configuration Busses." Two busses per row come in from each side: the 32-bit connectivity programming bus and the 32-bit configuration programming bus. On these busses logic element back buffers are filled from the middle of the RLU out to the edges.

Block Addressing

In the DSP case we're considering, most DSP operations are 16 bits wide and one logic element can therefore handle most operations. In the general purpose programming case and for Processor A0s optimized for bitwise operations, the data paths might be 1 bit wide or 8 bits wide while the width of an average operation might be 32 bits. In this case, it makes sense to have block addressing on the configuration bus and program the logic elements in groups. For example, you could set it up so that logic elements that were not configured and had an address less than or equal to the address on the bus get configured with the data. This can provide RLU instruction size (in memory) reductions of four or more in some cases.

Instruction Pipe

The Instruction Pipe receives RLU Instructions from the Data Pipe, optionally decompresses them, and writes them into the back buffer of the RLU. In our Preferred Embodiment DSP design, we have opted to save the gates of any decompression engines and load and execute full size RLU Instructions with no decompression. Since there are 128 logic elements in the RLU and each takes 64 bits or eight bytes or configuration data, this means we load 1,024 bytes of data into a back buffer to make a complete RLU instruction. This design has four back buffers. Generally you want to put in enough back buffers so that loops larger than all the back buffers combined are rare.

The input to the instruction pipe is a variable width buffer 64 bytes wide. It can be addressed by up to 32 of the internal memory controllers or by the external memory controller to move instructions in. With 32 local memory controllers fetching, it takes 16 memory clock cycles to load an instruction into the variable width buffer. Since the busses on one side or the other are being written after every write to the buffer, the RLU instruction is completely written after 17 memory clock cycles in this scenario.

An instruction loaded from external memory goes slower. We get 8 bytes every memory clock cycle, so it takes 128 memory clock cycles not including latency (129 counting the extra cycle to clock the last configuration bus cycle) to load an RLU instruction from external memory.

In most cases, a hardware decompression engine or engines could be added to reduce code size and average load time. In the case of a small DSP design, leaving it out makes the design cheaper (saves maybe 250,000 gates). Leaving out the decompression engine means it costs more power and potentially takes more time to load instructions, but since in DSP instructions are loaded infrequently, this is not a large factor. In the DSP Preferred Embodiment we probably save more power because of the simpler design with fewer gates.

Data Pipe

The Data Pipe is responsible for moving all data around the system, including to and from local and external memory sources, to and from the I/O busses of the RLU, and to the Instruction Pipe. As shown in FIG. R: "DSP Preferred Embodiment Data Pipe Block Diagram", the Data Pipe receives Data Directives into its command FIFO from the Fetch Splitter (R1). These commands are decoded by a state machine (R2) and distributed to internal registers, the programmable interrupt controller (PIC) (R3), or the memory management unit (MMU) (R4). The MMU, with the help of the stack and ring controllers, moves data between local memory, the RLU, external memory, and internal registers including the Fetch Splitter. The PIC receives asynchronous interrupts from the outside world and synchronizes them with the execution cycle. These interrupts can be masked or can be allowed to send the Processor A0 into Interrupt Mode.

The Fetch Splitter is also part of the Data Pipe. FIG. S: "DSP Preferred Embodiment Fetch Splitter Block Diagram" shows this part. A 96-word FIFO receives input from up to 48 local memory controllers (S1) or from the external memory controller (S2). The header is obtained from the start of the fetch block (S3) and is used to establish the fetch count (S4). The type of fetch is also identified and the data is routed either to the left or right RLU configuration busses (S5) 32 bytes at a time or to the Data Directive FIFO (S6).

Operating Modes

The Data Pipe and the Ascenium Processor A0 as a whole have four operating modes: User Mode, Supervisor Mode, and Interrupt Mode. Interrupt Mode is entered via hardware interrupt. Supervisor Mode is entered by special Data Directive or by software interrupt (trap). User Mode is entered by executing a special Data Directive. The Ascenium Processor A0 comes up from reset in Interrupt Mode. Reset is treated the same as any other hardware interrupt.

In User Mode the view and control of the Ascenium Processor A0 is limited. Memory Management is in effect, and the values in the MMU registers apply. Only the User Stack is available. The Programmable Interrupt Controller is not accessible. The interrupt vector address table is not accessible.

In Supervisor Mode total view and control of the Ascenium Processor A0 is available. Memory management starts off disabled but can be established without leaving the mode.

In Interrupt Mode the Processor A0 operates as in Supervisor Mode except all interrupts are masked.

Memory Management

The Memory Management Unit (MMU) restricts the memory map of the Processor A0 when in User Mode. An address outside the specified ranges will always read back a zero value and writes will be ignored. Up to three areas in local memory and three areas in external memory can be specified. Each area has a 32-bit real starting address, a 32-bit alias address, and a 32-bit size.

Secure operating systems that are switching tasks should obliterate all former data in regions of memory and iterators previously owned by other tasks. The DSP Preferred Embodiment does not do this automatically.

It should be stressed that the storage in the RLU, the stack, the local memory, and remote memory and peripherals are part of a memory system subject to the same laws as for a conventional processor. You should design it to have some persistence and be approximately as cheap as the cheapest part and approximately as fast as the fastest part. The definitions of "cheap enough" and "fast enough" of course change based on a number of factors, including instruction mix. Generally Ascenium Processor A0s need higher performance memory systems because a lot more work is getting done per clock cycle than in a conventional processor.

FIG. T: "DSP Preferred Embodiment Memory Hierarchy Block Diagram" shows the different levels of storage available. There are 384 words in the iterators of the RLU (T1). This memory is the most useful since it is directly available to RLU computations. Local memory (T2), including stack space (T3), forms the next tier of access. This memory is close by and quick to access at high bandwidth but must be written into the RLU iterators to be used. Next is external memory (T4). Data Directives and RLU instructions can be loaded directly from external memory for the purposes of reset initialization, but normally all data are transferred from external memory to local memory before being accessed. Lastly, there is optionally peripheral storage (T5), the slowest and cheapest memory storage in the system.

Local Memory Controllers

In the DSP Preferred Embodiment there are 48 local memory controllers. These controllers each read and write from an I/O bus in the RLU. 32 controllers at a time can write RLU instruction information to the Instruction Pipe. All 48 controllers have access to the 64 blocks of local memory. All 48 controllers have access to the Data Pipe register set.

Remote Memory Controllers

In the Preferred Embodiment design there is one 64-bit wide external memory controller that runs at the same memory clock speed as the local memory controllers. It is capable of addressing the entire 4+gigabyte external memory area (32 bits of addressing).

Fetch Distribution

Fetch blocks start with header words with the following format:
Bits 0-12 Block size in words
Bit 13 Cache in local memory (address to follow)
Bit 14 Type: Data Directives=0, RLU Instructions=1
Bit 15 Link if=1
The link bit tells the fetcher to also fetch another fetch block appearing directly after this one.

The Stack

In the DSP Preferred Embodiment design, the stack is a possible onchip source and destination controlled by the Stack Pointer Register (SPR). There are two stacks: one for User Mode and one for Supervisor Mode. The Supervisor Mode Stack and Supervisor Stack Pointer Register are only available in Supervisor Mode. Each stack is limited to 64K in size. The stack interface is a variable width buffer up to 32 words wide. It is attached to a section of local memory that it uses for storage.

Ring Buffers

In the DSP Preferred Embodiment design, four ring buffers are available that point to space in local memory. Each ring buffer has a start, size, head, and tail register. Optionally an empty or full condition can generate an interrupt. The interface to each is a variable width buffer up to 32 words wide.

Programmable Interrupt Controller

The DSP Preferred Embodiment design can receive eight levels of external interrupts, eight possible interrupts from the ring buffers, and up to 240 levels of software interrupts. All external interrupts are edge triggered. Full masking and setting capability is available for the hardware interrupts.

| Interrupt Vector Table | | |
|---|---|---|
| Vector Number(s) | Memory Offset | Description |
| 0 | 0x000 | Reset |
| 1 | 0x004 | Illegal Data Directive |
| 2 | 0x008 | Debugger Trap |
| 3-7 | 0x00c | Reserved |
| 8-15 | 0x020 | Hardware Interrupts |
| 16-23 | 0x040 | Reserved |
| 24-39 | 0x060 | Ring Buffer Interrupts |
| 40-47 | 0x0A0 | Reserved |
| 48-255 | 0x0c0 | Software Traps |

Local Memory

Conventional hardware caches do not mix well with the Ascenium philosophy of static scheduling by the Compiler U0. The Compiler U0 can't exactly predict the performance of a cache given that at the beginning of execution the contents of a conventional cache are unpredictable and interrupt service routines and other tasks during execution can also disrupt the state of a hardware cache. In Ascenium's static scheduling case it is much better to have local memory and external memory both with predictable latency. The Compiler U0 and even the programmer directly can then cache important data locally with predictable performance results.

To this end, in our Preferred Embodiment DSP design we have 256 K bytes of local memory on the chip. It is organized in 64 banks each 4 K bytes in size. These banks can each be addressed in widths ranging from 1 word at the low end to 32 words at the high end according to the following addressing scheme:

| Address from base | Width |
|---|---|
| 0x00000000-0x0001ffff | 2 bytes, 1 word |
| 0x00020000-0x0003ffff | 4 bytes, 2 words |
| 0x00040000-0x0005ffff | 8 bytes, 4 words |
| 0x00060000-0x0007ffff | 16 bytes, 8 words |
| 0x00080000-0x0009ffff | 32 bytes, 16, words |
| 0x000A0000-0x000bffff | 64 bytes, 32 words |

This is accomplished by having each 4K bank consist of 16 banks of memory 16 bits wide and 128 words deep. These banks are then enabled in different patterns depending on the address range.

The DSP is clocked at twice the speed of the memory clock. This local memory is dual ported and accepts data from the internal and external controllers on alternate clocks.

An example of the utility of organizing local memory in this fashion comes from our Radix-4 FFT example. The matrix would be initially written into memory using the 4 word addressing area. At the start of the routine it would be read in this 4-word fashion. During the first pass result matrix values would be written back in 16-word fashion. On the next pass this data would be read back in 4 word fashion, perfectly organized for the next pass, and so on.

Ascenium Compiler U0

The Ascenium Compiler U0, a Preferred Embodiment of which is shown in FIG. U: "Preferred Embodiment Compiler U0 Block Diagram," is more appropriately termed a source code build chain. Such a tool chain could consist of two parts: a conventional Compiler U0/librarian/linker front end that results in a rich bytecode format executable (U1), the Ascenium Code Generator (U2), which takes the bytecode executable as input and produces an Ascenium executable. The Compiler U0/librarian/linker front end could be any Compiler U0/librarian/linker, although Compiler U0/librarian/linker systems that emit bytecode output designed for global optimizers would probably require less reconstruction of aggregated memory operations and would therefore probably be easier to implement. The Ascenium Code Generator is the part that is unique to the Ascenium Architecture and can stand apart from the Compiler U0/librarian/linker as a separate build stage or conversion tool. It could also be integrated into the conventional linker stage to avoid some data conversion and parsing stages in the build.

The Ascenium Code Generator as shown in FIG. V: "Preferred Embodiment Code Generator Block Diagram," consists of three major parts: a Generic Intermediate Representation (GIR) section that translates the bytecode executable into a single interconnected dataflow representation (V1), an Ascenium Intermediate Representation (AIR) section that walks through the dataflow diagram and translates it into sequences of RLU Instructions and Data Directives for a specific Ascenium Processor A0 (V2), and an Ascenium Executable (AEXE) section that packages the RLU Instructions and Data Directives to be efficiently fetched and employed on a specific Ascenium Processor A0-based platform (V3).

Optimizations that could be made in the bytecode representation before even being processed by the code generator include:
Dependence testing
Loop normalization
Constant propagation
Dead code elimination
SSA form
Induction variable exposure
Scalar expansion
Scalar renaming
Node splitting
Index-set splitting
Loop orthogonalization
Loop privatization
Loop distribution
Loop alignment
Code replication
Loop reversal
Branch classification
Forward branch removal
Loop exit branch removal
Backward branch to loop conversion
Control dependence splitting
Interprocedural use analysis
Interprocedural kill analysis
Alias analysis Generic Intermediate Representation (GIR)

The GIR is a complete representation of the computer program that consists of nodes, arrows, and containers as shown in FIG. W: "Preferred Embodiment GIR Structure." Nodes (W1) are objects that represent operations such as computations (e.g. add) or memory movement (e.g. load) (W2). An arrow (W3) is a link from a specific node to another specific node representing a data dependency. A container (W4) groups several nodes together for some purpose. There are different kinds of containers, such as functions (W5), which contain all the nodes of a function call, and loops, which contain all the nodes in a loop. Nodes can be members of several containers at the same time (W6). Containers can also be linked depending on their function, such as a link between a call node container (W7) and the function it instantiates (W8).

Computer Program Structure in the GIR

In the GIR, the computer program is represented as a virtual tree structure with the main entry point of the program as the base of the tree. Each function call instance is represented by a node, and each of these nodes in turn are associated with the function they instantiate. In this way the entire program is represented, but there is only one actual description of each function, since all calls point to only one instance of each function.

Translating Bytecodes into the GIR

The conversion of bytecodes into the GIR can be broken into four steps:

1. Basic Dataflow: Each function is turned into a dataflow representation with no linkage yet outside the function.

2. Global Threading: Global variables and direct memory accesses are tuned into program variables.

3. GIR Optimization: Optimizations that were not done in the bytecode Compiler U0 but are generic in nature can be performed here. For example, functions that are called only once can be inlined.

Basic Dataflow Step

In this stage, constructs from the bytecode representation are translated into basic components in the GIR. Later sections contain some examples of how constructs found in the C programming language would be represented in the GIR. Any high level language could be so represented. Basic links representing data flow are made between operations. These links are simple links that show any worst-case dependency. For example, two operations that access the same array might be shown as dependant to one another even though they access non-overlapping portions of the array.

Pseudo Code for Basic Dataflow
Confirm the bytecode file signature
Parse the global type pool into the type table
For each global variable
　Create a dummy node
　Add to the value table
For each global constant
　Create a dummy node
　Add to the value table
Define the global scope of the type and value tables
Create a function collection for each function
For each function collection
　Parse the local types into the type table
　Parse the function parameters into the value table
　Parse the local constants into the value table
　For each opcode
　　Create node(s) to represent the opcode
　　Create arrow(s) to link the node(s) with the input using the value table
　　Add any output to the value table
　　Start a collection for loop starts
　　End a collection for loop ends
　　Start a collection for conditional statement starts
　　End a collection for conditional statement ends
　　Link function instances to their function collections
　Store local symbol table info
　Link local symbols with arrows
　Remove local variables from the value table Remove local constants from the value table
Remove local types from the type table
Store global symbol table info
Link global symbols with arrows
Done
Global Threading Step Global threading, as shown in FIG. X: "Global Threading," turns global variables into autovariables using an automated version of a method that programmers use often. Often global variables are not autovariables due to being used by more than one function and the programmer not wanting to pass the variable as a parameter. Also variables might be made global because the programmer considers them too large to live on the stack. In any case, size is not an issue at this stage of the analysis and the ability to track all data dependencies is much more handy. Later on in the AIR section of the code we will start worrying about how large data structures are and where they should be stored.

To perform the operation, global variable accesses are traced from the entry point (X1) through called functions (X2) to all access instances (X3). Similarly, all global variable modifications (X4) are traced through return values (X5) and intermediate functions (X6) through the end of the program (X7). Once data dependencies for a global variable have been linked in each function, parameters and return values that are not used are eliminated.

Some high level languages including C have the ability to read and write absolute addresses in memory. This facility can be used to program memory mapped hardware. In the case of hardware programming, reads can be significant, and the order in which reads and writes are done can also be significant. For this reason the Compiler U0 preserves these absolute reads and writes and their precedence.

In the more general case, the "live" copy of a variable can be at any given time inside the RLU, on the stack, in local memory, or in remote memory. Larger data structures might have parts in all these places. This is similar to the concept of register-mapped variables.

Pseudo Code for Global Threading
For each global variable
  For each modification
    If a hard address, hard write
    Add to return value collection
    For each caller
      Add to the return value collection
      Done if the caller already contains the return value
      Done if the caller is the main entry point
  For each access
    If a hard address, hard read
    For each caller
      Add to the parameter list collection
      Done if the caller already contains the parameter
      Done if the caller is the main entry point
Starting with the main entry point
For each possible called moving up the call chain
  Treat as a constant until first modified
  If not accessed before modified again, wipe out previous modified
For each possible called moving up the return chain
  If not subsequently accessed, remove from return list GIR Optimization Step Optimizations can be made on the GIR for a number of reasons. The GIR removes all the arbitrary serialness in the code, and this removal of unnecessary complexity might then make other generic optimizations easier. If Ascenium wanted to do generic but proprietary optimizations, they could live here. Generally speaking any optimizations made on the GIR, since it is still a generic representation of the program, could be made at any convenient point beforehand as well.

If work has not yet been done to unravel data dependencies, for example, decoupling non-overlapping array dependencies, it would be done at this stage.

Other optimizations that could be performed at this stage include:
Dependence testing
Loop normalization
Constant propagation
Dead code elimination
SSA form
Induction variable exposure
Scalar expansion
Scalar renaming
Node splitting
Index-set splitting
Loop orthogonalization
Loop privatization
Loop distribution
Loop alignment
Code replication
Loop reversal
Branch classification
Forward branch removal
Loop exit branch removal
Backward branch to loop conversion
Control dependence splitting
Interprocedural use analysis
Interprocedural kill analysis
Alias analysis Pseudo Code for GIR Optimization Example: Inline Once Called Functions
For each function
If there is more than one call, next function
For each parameter
  For each output
    Unlink and link to the passed value output in the caller
  Destroy the parameter node in the callee
For each return value
  Unlink the input and . . .
  or each return value output in the caller
    Unlink and link to the callee return value input
  Destroy the return vale node in the caller
For each callee node
  Unlink from the callee container
  Link to the caller container
Destroy the callee container The Ascenium Intermediate Representation (AIR)

The AIR is scaffolding or decoration on GIR that associates actual Ascenium logic block operations and Data Directives with nodes and collections.

Using the AIR

AIR can be individually created and destroyed on function calls or sections of function calls in no particular order. The scope of AIR at any given time need only be as large as required to build and optimize the specific section of code being turned into RLU Instructions and Data Directives at the moment. These created RLU Instructions and Data Directives persist after the richer AIR structure in a function has been destroyed, so the entire size of the GIR/AIR representation will grow slowly in size as code generation continues to the end of AIR analysis. AIR can be used to create RLU Instructions and Data Directives in the following steps:

1. Node Annotation: Nodes are associated with RLU operations or Data Directives. The association can be one to one, one node to many physical operations, or many nodes to one physical operation.
2. Scheduling: Identifies the critical path through the section of code.
3. RLU Instruction Packing: Uses the critical path information to construct RLU Instructions and encode them for presentation to the Instruction Pipe. This stage can also contain many optimizations:
   a. Data pipelining
   b. Strip mining
4. Data Directive Generation: Uses the critical path information and the constraints imposed by the RLU Instructions to tentatively schedule the movement of operating data. Uses the critical path information and the size of previously generated operations to statically schedule the fetching and fetch order of RLU Instructions and Data Directives in an area of code.
5. AIR Optimizations: Identifies and exploits opportunities to optimize performance. These optimizations could include:
   a. Inlining functions to reduce RLU operations
   b. Resorting data directives to better shadow instruction fetches Node Annotation In this section the basic work of associating the generic structure of the GIR to a specific model of Ascenium Processor A0 is done. AIR nodes are created and associated with one or more GIR nodes, and each of these AIR nodes describe one or more basic operations of the Ascenium Processor A0. This continues until all GIR nodes and collections are accounted for.

Pseudo Code for Node Annotation
For each GIR node
Decorate it with an AIR node
Put all physical operations that do this node in the list
If there are more GIR nodes involved, find them and link to the same AIR node Scheduling Starting from the end points in each function, we trace execution back along the nodes to the loads and call parameters, adding up the required time for the operations as we go. An example of this process is shown in FIG. Y: "Scheduling." This example is part of a digital cosine transform algorithm. Counting from the bottom (Y1), the scores of each of the nodes going upwards, shown in bold italics (Y2), are calculated by adding the duration of the current node with the sum of the durations of the subsequent nodes going along the longest path.

Pseudo Code for Scheduling
For each function
For each store or return value node (no output)
   Put itself in the list
   For each node in the list
      Score the node (abstract # describing how long)
      Add to base score to get current score
   For each input node
      If greater than current base score
         Put the current score as base score in the node
         Put it in the list RLU Instruction Packing In this step the scheduling information determined in the previous step is used to pack individual RLU instructions. There are hard boundaries for the beginning/end of RLU instructions, and these are used as a starting point for RLU instruction packing. Such boundaries include the beginning of functions and the beginning of loops. Loops can combine with small preceding instructions if there is room, thus reducing the number of instructions that need to be loaded for a given section of code. Loops can also grab succeeding work if it makes sense, also to reduce the number of instructions.

Data pipelining works as follows. Consider an instruction that takes 11 clock cycles to settle. Latching the intermediate results about halfway through the instruction, we can now clock the instruction in two parts, each taking perhaps 6 clock cycles. In the first iteration of 6 clock cycles long, the first half of the first iteration will get done. The second half of the data pipeline will produce garbage. In the second iteration, the first half of the second iteration and the second half of the first iteration get done. Thereafter, we receive results every 6 clocks instead of every 11 clocks as we originally did. Because we are using the instruction circuitry more intensely, we are getting more computational work done. In fact, instructions can usually be data pipelined in this fashion down to a clock cycle. Once the pipeline is full the instruction turns out the computational product of the whole instruction in a single clock cycle no matter how sequential the operations contained in the loop are. This optimization can greatly optimize performance.

Strip mining is a well-known Compiler U0 optimization. In this case we are trying to maximize the amount of work done on data that comes into the RLU before it must be pushed out to make room for the next batch of data. To accomplish this, the order of loops may be changed and loops may be split as with regular data mining. Although this section of code is for building Ascenium instructions, the memory system is taken into account here with regard to variable storage planning.

A loop may be too large to fit in a single Ascenium instruction. If so, it may be split up among several Ascenium instructions. Smaller Ascenium designs are likely to have more than one back buffer. When this is the case, the loop may still be able to be executed without reloading instructions by fitting it into the available back buffers. The Compiler U0 will attempt to reorder data needs so that the instructions can be swapped as little as possible, since swapping instructions will burn a little power and will also affect the latency of the instruction cycles where the swap occurs.

Nested loops can also be decomposed into individual Ascenium instructions as follows. The original code might look like this:

```
For( I = 0; I < n; I++ )
{
  stuff A
  for( j = 0; j < m; j++ )
  {
    stuff B
    for( k = 0; k < p; k++ )
    {
      stuff C
    }
    stuff D
  }
  stuff E
}
```

And in Ascenium instructions might turn into this:
Do stuff A then stuff B once
Do n times:
Do m times:
Do stuff C p times
   Do stuff D then stuff B
   Do stuff E then stuff A This allows all the operations from a particular loop order to be combined, loaded, and reloaded efficiently.

FIG. Z: "RLU Instruction Packing Example—Excerpt of the Algorithm in GIR Form" shows a GIR for most of the inner loop of a radix-4 FFT operation. Note the labels on the GIR nodes (Z1) as these will be used as reference in the next figure, FIG. AA: "RLU Instruction Packing Example—The RLU Instruction." In the RLU shown here multiplies are shown associated vertically, though they could be associated either horizontally or vertically. The calculations (AA1) are shown here mapped into the RLU and the data inputs and outputs required are shown at the bottom (AA2).

Other optimizations that could occur at this stage include:
Loop interchange
Breaking conditions
Cohort loop fusion
Multilevel loop fusion
If reconstruction
Iterator allocation
Unroll and jam
Blocking/tiling
Pseudo Code for Instruction Packing
If the instruction is not a loop
While there is room left in the instruction and
While there are non-loop dependant nodes left in the function block
Map the highest score non-loop dependant node into the instruction
Other non-loop optimizations
If the instruction is a loop
While there is room left in the instruction and
While there are nodes left in the loop
Map the highest score loop node into the instruction
Put more copies of the entire loop into the instruction
Combine small preceding instructions with this one
Do post loop work in this instruction
If possible, combine parallel or sequential loops into a single loop
If possible, data pipeline the loop down to one clock cycle
If possible, strip mine the data
Other loop optimizations
Compress the newly created instruction
Create a data node for fetching the newly created instruction
Create a data node for executing the newly created instruction
Eliminate data nodes satisfied by data used in this instruction from the previous
Update scheduling for data nodes based on the contents of the newly created instruction
Data Directives In this section data movement is statically scheduled. At this point the size and load time of instructions can be accurately predicted and the data needs and products of each instruction are known. Scheduling of the remaining nodes, all nodes involving data movement, have been modified in the previous stage to reflect this.

This code schedules operations between the RLU and local memory. Hardware or software stacks may be employed to simplify the storage and retrieval of function-specific data.

This code schedules data operations between off-chip memory on one hand and on-chip memory and the RLU on the other. First basic off-chip data operations are mapped out and latency stalls are identified. The code considers each latency stall. If the stall involves a block of data, it tries to move the operation earlier in the execution chain to take up the latency. It can push forward other data operations and push back write-back operations to allow this. If the stall involves a stream of data, it creates a block operation that will take up the latency and similarly tries to schedule it earlier in the execution chain so the data will be available when the latency stall would have been hit. Due to branching, block operations can be duplicated and placed along multiple pathways leading to the latency stall. Onchip memory used for caching can be overlapped by operations that are up different branches. If cache memory or bandwidth is expended in a section of code, the Compiler U0 must make a best guess about latency stall probability and severity and may forego covering latency stalls along some branches in this situation.

FIG. BB: "Data Directive Scheduling Example" shows a representative scheduling scenario. Here a function call has started this fetch block. Some data directives are fetched (BB1) to start the show. Then there are some competing needs. We need to load in our initial data into the RLU (BB2), we need to preserve needed data from the caller that we would otherwise wipe out in our use of the RLU (BB3), and we need to load our first RLU Instruction (BB4) before we can execute our first RLU Instruction (BB5). In a manner identical to previous scheduling, operations are scored from the bottom up. We see that the highest scored operation is the initial fetch of data directives, so it happens first (BB6). Next the RLU Instruction fetch starts (BB7). This fetch is broken into two parts (BB8) to make way for the scatter operation (BB9) that sets up our initial data. Finally, the gather to the stack (BB10) fits after the start of execution since the values in the RLU are preserved until the end of the execution cycle.

Pseudo Code for Data Directives
For each data node
Pick the highest priority data node
Locate the data need or availability in the data movement schedule
If it is a read
If the data is immediate, put it in the fetch block
Statically schedule the read down the branches of the past schedule
Modify fetch block sizes accordingly
Prioritize among existing reads/writes down each branch
If failure, push execution back one clock, unconstrain and try again
If it is a write
If never used, kill and change fetch block size
Put in the cache write queue
Examine the schedule and soft cache size at the moment of the operation
If the soft cache is too large
Move the lowest priority data to the write-out queue
AIR Optimizations At this point the entire data movement schedule and the details of every instruction execution have been plotted out, so there are opportunities for many global optimizations that involve balancing the constraints and needs of RLU Instructions, data movement, and fetches. For example, functions can be examined for inlining with an eye towards reducing the number of fetches in critical areas of the data schedule.

Other optimizations that could occur at this stage include:
Loop interchange
Breaking conditions
Cohort loop fusion
Multilevel loop fusion
If reconstruction
Iterator allocation
Unroll and jam
Blocking/tiling Pseudo Code for AIR Optimization Example: Inlining Functions to Reduce Fetches
For each function
Examine each caller—can instructions be consolidated into fewer instructions?
If so
Inline a copy of the function and redo scheduling, packing, etc.
If the caller has been examined, add to the list to be reexamined
If there are no non-inlined copies left, destroy the original function

The Ascenium Executable (AEXE)

This stage of the code generator creates the final output: an Ascenium executable. The Ascenium executable file is really a class of files that contain an entire Ascenium executable program. Such a file is specific to the type of Ascenium Processor A0, the computer system it is running in, and the operating system if any running on that platform. Ascenium executables can be embeddable images or loadable by a particular operating system. Ascenium executables will not look much different from other executables. They will have a header and sections for code and pre-initialized data.

Creating Operating Systems

To imagine an operating system running on an Ascenium Processor A0, it is best to think of an Ascenium Processor A0 as just like a normal Processor A0 except that it executes a series of custom mega-instructions and data directives instead of a set of RISC or CISC instructions. For example, task switching on a timer would begin with an interrupt. The Processor A0 would save its immediate machine state in the current tasks reserved area, decide which task to perform next, change its MMU context to that task, and restore its immediate state from that tasks reserved area. This is exactly what happens with conventional Processor A0s. Beyond the scope of the inside of a custom Ascenium instruction, the Ascenium Processor A0 operates pretty much like a conventional Processor A0, so it is easy to extrapolate its behavior in any runtime circumstance.

The Compiler U0 and operating system could work together to allocate local memory to a given task appropriately. The Compiler U0 would allocate local memory up to a given programmatic limit (very much like specifying the size of a stack). The operating system could keep statistics on various tasks and their memory needs. Local memory is wrap-around, and so tasks would be granted heap space in a wrap around fashion. The OS could decide how much extra space to leave each task and when it should spend time recovering unused space or swapping task heaps out of local memory.

Dynamic Linking

Dynamic link libraries have been popular mostly to save memory and cache by combining the runtime library needs of theoretically many applications into one set of executing code. Dynamic libraries are possible with Ascenium, although there are unique compatibility and performance tradeoffs.

The ideal case for Ascenium would be for the Ascenium Compiler U0 to freely statically line and inline dynamic functions from the library as needed for performance and then call the library dynamically to execute more extensive routines. The downside to this approach is that it would make it infeasible to upgrade the dynamic library separate from the application. On the other hand, taking the performance hit of calling every function in the library dynamically would allow the dynamic library code to be separately upgraded.

Creating an ALL File

It would be useful to create a human readable version of the Ascenium executable annotated with the original C (or whatever high-level language) code and the intermediate bytecode.

How the C Language Maps Onto the Ascenium Processor A0

The following sections describe how C syntax might be represented at various stages in the Ascenium Code Generator and finally executed in the Ascenium Processor A0. These sections are presented as an aid to understanding the relationship between high level languages in general (any of which could have been chosen as the example), the Ascenium Code Generator, and the Ascenium Processor A0.

Constants and Constant Expressions

Constant expressions are evaluated into constants by the Compiler U0. A constant could be represented in the GIR as a Load Immediate (LOADI) node. In the AIR the LOADI nodes for each RLU Instruction are collected. Constants that can already be delivered from within the RLU are removed from the collection. The rest are aggregated into a single LOADI Data Directive usually appearing at the end of a fetch, since both RLU Instruction loads and memory read operations have more latency associated with them.

Literal Variables

Many variables may never actually be represented in memory, on the stack, in local memory or even in a logic element latch. They turn in to arrows or sets of arrows in the GIR. One literal variable in C can be broken up into several variables in the GIR. Each time a variable is operated on it becomes a new variable as far as the GIR is concerned. As the C code is parsed the variable refers only to the latest arrow or set of arrows extending from the node that last modified the variable.

If a variable only exists within one RLU execution cycle, it is only represented as connections in the RLU. If a variable exists through many RLU execution cycles, it is latched in RLU storage from execution cycle to execution but may change its physical location in the RLU every time the RLU Instruction changes. If a variable exists past the scope of function calls, it may temporarily be moved to the stack and restored when needed into the RLU if there is not enough room in the RLU to persist it through the call chain. For larger variables, the Compiler U0 may need to employ the local heap or even off chip memory to manage the data.

Automatic and Register Variables

Automatic and especially register variables were intended to have limited scope. In the case of register variables the programmer is also signaling the expectation of frequent use. A good Compiler U0 will use these as suggestions for producing more optimal code. Other than that, these variables are handled as all variables.

Static, Global, and External Variables

Normally in Compiler U0s such variables must be memory mapped. Since the Ascenium Code Generator processes the entire executable at once, these variables need not be so handled. Their entire data dependency chain can be managed, so they are free to be located as autovariables are. Because they are expressed differently than autovariables, however, the Compiler U0 does the necessary work to change them from static variables to autovariables in the global threading step.

Data Types and Typecasts

Data types can affect the way variables are accessed and handled in the Ascenium Compiler U0. Data is organized in memory to ease transfer and simplify data directives. If a variable, say a large array, is used, recast to a different type, and used again; this could result in it being reordered in memory by the Ascenium Compiler U0. Normally typecasting does not cause runtime effects in Compiler U0s, so it is worth mentioning the possibility here.

Pointers and Arrays

Since the RLU operates on sizable blocks of data, much of the fine-grained indexing of pointers and arrays becomes connections in the RLU. There are five levels at which pointer and array math can be resolved: conversion to literal, selection, vectorization, predictive, and latency-tolerant.

Conversion to literal, as the name implies, is where the Compiler U0 can reduce operations on the pointer to operations on the dereferenced literal or literals. For example, a value can be passed into a function via a pointer to the value so that the callee can modify the value in the caller. The Ascenium caller would turn this into a literal that was passed and returned and set the value in the caller.

If the Compiler U0 can't convert the pointer to a literal or literals, it may be possible to read in a small block of possible choices for the value and then dynamically choose the real value using bit shifting. This method expends extra bandwidth to avoid the latency toll accrued if the exact address is calculated at runtime before the value can be read in.

If the code in question is a loop operating on an array of data, a common situation in computationally intensive code, the pointer calculations can often be turned into a data streaming operation or operations and the loop operation can operate on a stream or streams of incoming data.

If none of the above techniques implies, pointer math is done literally as it is called out in the code, with the exception that the pointer math is done at the earliest possible time and the use of the result is delayed as much as possible to reduce or eliminate latency stalls.

Structures and Unions

Even more so than arrays, the fine-grained indexing of structures and unions generally becomes connections in the RLU. Structures and unions may be physically reordered so that sections of them can be read and written more handily. This goes along with the general philosophy of Ascenium to move away from a pure memory mapped model to a model where the Compiler U0 is statically managing the location of every active variable at every point of execution to optimize performance.

Functions

Function calls are handled in the Ascenium Compiler U0 and Processor A0 much as they are in a conventional Compiler U0 and Processor A0. Only functions that have multiple callers and are above a certain size will survive inlining optimizations. We consider the functions that remain after these procedures.

Consider a function with parameters and return values. These values should ideally be passed in the iterators of the RLU. No fixed calling convention need apply to this situation. Instead, the Compiler U0 manufactures a calling convention that can apply to the function and all its callers through an iterative process. If some values will not be located in the RLU at the time of the call, data directives would deliver these. There may not be room in the RLU or the ability to coordinate all the RLU Instructions to allow variables to be passed and returned in the RLU, in which case a hardware or software stack will be employed.

Some of the caller's RLU data may want to survive the call. Based on the amount of data and the number of instructions in the function, an estimate is made whether to preserve this data in the RLU (perhaps moving it around) or to store it on the stack to be retrieved later.

Unary Operators

Unary operators are done in a logic element or set of logic elements depending on the size of the variable being operated on. Here is a list of common unary operators and the procedure for each:

| | |
|---|---|
| Negation | Subtract from zero, constant generated in place. |
| | Can be extended using the carry chain. |
| Bitwise not | Bitwise logic through either lookup table |
| | For A: 0x55, B: 0x33, C: 0x0f |
| | Bitwise, so no coupling is needed for wider operations. |
| Logical not | Wide NOR |
| | Extend using wide AND |
| Addressing | See pointers above |
| Size of ( ) | Computed at compile time |
| Increment | Add to zero with bottom carry bit on. |
| | Can be extended using the carry chain. |
| Decrement | Subtract zero with bottom carry off (constant becomes −1) |
| | Can be extended using the carry chain. |

Multiplicative Operators

Multiplicative operators include multiply, divide, and modulo. These operations are handled as follows.

To 16 bits, multiplication can be handled by a pair of logic elements. This can be extended by creating 32-bit partial products and combining them by Wallace Tree reduction and a final fast add using other logic elements. For example, a 64-bit full multiply will create 16 32-bit partial products using 32 logic elements. Following this Wallace Tree reduction will require another 29 logic elements. The final fast add takes 7 logic elements, for a total of 68 logic elements.

Multiplication by a constant may take place by shifts and adds if fewer logic elements or less time would be consumed using this method.

Division is by convergence. If the division is leisurely, a memory lookup table will be employed at the start of the division. Otherwise, straight convergence with no lookup will be employed. Division by a constant is converted to a multiplication and shift operation of the desired precision. Division by constant powers of two is done by right shifting.

Remainder is obtained in the general case by division then subtraction from the original number. Remainder by a constant power of two results in a bitwise mask operation.

Additive Operators

Addition is built into the logic elements. Large additions and subtractions can be created using a lookup table combined with the fast carry/borrow circuits built into the RLU.

Shift Operators

Shifts are programmed into the addressing circuitry of the logic elements.

Relational Operators

Relational operators generally use wide logic to produce Boolean results. Here is a list of common relational operators and a procedure for each:

Less than The top bit of the fast carry circuit extended bit to word produces this.
   This operation can be extended using the fast carry network.
Greater than The top bit of the fast carry circuit extended bit to word produces this.
   This operation can be extended using the fast carry network.
Less or equal The top bit of the fast carry circuit extended bit to word produces this.
   This operation can be extended using the fast carry network.
Greater/equal The top bit of the fast carry circuit extended bit to word produces this.
   This operation can be extended using the fast carry network.
Equal Bitwise XOR followed by wide NOR
Not equal Bitwise XOR followed by wide OR

Bitwise Operators

Bitwise operators use the lookup tables in the logic elements. These operations are bitwise, so no coupling is needed for wider operations. Some common bitwise operators and the procedure for each:

And Uses either lookup table. For A AND B the programming would be 0x88.
   A three-way AND operation would be configured with 0x80.
Or Uses either lookup table. For A OR B the programming would be 0xee.
   A three-way OR operation would be configured with 0xfe.
Xor Uses either lookup table. For A xor B the programming would be 0x66.
   A three-way XOR operation would be configured with 0x7e.

Logical Operators

Logical operators normally cast their operands to Boolean and then perform the desired operation. The logical AND operation would take a wide OR of both operands and combine them with a bitwise AND. The logical OR operation would take a wide OR of both operands and combine them with a bitwise OR.

Assignment Expressions

Assignment expressions like equals turn into links between the final operation on the right hand of the expression and the operations next using the variable on the left hand side of the expression. Compound assignment expressions are just variations on operations already described above.

Selection Statements

Selection statements like "if/else" and "switch/case" in C have a logical argument that determines whether one or possibly another group of operations gets done. This is sometimes referred to as branching, but usually in Ascenium's case, the implementation of these statements has nothing to do with branching. In Ascenium, these statements are generally evaluated in parallel along with the logical argument. For example:
   If or ((stuff A)
      Stuff B;
   Else
      Stuff C;
Becomes in Ascenium:
Do stuff A, stuff B, and stuff C in parallel
Throw away stuff B or stuff C based on the result of stuff A
This is sometimes referred to as predication.

When the body of the "if" statement is larger than a single Ascenium instruction, the Compiler U0 might use a mixture of predication and instruction branching. This mixture could be 100% in either direction. For instruction branching, two or several instructions have been loaded into the RLU Instruction back buffers, and one of these buffers is selected based on the output of the previous RLU Instruction.

When the body of the "if" statement is larger than a single Ascenium fetch block, the Compiler U0 might use a mixture of the first two techniques along with execution branching. Execution branching is branching like in a conventional Von Neumann processor where one set of instructions or another is loaded in (different fetch addresses) based on the output of an RLU Instruction. Note, however, that unlike a Von Neumann machine all fetches in Ascenium are explicit.

In summary, there are three kinds of "branching" in Ascenium: circuit-based predicative "branching", RLU Instruction branching, and conventional execution branching.

Iteration Statements

Iteration statements like "for," "while," and "do/while" in C contain iteration logic and a group of statements to execute, normally many times. In Ascenium, these loops are turned into one or more Ascenium instructions that execute repeatedly. In many cases the configuration stays in the RLU during the period of the loop as data is passed in and results are passed out of the RLU.

In most cases a loop will fit into a single Ascenium instruction. Sometimes many iterations of the loop will fit in parallel or in series in a single RLU Instruction. In other cases a loop will not fit into a single Ascenium instruction but will fit into a few Ascenium instructions that will fit into the back buffers of the RLU. In this case the Compiler U0 will work to minimize the number of instruction switches while performing the loop. For example:

```
For a=1 to n
    Do stuff A
    Do stuff B
    Do stuff C
Could turn into:
For a=1 to n step m
    For b=1 to m
        Do one instruction that does stuff A
    For b=1 to m
        Do one instruction that does stuff B
    For b=1 to m
        Do one instruction that does stuff C
```
Instructions can also be organized in this way to reuse operating data and results as much as possible before having to move on to other data.

Jump Statements

There are three kinds of jumps normally employed in high level languages: short jumps, long jumps, and exceptions. Short jumps are where the start of the jump and the end of the jump are both inside the same function call. Short jumps can always either be replaced by equivalent selection statements or iteration statements. Long jumps and exceptions can cause execution to change context to an arbitrary degree. In this case the entire program context is stored during a "set jump" or "try" statement and then this program context is partly restored, with the addition of the exception or long jump information, when the exception or long jump is taken.

Ascenium Debugger

The Ascenium debugger operates for the most part like a conventional debugger. When a breakpoint is set in the source code, a hardware breakpoint consisting of a software interrupt data directive is set at the beginning of the fetch block in which the breakpoint occurs. When this hardware breakpoint is hit, the Ascenium debugger will switch over to a fully instrumented software simulation of the fetch block to the point where the user's breakpoint is set. This combination of conventional hardware operation and software simulation will allow programmers to execute and debug their code quickly and efficiently because most of the time the hardware will still be executing their code at full speed.

Those skilled in the art will appreciate that various adaptations and modifications of the just-described preferred embodiments can be configured without departing from the scope and spirit of the invention. Algorithmic compression and decompression techniques, digital signature authentication methods, and public key cryptography applications, and other suitable authentication techniques and methods can be applied in numerous specific modalities by one skilled in the art and in light of the description of the present invention described herein. Therefore, it is to be understood that the invention may be practiced other than as specifically described herein.

I claim:

1. In a computer, the computer comprising a memory, a reconfigurable computational array of logic elements interconnected in a dedicated static fashion, each logic element selecting inputs from other previous logic elements and reconfigured in parallel (hereafter as array), a successively configurable data pipe that communicates operating data bi-directionally between the memory and the array (hereafter as data pipe), and a successively configurable instruction pipe that communicates reconfiguration data to the array (hereafter as instruction pipe), a method of computing, the method comprising:

(a.) the memory communicatively coupled with the instruction pipe, and the data pipe and storing a plurality of instructions each comprising reconfiguration data for reconfiguring the array, a plurality of data directives that control all data movement to and from the memory, to and from the array, and to the instruction pipe, operating data, and safe settling time data for determining a number of memory cycles to wait before latching data processing results settled in the array;

(b.) the data pipe successively configured for moving input operating data from the memory and into the array in accordance with the data pipe executing the plurality of data directives;

(c.) the array for processing the operating data in accordance with the reconfiguration data;

(d.) reconfiguring the array in accordance with the reconfiguration data at a time zero;

(e.) successively configuring the data pipe in accordance with the data pipe executing the plurality of data directives;

(f.) communicating output operating data to the data pipe;

(g.) communicating the input operating data from the data pipe to the array; and (h.) directing the array to latch a data processing result comprising output operating data after a time equal to time zero plus a safe settling time determined by the safe settling time data.

2. A computational system comprising:

a successively configurable data pipe (hereafter as data pipe), a successively configurable instruction pipe (hereafter as instruction pipe), a reconfigurable computational array (hereafter as array), and a memory;

the data pipe communicatively coupled with the array and the memory, and successively configured for communicating input operating data from the memory and to the array, wherein the data pipe executes a plurality of data directives that control data movement to and from the memory, to and from the array, and to the instruction pipe;

the instruction pipe communicatively coupled with the array and the memory, and successively configured for communicating reconfiguration data from the memory to the array; and the array comprising a plurality of iterators successively reconfigured in parallel by the instruction pipe for asserting input operating data into the array from the data pipe and latching data processing results comprising output operating data from the array for the data pipe and preserving output operating data from one data processing cycle to use as input operating data in the next data processing cycle, wherein each iterator is clocked by a same data processing cycle pulse, a plurality of muxes successively reconfigured in parallel by the instruction pipe for performing 3 to 1 bitwise data processing, and a plurality of cones successively reconfigured in parallel by the instruction pipe for performing logic on a plurality of bits, and the array organized for a plurality of successive reconfigurations at runtime, wherein each cone comprises a circuit providing logic operations useful for computation that require more than three inputs to synthesize one output, including but not limited to static or dynamic bit and word shifters, adders or their components, wide logic, multipliers or their components, configurable bit to word circuitry, and zero counters.

3. A runtime dynamically configurable processor for general purpose processing of software applications, comprising:

a reconfigurable computational array (hereafter as array) comprising a plurality of logic elements;

the logic elements reconfigured to perform logic operations and to select inputs from other directly connected logic elements interconnected in a dedicated unidirectional toroidal static fashion;

a memory for storing operating data, reconfiguration data and data directives;

a successively configurable data pipe (hereafter as data pipe) that fetches data directives and communicates operating data directionally between the memory and the array in accordance with the data pipe executing the data directives; and a successively configurable instruction pipe (hereafter as instruction pipe) that fetches and communicates reconfiguration data to the array from the memory to reconfigure the logic elements; wherein the data directives control all data movement to and from the memory, to and from the array, and to the instruction pipe.

4. The processor of claim 3, further comprising:

a timer; and a safe settling time data determined at compile time, wherein the processor latches data processing results of the array resulting from operating data being processed through the logic elements of the array as currently reconfigured, this latching occurring upon detection that a safe settling time determined by the safe settling time data has been measured by the timer from a time of initiation of a reconfiguration of the array.

5. The processor of claim 3 wherein the instruction pipe comprises a plurality of parallel buses communicatively coupled with the memory, and a plurality of double buffers coupled with the parallel buses and the array, whereby the reconfiguration data for the array is delivered to at least some of the plurality of double buffers via the plurality of parallel buses, whereby the time required to configure the array is reduced.

6. The processor of claim 5 wherein the at least some of the plurality of double buffers of the array are successively configured to selectively retain reconfiguration data, whereby reconfiguration data read into the array in a previous reconfiguration may be re-asserted in a new reconfiguration.

7. The processor of claim 3 wherein the memory comprises on-chip memory and off-chip memory.

8. The processor of claim 3 wherein the data pipe further comprises a plurality of memory controllers successively configured for separately delivering and extracting operating data to and from areas of the array and distributing output operating data received from the array to a plurality of sections of the memory.

9. The processor of claim 8 wherein the processor further comprises a memory management unit configured to perform memory management functions for the plurality of memory controllers, the memory management unit configured to protect and provide security for memory operations of the processor in a multitasking environment.

10. The processor of claim 3 wherein the reconfiguration data and the data directives are organized into a sequence of fetch block instructions comprising a computer program generated from a sequence of instructions originally formatted for a processor with a predefined instruction set.

11. The processor of claim 10 wherein the processor further comprises a fetch splitter, the fetch splitter communicatively coupled with memory, the data pipe and the instruction pipe, wherein the fetch splitter is successively configured to fetch instructions from the memory, to split the fetched instructions into reconfiguration data and data directives, and to communicate reconfiguration data to the instruction pipe and data directives to the data pipe.

12. The processor of claim 3 wherein the data pipe and the instruction pipe are configured to selectively respond to external interrupt signals by the instruction pipe fetching reconfiguration data and the data pipe fetching data directives from the memory.

13. The processor of claim 12, wherein the processor further comprises a fetch splitter, the fetch splitter communicatively coupled with memory, the data pipe and the instruction pipe, wherein the fetch splitter responds to interrupt signals by fetching instructions from the memory, splitting the fetched instructions into reconfiguration data and data directives, and communicating reconfiguration data to the instruction pipe and data directives to the data pipe.

14. The processor of claim 3 wherein the plurality of logic elements of the array are interconnected and deliver data in a static, non-clocked, combinatorial and toroidal fashion, whereby operating data travels in one circular direction within the array, and the input operating data is delivered to each logic element by a process of input selection, whereby output operating data selected from a number of outputs of other logic elements is communicated to selected inputs of yet another logic element.

15. The processor of claim 3 wherein, at least one of the logic elements includes at least one latch circuit for preserving reconfiguration data between implementations of successive reconfigurations, and the array further comprises a first plurality of buffers communicatively coupled with the data pipe, and the first plurality of buffers are successively configured for delivering input operating data from the data pipe to at least one logic element of the array and delivering output operating data out from the array to the data pipe.

* * * * *